United States Patent
Narushima

(10) Patent No.: US 6,563,596 B1
(45) Date of Patent: May 13, 2003

(54) PRINTER APPARATUS

(75) Inventor: Toshio Narushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/368,473

(22) Filed: Aug. 4, 1999

(30) Foreign Application Priority Data

Aug. 6, 1998 (JP) .......................................... 10-223394

(51) Int. Cl.$^7$ ............................................... G06K 15/00
(52) U.S. Cl. ..................................... 358/1.14; 358/1.9
(58) Field of Search ................................ 358/1.1, 1.14, 358/2.1, 3, 1.9, 518, 519, 523, 524, 461, 3.24; 347/3; 106/31.46, 31.47

(56) References Cited

U.S. PATENT DOCUMENTS 4,446,470 A * 5/1984 Sugiyama et al. ............. 347/3

* cited by examiner

*Primary Examiner*—Arthur G. Evans
(74) *Attorney, Agent, or Firm*—Frommer Lawrence & Haug LLP; William S. Frommer

(57) ABSTRACT

In a printer apparatus, printing of desired images is to be executed easily, only images satisfying pre-set characteristics are printed and unneeded printing is to be suppressed to the maximum extent possible. To this end, the printer apparatus includes an image data inputting unit 1 for outputting first digital image data, a data working unit 5 for correcting the first digital image data if necessary to generate second digital image data, a print output processing unit 24 for converting the first digital image data and/or the second digital image data into image data, and an image printing unit 3 for performing printing/outputting based on the printing data. The data working unit 5 verifies whether or not pre-set characteristics of at least one type of the inputted first digital image data are within a pre-set range. If the pre-set characteristics are within the pre-set range, the first digital image data is corrected, if necessary, to generate the second digital image data. The above-mentioned sequence of operations is executed on the plural types of the first digital image data in the sequence in which the data are inputted to the data working unit 5.

23 Claims, 23 Drawing Sheets

PRINTER APPARATUS

BACKGROUND OF THE INVENTION

1. Field of the Invention

This invention relates to a printer device. More particularly, it relates to a printer device configured for printing only images satisfying certain characteristics such as to evade unneeded printing to the maximum extent possible.

2. Description of the Related Art

As a method for printing image data represented by natural images, the following method has prevalently been used.

As a first method, an input device for inputting image data is connected to a general-purpose computer, connected to a printer device, and image data read-in from the respective input devices into a computer are processed on the computer in a pre-set fashion into printing data which then are inputted to the printer device for printing. The input devices may be exemplified by a removable medium driver, a NTSC (National Television System Committee) image signal inputting substrate, a halide photo film scanner and a digital still camera.

In the second method, the input devices, such as digital still cameras or original readout scanners, are directly coupled to the printer device without the interposition of a general-purpose computer, and the printing data are inputted from the respective input devices to the printing device for effecting the printing.

The first method is explained specifically. Referring to FIG. 1, the system is made up of a host computer, referred to below as a computer 1001, a printer device 1002 and an input device 1003.

The input device 1003 may be enumerated by the aforementioned removable medium drive, such as read-only optical disc drive, a so-called CD-ROM drive, rewritable magneto-optical disc drive, such as so-called MD-DATA drive, inputting devices for image signals, such as NTSC, PAL (phase alternating by line), RGB, S-terminal signals, digital still cameras, scanners for a halide photo film, such as 35 mm film, so-called APS film having the magnetic information pertinent to an image, and an original read-out scanner.

The printer device 1002 may be such a device having a printer head 1004 for actual printing and a head driving circuit 1005 for driving the printer head.

The computer 1001 is mainly comprised of an interface 1006 for inputting image data from the inputting device 1003, a data processing unit 1007 for processing the image data as printing data, and a bidirectional printer interface 1008 for outputting the printing data 1007 to the printer device 1002. The data processing unit 1007 includes a device driver adapted to a variety of the inputting devices 1003, a printer driver adapted to the printer device 1002 for controlling the printer device 1002, and software applications controlling the inputting and working of the image data and also controlling the print output. These software applications execute the data processing by exploiting the data processing unit 1007.

The computer 1001 also includes, as a man-machine interface, a command device 1010, as inputting means, for inputting a command from outside, such as a display device 1009, a mouse or a keyboard. The computer 1001 also includes an image memory 1011, such as a hard disc, for storing image data inputted from the inputting device 1003.

The inputting device 1003 is connected to the interface 1006 within the computer 1001 and the bidirectional printer interface 1008 in the computer 1001 is connected to the printer device 1002 by way of interconnection.

For actual printing, the following operations are executed. That is, the software application of the computer 1001 and the device driver associated with the input device of the image data are actuated to drive the inputting devices 1003 via the interface 1006 adapted for inputting image data to cause the inputting devices 1003 to read-in the image data, which then is inputted to the computer 1001 via interface 1006.

The software application of the data processing unit 1007 executes image editing processing desired by the user on image data inputted to the computer 1001 based on the command inputted by the command device 1010 from outside. If image processing is to be executed simultaneously, the data processing unit 1007 in the computer 1001 executes computational processing to execute the required data processing.

If the image editing processing desired by the user is executed, and the image to be printed is decided, the printing operation is started. That is, the application software controls the printer driver to cause the data processing unit 1007 to execute each data processing for printing in order to convert the data into printing data. At this time, the computer 1001 grasps the state of the printer device 1002 via the bidirectional printer interface 1008.

The printing data, generated by conversion as described above, is constructed as a printer control command, and is outputted via the bidirectional printer interface 1008 to the printer device 1002. The printer device 1002 then drives the print head 1004 by the head driving circuit 1005 to generate a printing image on a recording medium for effecting the printing.

A specified example of the data processing in the above-described operation is the processing method shown in FIG. 2. In this figure, short slanted lines annexed to data flow indicating lines denote that signals being sent are 8 bit/color data. The RGB image data, inputted to an image data inputting unit 1012 of the computer 1001, is sent to an image data processing unit 1013 for processing if necessary. The image data is held in the image memory 1011 as an image file 1011a if need be. The RGB image data is sent from an image data processing unit 1013 to a printer driver 1014 controlling the printer device 1002.

The printer driver 1014 is mainly comprised of a RGB-CMY converting unit 1015, for converting the RGB image data into CMY printing data, a color correction unit 1016 for making color correction if need be, a black extraction under-color removing unit 1017, for extracting black in addition to CMY, an output gamma correction and gradation correction unit 1018 for correcting characteristics proper to the printer device, and a sharpness correction unit 1019 for executing e.g., edge processing.

Specifically, the RGB image data, sent from the image data processing unit 1013 to the printer driver 1014, is first converted into CMY printing data and corrected for color, and the color-corrected data then is converted into printing data also including black. In FIG. 2, the black printing data is denoted as K. The converted printing data is then corrected for characteristics peculiar to the printer device and edge-processed before being outputted to the printer device 1002. If a bi-level printer device, such as an ink jet printer device, regenerating the image by the presence or absence of the printing dot, is used as the printer device 1002, a bi-level coding unit needs to be inserted next to the sharpness correction unit 1019 of the printer driver 1014. Such bi-level coding unit need not be used if a printer device such as a sublimation type printer device representing the gradation within a printing dot is used as a printer device 1002.

Within the printer device 1002, there are provided an output characteristics converting unit 1020 for correcting output characteristics in meeting with the status of the printer device and for suppressing fluctuations ascribable to the printer device, the aforementioned head driving circuit 1005 and the printer head 1004.

Therefore, the printing data of CMYK, sent from the printer driver 1014 to the printer device 1002, is sequentially routed to the above-mentioned head driving circuit 1005 and to the print head 1004 to effect printing.

The second method also is explained. In the second method, the system is mainly comprised of a digital still camera 1021, as an inputting device, and a printer device 1022, as shown in FIG. 3.

The digital still camera 1021 is made up of an image pickup unit 1023 for imaging an object, a command device 1024, such as a shutter, for inputting a command from outside, an image memory 1025 for transiently storing an as-shot image, an image data processing unit 1026 for executing necessary data processing, and a display unit 1027 for displaying the as-shot image.

The printer device 1022 is mainly comprised of an output characteristics converting circuit 1028 for correcting output characteristics in meeting with the status of the printer device, a head driving circuit 1029 for driving a printer head 1030, and a printer head 1030 for actually printing the image.

The data transfer method for transferring data from the digital still camera 1021 to the printer device 1022 may be enumerated by a method consisting in interconnecting the digital still camera 1021 and the printer device 1022 over a wire, converting image data generated by the digital still camera 1021 into the printing data converted from the image data to transfer the resulting digital signals or analog image signals converted from the digital image signals, to route the resulting signals over the wire, and a method consisting in transferring the data over a wireless route by exploiting Ir-DA.

For actual image printing, the following operation occurs. The above-described digital still camera 1021 is fed with image signals of the object from the image pickup unit 1023 in the state of preparation for imaging, that is before the user thrusts a shutter to start the imaging. On these imaging signals, the image data processing unit 1026 has executed the correcting processing for the characteristics of the image pickup unit 1023 or the shooting conditions. The image, thus corrected, is displayed on the display unit 1027 to permit the user to confirm the imaging range of the object and the composition or layout. If there is provided an optical finder in place of or in addition to the display device 1027, the user also is able to make the above confirmation over the finder.

If then the user actuates the command device 1024, such as a shutter, the shooting operation is started. By issuing the imaging start command, such as by the shutter, the image data, inputted from the image pickup unit 1023 and corrected by the image data processing unit 1026 as to the characteristics of the image pickup unit 1023, is stored in the image memory 1025. The image data processing unit 1026 performs data compression, if need be, at the time of data storage.

If an image stored in the image memory 1025 is to be printed, the user actuates the the command device 1024, such as a shutter, to start the printing operation. When the printing operation is started, the image data processing unit 1026 reads out pre-set image data in the image memory 1025 and expands the image data, if need be, by way of converting the data for outputting the data to the printer device 1022.

Depending on the interfacing system between the digital still camera 1021 and the printer device 1022, the data is transferred to the printer device 1022 as digital image data or as analog image signals, over a wire or by wireless connection.

On the printer device 1022, correction and conversion responsive to the print outputting conditions at the time of printing are carried out by the output characteristics converting circuit 1028. Based on these data, the printer head 1030, driven by the head driving circuit 1029, prints an image on the recording medium.

If desired to edit, work or synthesize the image data, the user may execute desired processing by inputting a command by the command device 1024 as he or she checks the image displayed on the display device 1027. The image data processing can be executed within the digital still camera 1021.

For data processing in the above operation, there is a processing method shown in FIG. 4. In this figure, short slanted lines annexed to data flow indicating lines denote that signals being sent are 8 bit/color data. The RGB image data, obtained in the image pickup unit 1023, is sent to an image data processing unit 1026 for processing if necessary. The image data is held in the image memory 1025 if need be. The RGB image data is sent from the image data processing unit 1026 to the printer device 1022 via image data outputting unit 1031.

The printer device 1022 has, in addition to the output characteristics conversion circuit 1028, head driving circuit 1029 and the print head 1030, the mechanisms similar to those of the printer driver 1014 shown in FIG. 2.

Specifically, the printer device 1022 includes an image data inputting unit 1032, fed with image data from the digital still camera 1021 from the digital still camera 1021, a RGB-CMY converting unit 1033 for converting the RGB data into CMY data, a color correction unit 1034 for correcting the color if need be, a black extraction undercolor removing unit 1035, for extracting the black in addition to CMY, an output gamma correction and gradation correction unit 1036 for correcting characteristics peculiar to the printer device, and a sharpness correction unit 1037 for executing edge processing.

That is, the RGB image data, inputted to the image data inputting unit 1032, is first converted into CMY printing data, corrected for color and converted into printing data also including the black. In FIG. 4, black printing data is indicated K. After correcting characteristics peculiar to the printer device, and edge processing, the resulting data is sent to the output characteristics conversion circuit 1028. If a bi-level printer device, such as an ink jet printer device, regenerating an image by the presence or absence of the printing dots, is used as the printer device 1022, a bi-level coding unit needs to be inserted next to the sharpness correction unit 1037 of the printer driver 1022. Such bi-level coding unit need not be used if a printer device such as a sublimation type printer device representing the gradation within a printing dot is used as the printer device 1022.

Thus, the CMYK printing data is sequentially routed via the output characteristics conversion circuit 1028 to the head driving circuit 1029 and to the print head 1030 to effect printing.

Meanwhile, the above-described printing system gives rise to the following inconveniences.

In the first method, various peripherals need to be provided and connected to the computer, after which a device driver suited to the respective peripherals need to be built into the computer, by an extremely laborious operation. It is also necessary to install an application software into the computer in order to execute the processing such as image inputting, editing, working, synthesis, correction or printing, as desired by the user. It is also necessary to set the application software and the device driver so that the peripherals can be controlled by the application software, again by an extremely laborious operation. For peripherals that cannot control the application software, it is necessary to provide an application software configured to control the peripheerals, such that the user has to handle plural appli-cation softwares and to transfer data between these softwares, likewise by an extremely laborious operation.

If a so-called desk top or tower computer is used as a computer, it is necessary to provide a wide space for establishing connection to the peripherals, while the handling is complicated.

The above-mentioned application software executes the processing desired bvy the user, such as editing, working, synthesis, correction or printing, based on specified commands from the user, so that it is necessary to issue commands sequentially for the image under consideration.

That is, the user has to specify the values of the variable elements of each processing, referred to below as variable parameters, so that the user has to grasp the meaning of variable parameters in each processing and the degree of the variation of the image quality as the results of processing corresponding to the widths of the variations.

Also, in the above application software, there is provided a universal input/output function for coping with the general image inputting device and the printer device, while there is also provided the universal function of handling general images without specifying handled image data in connection with the processing function to be executed. Thus, the method for use, contents of the functions and the operating methods are inherently extremely difficult and hence can hardly be mastered by general users.

In the second method, the processing such as image inputting, editing, working, synthesis, correction or printing, depends on the function of the inputting device, with the processing capability being limited. Also, the inputting device is required to have the function of direct coupling to the printer device, such that the processing possible differs significantly and the operating process also differs from one inputting device to another, thus imposing use difficulties on the user. In the current state, film scanners for halide photos cannot be used as an inputting device, such that the capability of printing an image of a film for a halide photo is desired. In addition, the input device and the printer device are interconnected in a one-for-one correspondence, such that it is impossible to process and print image data from plural input devices.

Also, in the above method, the processing desired by the user, such as editing, working, synthesis, correction or printing, is executed on the basis of specified commands from the user, so that it is necessary to issue commands sequentially for the image in question.

That is, in the above method, the user has to specify variable elements for each processing, referred to below as variable parameters, and to grasp the meaning of the variable parameters for each processing and the degree of variation in the image quality consequent upon the processing for the variations.

That is, in any of the above methods, the user has to check each image and to issue a command for each processing. Specifically, the user checks that, even for an image that cannot meet pre-set quality even on correction, the image is not up to the pre-set quality, and subsequently proceeds to disposal or the like measures.

Specifically, if there are contained such image data in plural image data which is not focussed and which is not freed of defocussing even on correction, it is necessary in the conventional method to issue commands for each processing to confirm from the processing results that the image in question is not in meeting with the pre-set quality as to focussing and that defocussing cannot be dissolved even on correction.

This operation is extremely laborious and possibly leads to printing not in meeting with the pre-set quality or to printing of unneeded images.

SUMMARY OF THE INVENTION

It is therefore an object of the present invention to provide a printer device whereby a desired image can be printed easily, only an image in meeting with pre-set characteristics is printed and printing of unneeded images can be suppressed to the minimum.

In one aspect, the present invention provides a printer device including an image data inputting unit for converting digital image data and/or analog image data inputted from outside by analog/digital conversion into first digital image data, an image correcting unit for correcting the first digital image data, if need be, to generate second digital image data, a printing outputting processing unit for performing printing/outputting processing for converting the first digital image data and/or the second digital image data into printing data for printing in an image printing unit, and the image printing unit for performing printing/outputting on a recording medium based on the printing data, at least one type of the first digital image data being inputted from the image data inputting unit to the image correcting unit. It is verified in the image correcting unit whether or not pre-set characteristics of inputted pre-set first digital image data are within a pre-set range and the pre-set first digital image data is corrected, if need be, if the pre-set characteristics are within the pre-set range, to generate the second digital image data. The first digital image data and/or the second digital image data are converted in the printing outputting processing unit into printing data, and printing/outputting is performed in the image printing unit based on the printing data.

That is, in the printer device of the present invention, only image data of at least one type of the first digital image data, whose pre-set characteristics have been verified to be within a pre-set range, are corrected, if need be, into second digital image data, which are printed. If the first digital image data are such data in which focal point characteristics are offset within a pre-set range and the sufficient image quality can be obtained subject to correction, the focal point characteristics of the first digital image data are automatically decided in the image correcting unit to be within a pre-set range. Thus, the first digital image data are automatically corrected to second digital image data, which is then converted to printing data. The printing data is printed to form a printed image.

Heretofore, the processing of the above process is confirmed one-by-one by the user who then issues a command. Ther process is, therefore, extremely cumbersome. This processing is carried out automatically in the printer approximately of the present invention to facilitate printing of a desired image.

In the printer device of the present invention, a plurality of types of the first digital image data are inputted from the image data inputting unit in a pre-set order to the image correcting unit, and the processing of verifying whether or not pre-set characteristics of the first digital image data are within a pre-set range and performing required correction in the image correcting unit, converting the data into printing data in the printing outputting processing unit and performing printing/outputting in the image printing unit is sequentially performed on the plural types of the first digital image data in the inputting sequence.

By so doing, only the portion of the plural sorts of the first digital image data whose pre-set characteristics have been verified to be within a pre-set range are sequentially corrected, if need be, to generate second digital image data, which is printed. There is no necessity of confirming the plural sorts of the first digital image data for printing, such that only an image satisfying pre-set characteristics can be printed selectively.

The inputting order of the plural sorts of the first digital image data to the image correcting unit may be a pre-selected sequence or a reverse sequence thereof, for example, a pre-specified sequence or a reverse sequence thereof if there are plural sorts of the images in the CD-ROM and the image sequence is pre-set. The inputting order may also be a sequence as specified by the information annexed to the image data, such as the header information. The information annexed to the image data may be serial numbers, input numbers or dates of photographing. If the inputting order is pre-set, as in the case of a scanner for a 35 mm film, such order may be used. If random inputting is possible, the random inputting order may also be used.

That is, in the printer device of the present invention, printing can be realized in a printing order suited to the objective of printing by setting the inputting sequence of the image data in the printing order suited to the objective of printing.

When printing the plural sorts of the first digital image data, the numbers of prints can be pre-set for the respective first digital image data. For example, it suffices if printing of all first digital image data one-by-one is set on power up to print the first digital image data one-by-one, the number of prints is pre-set and a pre-set number of proints are printed in the respective pre-set numbers, the number of prints is pre-set for each first digital image data to print the data accordingly, or if the number of prints is stored in the information ancillary to each first digital image data to effect the printing accordingly.

That is, in the printer device of the present invention, the the number of prints of each of the first digital image data can be set individually or collectively to enable the number of prints to be printed as required according to the objective of printing. Since the same first digital image data are printed in this case in succession in a required number of prints, any difference in the image quality is diminished if the image quality is affected by environmental changes during printing.

If, with the present printer device, pre-set characteristics of the pre-set first digital image data are outside the pre-set range, the processing of correction, conversion to printing data or printing outputs is not performed. By so doing, the first digital image data which, if corrected, cannot give an image of sufficient quality, is not printed, thus suppressing needless printing to the minimum.

With the present printer device, if pre-set characteristics of the pre-set first digital image data are within the pre-set range, however, the pre-set first digital image data are substantially uniform over the entire first digital image data and are concentrated in a specified area in a pre-set range, preferably the pre-set characteristics are verified not to be within the pre-set range.

Also, with the present printer device, if the luminance histograms, as pre-set characteristics of the pre-set first digital image data, are within the pre-set range, but are concentrated in a specified area in the pre-set range, and moreover are concentrated in the vicinity of a specified value in the pre-set range, preferably the pre-set characteristics are verified not to be within the pre-set range.

In this case, if pre-set characteristics of the pre-set first digital image data are within a pre-set range, however, the first digital image data are of extremely offset characteristics, as when the luminance is offset excessivley towards the high luminance side, that is towards the high level side, no printing need be made, thus suppressing the printing of an image not leading to a sufficient image quality to suppress the printing of unneeded images to the minimum.

If, in the printer device of the present invention, having an image displaying outputting unit for displaying/outputting the first digital image data and/or the second digital image data, the pre-set characteristics of the pre-set first digital image data are within the pre-set range, however, the proportion of the size of the first digital image data in the possible display area of the image displaying outputting unit is smaller than a pre-set value, or the proportion of the size of the first digital image data in the possible printing area of the image printing unit is smaller than a pre-set value, the pre-set characteristics are verified not to be within the pre-set range.

If, in the printer device of the present invention, having an image displaying outputting unit for displaying/outputting the first digital image data and/or the second digital image data, the pre-set characteristics of the pre-set first digital image data are within the pre-set range, however, the size of the first digital image data is larger than the possible display area of the image displaying outputting unit, the size of the first digital image data is larger than the possible printing area of the image printing unit or the size of the first digital image data is larger than the possible correction area of the image printing unit, the pre-set characteristics are verified not to be within the pre-set range.

By so doing, if the pre-set characteristics of the pre-set first digital image data are within the pre-set range, but if the first digital image data is extremely small in size, it is possible not to carry out the printing, thus suppressing printing of an image of insufficient quality to suppress unneeded printing to the minimum.

In the present printer device, further including inputting means for inputting a command from outside and a controller for controlling the image data inputting unit, image correcting unit, printing outputting processing unit, image printing unit and the image displaying outputting unit, if pre-set characteristics of the pre-set first digital image data are verified not to be within the pre-set range, the controller preferably causes the image displaying outputting unit to indicate that the pre-set characteristics of the pre-set first digital image data are not within the pre-set range.

If, after the controller has caused the image displaying outputting unit to indicate that the pre-set characteristics of the pre-set first digital image data are not within the pre-set range, the controller causes the image correcting unit to discontinue the correction unit to discontinue the correction of the first digital image data, and different types of the first digital image data are inputted to the image correcting unit, the processing of verifying whether or not the pre-set characteristics of the first digital image data are within a pre-set range, correcting the image data if necessary, conversion of the image data into printing data and printing/outputting may be carried out in succession.

It is also possible for the controller to cause the image displaying outputting unit to make a display prompting a command from outside after the controller has caused the image displaying outputting unit to indicate that the pre-set characteristics of the pre-set first digital image data are not within the pre-set range.

In this case, if pre-set characteristics of the first digital image data are verified not to be within a pre-set range, the user is able to confirm this to give a command to make corrections within the possible correction range as later explained or to give a command to proceed to the processing of the next first digital image data.

Thus, a display can be made, as the display for causing the image displaying outputting unit to make a display prompting a command from outside, for prompting a command for discontinuing the processing of correcting the pre-set first digital image data, conversion to printing data and printing/outputting. If the processing of correcting the pre-set first digital image data, conversion to printing data and printing/outputting is discontinued, and if different types of the first digital image data are inputted to the image correcting unit, the processing of verifying whether or not pre-set characteristics of the first digital image data are within a pre-set range, correcting the image data if necessary, converting the image data to printing data and printing/outputting can be executed in succession.

Also, a display can be made, as the display for causing the image displaying outputting unit to make a display prompting a command from outside, for prompting correction only of the portion of the first digital image data whose pre-set characteristics are within a pre-set range.

Moreover, as the display for causing the image displaying outputting unit to make a display prompting a command from outside, a display can be made for prompting a command for correcting the pre-set first digital image data by an input from outside.

If, as the display for causing the image displaying outputting unit to make a display prompting a command from outside for a pre-set time, display is made for prompting a command for correcting the pre-set first digital image data by an input from outside and, failing an input from outside, a display can be made, as the display for causing the image displaying outputting unit to make a display prompting a command from outside, for prompting a command for discontinuing the correction of the pre-set first digital image data, conversion to printing data and printing/outputting and a display prompting a command for correcting only the portion of the pre-set first digital image data whose pre-set characteristics are within the pre-set range.

If a command for discontinuing the processing of correcting the pre-set first digital image data, conversion of the image data to printing data and printing/outputting is given from outside within a pre-set time as from the time of display on the image displaying outputting unit of the pre-set first digital image data inputted to the image correcting unit, or if a command for discontinuing the processing of converting the pre-set second digital image data to printing data and printing/outputting is given from outside within a pre-set time as from the time of display on the image displaying outputting unit of second digital image data corrected from the first digital image data, the processing is preferably discontinued, and different types of the first digital image data are inputted to the image correcting unit, it is preferred to perform the processing of displaying the first digital image data in the image displaying outputting unit, checking whether or not pre-set characteristics of the pre-set first digital image data are within a pre-set range, performing required correction, performing conversion to printing data and printing/outputting.

In this case, if pre-set characteristics of image data of pre-set first digital image data are verified to be within a pre-set range such that each processing for printing is going on, it is possible for the user to discontinue the processing for printing to suppress the unneeded printing.

If, within a pre-set time as from the time of display of the pre-set first digital image data on the image displaying outputting unit, a command for correction of the first digital image data, conversion of the image data to printing data and printing/outputting is given from outside within a pre-set time as from the time of display on the image displaying outputting unit of the pre-set first digital image data inputted to the image correcting unit, or if a command for discontinuing the processing of converting the pre-set second digital image data to printing data and printing/outputting is given from outside within a pre-set time as from the time of display on the image displaying outputting unit of second digital image data corrected from the first digital image data, this processing is preferably performed based on a command from outside.

Of printed image data, among at least one type of the first digital image data and at least one type of the second digital image data corrected from the first digital image data, preferably the information contents of the image data are updated and a flag and/or the information are appended for indicating that the image data are already printed.

If at least one first digital image data is again printed, preferably the information contents of the first digital image data or the second digital image data corrected from the first digital image data and the flag and/or the information indicating that the image data are already printed are confirmed. This enables discrimination of the image data once printed to suppress unneeded printing to the minimum.

The printer device of the present invention includes an image data inputting unit for converting digital image data and/or analog image data inputted from outside by analog/digital conversion into first digital image data, an image correcting unit for correcting the first digital image data, if need be, to generate second digital image data, a printing outputting processing unit for performing printing/outputting processing for converting the first digital image data and/or the second digital image data into printing data for printing in an image printing unit and the image printing unit for performing printing/outputting on a recording medium based on the printing data, as mentioned previously. At least one type of the first digital image data is inputted from the image data inputting unit to the image correcting unit. It is verified in the image correcting unit whether or not pre-set characteristics of inputted pre-set first digital image data are within a pre-set range and, if the pre-set characteristics are within the pre-set range, the pre-set first digital image data is corrected, if need be, to generate the second digital image data, the first digital image data and/or the second digital image data are converted in the printing outputting processing unit into printing data and printing/outputting is performed in the image printing unit based on the printing data to form a printed image.

That is, only data of at least one type of the first digital image data, pre-set characteristics of which have been verified to be within a pre-set range, are occasionally corrected to generate second digital image data which is used for printing to enable facilitated printing of a desired image.

In the printer device of the present invention, a plurality of types of the first digital image data are inputted from the image data inputting unit in a pre-set order to the image correcting unit, and the processing of verifying whether or not pre-set characteristics of the first digital image data are within a pre-set range, performing required correction in the image correcting unit, converting the data into printing data in the printing outputting processing unit and performing printing/outputting in the image printing unit is sequentially performed on the plural types of the first digital image data in the inputting sequence.

That is, in the present printer device, only the data of the plural types of the first digital image data, pre-set characteristics of which have been verified to be in the preset range, are sequentially corrected, if need be, to generate second digital image data, which is printed, thus facilitating printing of a desired image.

In the present printer device, processing of performing corrections, converting the data into printing data and printing/outputting is not performed if pre-set characteristics of the first digital image data exceed the correctable range of the pre-set characteristics, thus suppressing unneeded printing to the minimum.

The printer device according to the present invention includes a printer device includes an image data inputting unit for converting digital image data and/or analog image data inputted from outside by analog/digital conversion into first digital image data, an image correcting unit for correcting the first digital image data, if need be, to generate second digital image data, a printing outputting processing unit for performing printing/outputting processing for converting the first digital image data and/or the second digital image data into printing data for printing in an image printing unit and the image printing unit for performing printing/outputting on a recording medium based on the printing data.

If at least one type of the first digital image data being inputted from the image data inputting unit to the image correcting unit, it is verified in the image correcting unit whether or not pre-set characteristics of inputted pre-set first digital image data are within a pre-set range. The pre-set first digital image data is corrected, if need be, if the pre-set characteristics are within the pre-set range, to generate the second digital image data, and the first digital image data and/or the second digital image data are converted in the printing outputting processing unit into printing data, printing/outputting is performed in the image printing unit based on the printing data to form a printed image.

That is, only data of at least one type of the first digital image data, pre-set characteristics of which have been verified to be within a pre-set range, are -occasionally corrected and turned into second digital image data, which is printed, thus facilitating the printing of a desired image.

Also, in the present printer device, plural types of the first digital image data are inputted in a pre-set sequence from the image data inputting unit to the image correcting unit, where the processing of verifying whether or not pre-set characteristics are within a pre-set range, occasional correction, conversion to printing data and printing/outputting is performed on the plural types of the first digital image data in the inputting sequence.

That is, in the present printer device, only the data of the plural types of the first digital image data, the pre-set characteristics of which have been verified to be in the pre-set range, are sequentially corrected and turned into second digital image data, which is printed, to facilitate the printing of the desired image.

If, in the present printer device, the pre-set characteristics of the pre-set first digital image data are verified not to be within the pre-set range, the processing of correction, conversion to printing data and printing/outputting is not performed, thus suppressing needless printing to the minimum.

DESCRIPTION OF THE PREFERRED EMBODIMENTS

Figure 1:
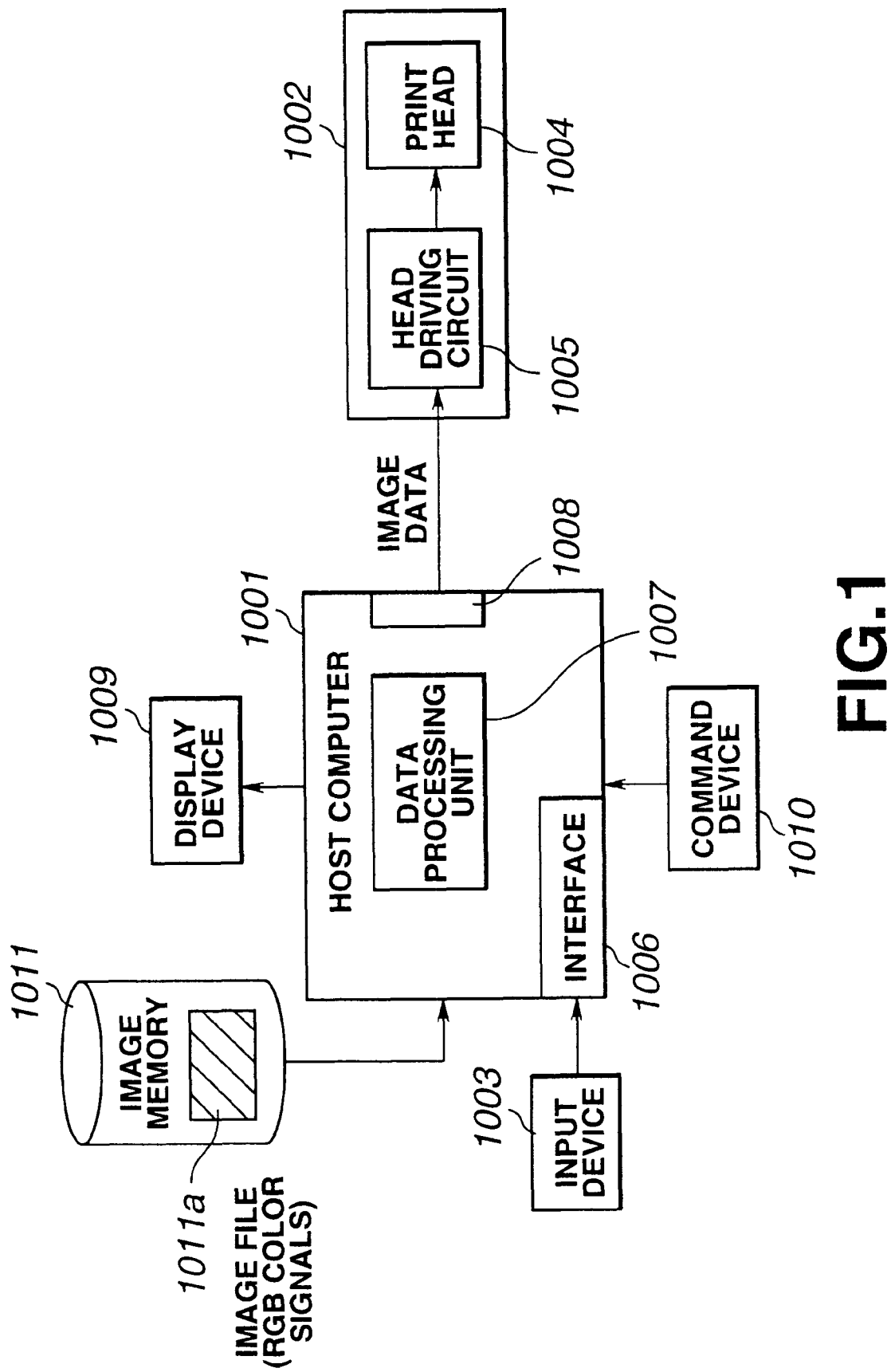
FIG. 1 schematically shows a conventional image data printing method.

Referring to the drawings, preferred embodiments of the present invention will be explained in detail.

Figure 5:
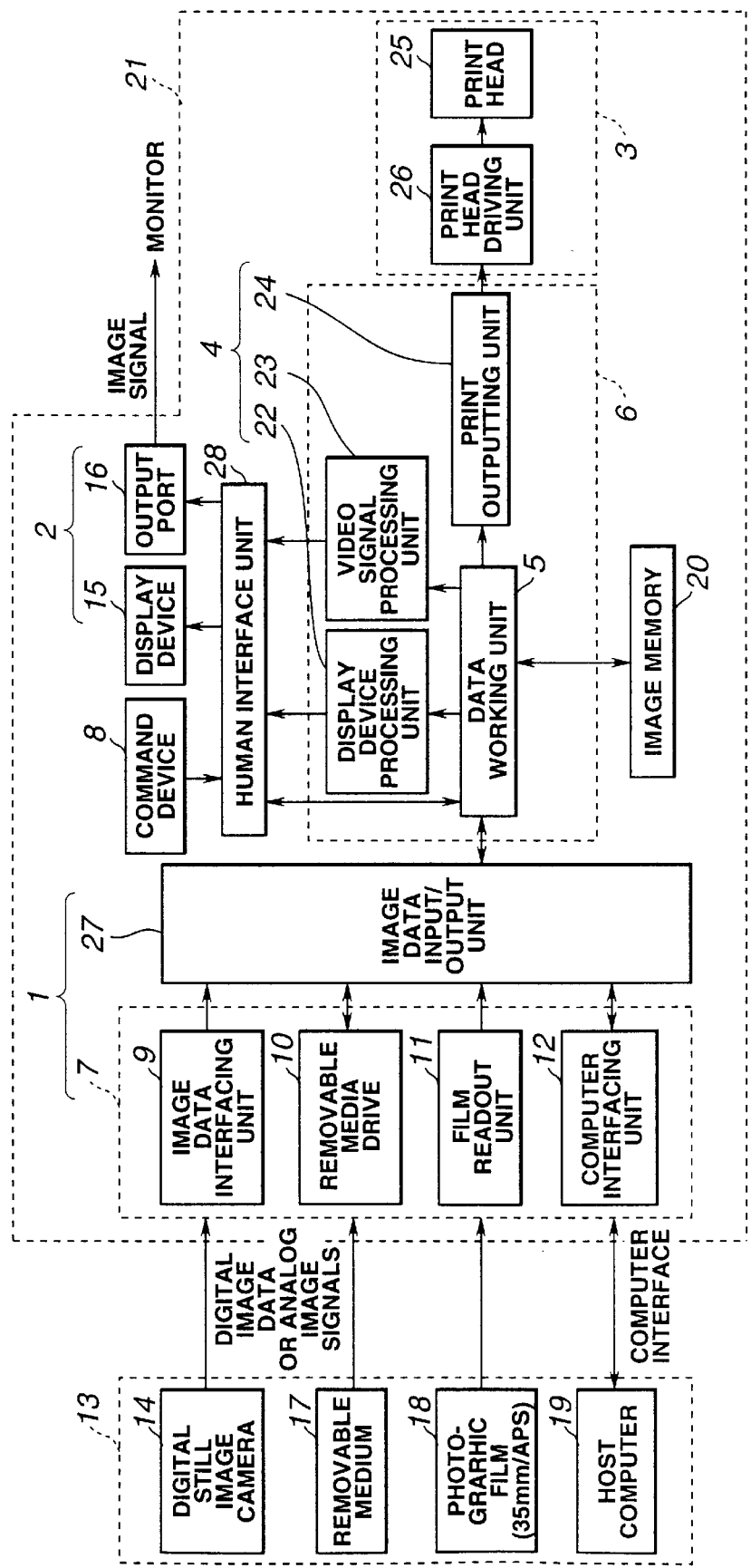
FIG. 5 schematically shows the structure of a printer device according to the present invention.

Referring first to FIG. 5, a printer device according to the present invention includes an image data inputting unit 1, for converting digital image data and/or analog image data, inputted from outside, into first digital image data by analog/digital conversion, and a data working unit 5 for correcting the first digital image data, if need be, to generate second digital image data. The printer device also includes a print output processing unit 24 for performing print outputting processing of converting the first digital image data and/or second digital image data into printing data for printing in an image printing unit 3, and the image printing unit 3 for printing an image on a recording medium based on the printing data.

In the printing device according to the present invention, first digital image data of at least one sort is inputted from the image data inputting unit 1 to the data working unit 5 as an image correction unit. In the data working unit 5, it is checked whether or not the pre-set characteristics of the pre-set input first digital image data are within a pre-set range. If the pre-set characteristics are within the pre-set range, the pre-set input first digital image data are corrected, if need be, to generate second digital image data. The pre-set first digital image data and/or the second digital image data are converted by the print output processing unit 24 into printing data. The printing data are outputted by the image printing unit 3 to generate a printed image.

That is, in the printer device of the present invention, the digital image data of the first digital image data of at least one sort, pre-set characteristics of which have been verified to be within a pre-set range, are corrected, if need be, to generate second digital image data, which is printed. For example, if the first digital image data is such data the focusing characteristics of which are offset only within a pre-set range and can lead to sufficient image quality subject to correction, the first digital image data is automatically verified in the image correction unit to be such data whose focussing state is within a pre-set range. Thus, the first digital image data is corrected to generate the second digital image data, which then is converted into printing data. The converted printing data is printed to generate a printed image.

Up to now, the above processing is executed as the user checks respective steps and issues a relevant command by a laborious operation. However, in the printer device of the present invention, these processing operations are carried out automatically to facilitate the printing of a desired image.

In the printer device of the present invention, the processing of inputting first digital image data of plural sorts in a pre-set sequence from the image data inputting unit 1 to the data working unit 5, verifying whether or not the pre-set characteristics of pre-set first digital image data are within a pre-set range, making necessary corrections, if need be, in the data working unit 5, converting the resulting data into printing data in the print output processing unit 24 and printing the data in the image printing unit 3, is sequentially executed in the input sequence on the first digital image data of plural sorts.

By so doing, only the digital image data of the first digital image data of plural sorts, pre-set characteristics of which have been verified to be within the pre-set range, are sequentially corrected, if need be, to generate second digital image data, which is printed. That is, only images satisfying pre-set characteristics can be selectively printed, without it being necessary to check and process image data of plural sorts oneby-one to print the resulting data, as in the conventional process.

If, in the printer device of the present invention, the pre-set characteristics of the pre-set first digital image data are outside the pre-set range, the processing of correcting the data, converting the resulting data into printing data and printing the resulting printing data is not executed on the first digital image data. Thus, it is possible not to print the first digital image data which, if corrected, cannot give an image of sufficient image quality, to suppress unneeded printing to the minimum.

Referring to FIG. 5, the printer device of the present invention includes, in addition to the image data inputting unit 1, a data working unit 5, a print output processing unit 24 and the image printing unit 3, an image display outputting unit 2 for displaying and outputting the first digital image data and/or the second digital image data, and a characteristics correction unit 4 for correcting the display output characteristics setting which prescribes the display image quality in the image display outputting unit 2 and/or correcting the printing characteristics setting which prescribes the printing image quality in the image printing unit 3. Meanwhile, the data working unit 5 and the characteristics correction unit 4 are arranged within an image processing unit 6.

Moreover, the present printer device includes, in the image data inputting unit 1, image inputting means 7, representing analog image signal inputting means and/or digital image signal inputting means.

The present printing device also includes a command device 8 as inputting means for inputting a command from outside.

That is, in the printer device, digital image data and/or analog image data are inputted by image inputting means in the image data inputting unit 1. The input data are converted in the image inputting means 7 by analog/digital conversion into first digital image data which then is outputted to the image processing unit 6.

In the data working unit 5 within the image processing unit 6, it is verified whether or not pre-set characteristics of the first digital image data are within a pre-set range. The first digital image data are corrected, if need be, to generate second digital image data.

The second digital image data are outputted to the image display outputting unit 2 and to the image printing unit 3, via characteristics correction unit 4, to display and print the image.

In the above-described example, the second digital image data is displayed and printed. However, it is of course possible to display and print the first digital image data directly. That is, in the latter case, the digital image data and/or the analog image data is inputted by the image inputting means 7 in the image data inputting unit 1 and processed with analog/digital conversion in the image inputting means 7 to produce the first digital image data which then is outputted to the image processing unit 6. The converted data is directly outputted, via the characteristics correction unit 4, to the image display outputting unit 2 and to the image printing unit 3 to display and print the image.

In the above-described printer device, the display output characteristics setting prescribing the display image quality in the image display outputting unit 2 is corrected in agreement with the printing characteristics setting prescribing the printing image quality in the image printing unit 3, or the printing characteristics setting prescribing the printing image quality in the image printing unit 3 is corrected in agreement with the display output characteristics setting prescribing the display image quality in the image display outputting unit 2. The result is that the display image in the image display outputting unit 2 is expressed as being of the visually equivalent image quality as the display image on the image display outputting unit 2.

The respective component parts are explained in detail.

In the present printer device, the image inputting means 7 is made up of an image data interfacing unit 9, operating as an analog image signal input port or a digital image signal input port, a removable medium driving unit 10, as a disc drive or a memory drive, a film read-out unit 11, as a scanner having a photoelectric transducing element, and a computer interfacing unit 12.

The image data interfacing unit 9 is an interfacing portion for connecting a device for processing, as image data, an object or an original of a digital still camera 14, digital video camera or an original read-out scanner, indicated as an external connection equipment 13 in FIG. 5, to an image data input/output unit 27.

The image data interfacing unit 9 controls the external connection equipment 13 and operates as a capturing portion for digitized image data (digital image data input port), in addition to operating as a physical connecting portion. The connection to the external connection equipment 13 may be wireless connection by IR rays or electro-magnetic waves, in addition to wired connection.

The image data interfacing unit 9 may also be fed with analog image signals, such as NTSC picture signals, PAL picture signals, RGB image signals or S-terminal image signals, that is, operate as an analog image signal input port, and digitize the input analog image signals to generate image data.

When inputting continuous images, that is moving image signals, such as image signals from a digital video camera or analog image signals, the moving pictures may be directly outputted as image signals to a display device 15, indicated as the image display outputting unit 2, or to an external monitor connected to the output port 16. In this case, the moving pictures selected by the image data interfacing unit 9 may be captured as image data as a digitized still image, under control by a human interfacing unit 28, as later explained, subject to a command for selecting a desired image, issued by the user using the command device 8.

The image data, thus captured, are sent via the image data input/output unit 27 to the data working unit 5. The image data may be sent sequentially in the order in which it is captured, or may be sent on the complete image data frame basis.

The removable medium driving unit 10 is designed to read/write image data by driving a removable medium 17 indicated by the external connection equipment 13 in FIG. 5.

The removable medium 17 may be exemplified by a magnetic card, a magnetic disc, an optical disc, a magneto-optical disc, a flash memory, and an IC memory card, constituted by a ROM or a RAM.

If the medium is such a one the physical unit of which needs to be driven, the removable medium driving unit 10 may also be designed to control the driving of the unit.

The image data, thus captured, is sent to the data working unit 5 via the image data input/output unit 27. The image data may be sent sequentially in the order it is captured, may be sequentially sent in terms of a block comprised of a pre-set data volume as a unit, or may be sent on a complete image data frame basis.

If there are plural image data in a medium, these image data may be outputted as image signals to a monitor connected to a display device 15 indicated as the image display outputting unit 2, or to the output port 16, sequentially or in the contracted image data state. If the user issues a command of selecting the desired image by the command device 8, the removable medium driving unit 10 sends the selected image data to the image data input/output unit 27, under control by the human interfacing unit 28, as later explained, to cause the data working unit 5 to perform pre-set processing. Conversely, it is also possible to send image data, processed in a pre-set fashion by the data working unit 5, via the image data input/output unit 27 to the removable medium driving unit 10, under control by the human interfacing unit 28, this removable medium driving unit 10 then writing the image data on the removable medium 17 for storage.

The film read-out unit 11 is a portion which reads a photographic film 18 indicated by the external connection equipment 13 in FIG. 5, such as a conventional 35 mm film, a so-called APS (advanced photo system) film, a large-sized roll type film, or a sheet type film, carrying the magnetic information on an image, and which then converts the read-out information into image data.

That is, the film read-out unit 11 is mainly comprised of a photo-electric transducing element, such as a CCD line sensor, a photodiode, a phototransistor, a CCD image sensor or a C-MOS image sensor, for reading out an image on a film, a photo-electric transducing element driving unit for driving the photo-electric transducing element and a driving controller for driving-controlling the film so that the targeted image will be in register with the photo-electric transducing element. By the photo-electric transducing element, the image on the film is read out and converted into digital image data.

The image data, thus captured, is sent via the image data input/output unit 27 to the data working unit 5. It is noted that the image data may be sent sequentially in the order it is captured, may be sequentially sent in terms of a block comprised of a pre-set data volume as a unit, or may be sent on a complete image data frame basis.

If there are plural image data on the film, these image data may be outputted as image signals to a monitor connected to a display device 15 indicated as the image display outputting unit 2, or to the output port 16, sequentially, in the contracted image data state or as an image obtained on rough reading with a reduced read-out density, with a roughed read-out pitch. If the user issues a command of selecting the desired image by the command device 8, the removable medium driving unit 10 sends the selected image data to the image data input/output unit 27, under control by the human interfacing unit 28, as later explained, to cause the data working unit 5 to perform pre-set processing. If the roughed readout is used, the image is again read out at the usual pitch.

If, in the film read-out unit 11, the film is tilted with respect to the readout range of the photo-electric transducing element, or otherwise the layout of the image in the film is not optimum, it is also possible to correct the film setting position or the readout position of the photo-electric transducing element automatically, by the user command or software processing, under control by the human interfacing unit 28, and to read out the image again.

The film read-out unit 11 may be endowed with the function of correcting the characteristics of the photoelectric transducing element or of correcting the illumination characteristics for photo-electric conversion. If the processing for these corrections can be performed as digital processing, it can be performed by the data working unit 5 instead of by the film read-out unit 11.

If he APS film, in particular, among the photographic films 18, is to be read out by the photo-electric transducing element, a magnetic head is provided within the film read-out unit 11, and magnetic data on shooting, recorded on the APS film, is read out simultaneously with the readout operation. This magnetic data is displayed on the image display outputting unit 2, as shooting data pertinent to the image data, under control by the human interfacing unit 28, or is used for data working by the data working unit 5 for saving along with the image data.

For printing the photographic film 18, such as that described above, the conventional practice is to use a system centered about a general-purpose computer. If the printer device of the preferred embodiment is used, the image can be printed easily without employing a general-purpose computer.

The computer interfacing unit 12 is an interfacing portion interconnecting the host computer 19, indicated as the external connection equipment 13 in FIG. 5, and the image data input/output unit 27. A high-speed interface, such as Bi-Centronics, IEEE-1394, USB or SCSI, is used for this purpose. This computer interfacing unit 12 performs control of various interfaces, and a variety of protocol controls having commands and responses for bidirectional transmission/reception of image data using respective interfaces. The transmitted/received image data are handled on the line-, block- or surface basis.

For printing out a computer image by a printer, it has so far been necessary to perform various processing operations for printout on a printer driver on a computer. Conversely, with the above-described printer device, in which these processing operations are carried out by the data working unit 5 and the characteristics correction unit 4, the processing by the driver of the host computer 19 is reduced in volume significantly. That is, the time involved in processing by the host computer 19 is shortened, the host computer 19 can execute the processing other than printing immediately and the CPU busy time of the host computer 19 can be reduced significantly.

With the present printer device, it is also possible to send to the host computer 19 the results of various processing on the image data inputted from the various image inputting means 7 by the data working unit 5 and to perform various processing operations by the software other than the computer 19 to save the results in the host computer 19.

As the image inputting means 7, four types of image inputting means 7 are shown above. These image inputting means 7 are, however, merely illustrative since any suitable image inputting means 7 may be used without departing from the scope of the invention.

The image data input/output unit 27 is a portion for controlling the transfer of image data between the image inputting means 7 and the data working unit 5 within the image processing unit 6. That is, the image data input/output unit 27 is a portion responsible for transferring to the data working unit 5 the first digital image data obtained on analog/digital conversion of the digital image data and/or the analog image data inputted from outside to the image inputting means 7.

The image data input/output unit 27 also may have the function of adjusting the image data transfer timing and the relation between the source and the destiation of transfer to prevent relative collision of image data. The image data input/output unit 27 may also have the function of making suitable adjustments to enable image data inputted from various image inputting means to be handled in a similar manner.

The image data input/output unit 27 receives image data from the image data interfacing unit 9 and the film read-out unit 11 of the image inputting means 7, while transmitting/receiving image data to the removable median driving unit 10 and to the computer interfacing unit 12 of the image inputting means 7. That is, the image data inputting unit 1 operates as the data input/output unit. It is noted that control of the image data transmission/reception timing and selection of image data in the image data inputting unit 1 is executed under a command from the human interfacing unit 28 as later explained, if the command by the user is to be followed, whereas, if the control is to be performed automatically, the control is performed under control by the data working unit 5.

Meanwhile, plural first digital image data and/or analog image signals, plural first digital image data, obtained on analog/digital conversion by the image inputting means 7 of plural digital image data and/or the analog image signals inputted from outside, are outputted in the following cases:

That is, the first digital image data are outputted if, in the image data interfacing unit 9, a digital still camera 14, as an external connection equipment 13, is connected, and there are plural as-shot image data in the memory of the digital still camera 14 or on the recording medium.

The first digital image data are also outputted if moving picture signals are inputted to the image data interfacing unit 9, the input moving picture signals are captured and digitized to generate plural first digital image data at a pre-set time interval or each time the contents of moving pictures are changed significantly.

The first digital image data are also outputted if there are plural image data in the removable medium 17 connected to or inserted into the removable medium driving unit 10.

The first digital image data are also outputted if the photographic film 18 installed so as to be read out by the film read-out unit 11 is of the roll type or sheet type and has plural image information recorded therein.

The first digital image data are also outputted if plural image data is stored in the storage units, such as a hard disc or a CD-ROM drive, in the host computer 19 connected to the computer interfacing unit 12, and if a software on the host computer 19, which enables plural digital image data to be sequentially sent from the host computer 19 to the computer interfacing unit 12 via bi-directional interface between the computer interfacing unit 12 and the host computer 19, is being executed.

If plural digital image data, obtained on analog/digital conversion of digital image data and/or analog image signals inputted from outside by the image inputting means 7, are to be outputted, the first digital image data inputted via the image data input/output unit 27 to the data working unit 5 is ordered in priority in the inputting sequence to input the data in this priority sequence, in the reverse sequence to the priority sequence or at random.

The first digital image data can be ordered in the priority sequence by any of the following methods:

That is, plural image data are sequentially captured from the image inputting means 7 and displayed as first digital image data on the display device 15 or on a monitor as the image display outputting unit 2. The user then selects and commands the priority sequence of the image desired to be outputted in the desired order under control by the human interfacing unit 28 as later explained via the command device 8. The inputting sequence may be this previously selected order or the reverse order thereof.

If, when the image data are sequentially captured and displayed, contracted image data already exist in the image data held in the external connection equipment 13, the contracted image data may be captured by the image inputting means 7. If there are no such contracted image data, inherent image data are captured and contracted before being displayed. If the photographic film 18 is photo-electrically converted into image data, the readout density at the time of photoelectric conversion is roughed to capture the contracted image data. This is desirable since contracted images of plural image data can be displayed in the display screen of the image display outputting unit 2.

If there are plural images in the CD-ROM and the sequence of these images is pre-set, the user may select the images desired to be printed, under control by the human interfacing unit 28, and the pre-set order of the selected images desired to be printed may be used as the priority sequence. The inputting sequence may be this previously selected order or the reverse order thereof The priority sequence may also be set by the information accessory to the image data, such as the header information. The inputting sequence may again be this previously selected order or the reverse order thereof. Depending on the data forms of the image data, the ancillary information, such as the header information, is annexed to the image data. The information annexed to the image data may be exemplified by the serial number, inputting number or the shooting date and time of the image data. The priority sequence may be set based on this information. The inputting sequence may again be this previously selected order or the reverse order thereof In this case, after the first digital image data are sequentially inputted by the above method, the first digital image data may be displayed on the display device 15 or the monitor, as the image display outputting unit 2. The user then selects and commands the priority sequence of images desired to be printed and outputted in a desired order, under control by the human interfacing unit 28, as later explained. The inputting sequence may again be this previously selected order or the reverse order thereof.

If, in photo-electrically converting the images on the photographic film 18 and capturing the converted image, the images are captured in an order in which the images are physically arrayed on the film, the readout speed is desirably improved.

Of course, random inputting may be used, if such is possible.

That is, in the printer device according to the present invention, printing can be made in a printing order suited to the printing purpose by setting the inputting order of the image data depending on the sort of the image data to be printed.

Also, in the printer device of the present invention, the information contents of printed image data, among the first digital image data of at least one type and second digital image data corrected from the first digital image data of at least one type, are preferably updated, and a flag and/or the information, indicating that the information ancillary to the image data have been printed, is preferably appended to the image data.

If, when the first digital image data of at least one type is to be printed again, the information contents of the first digital image data or the second digital image data, corrected from the first digital image data and the flag and/or the information specifying that the data have been printed, are confirmed, it becomes possible to discriminate the image data printed once. If the printing is unnecessary, the processing can be omitted, thus suppressing unneeded printing to the minimum.

The above are the methods for determining the priority order of the image data. Which of these methods is to be used is determined on the basis of the optimum system for the type of the image inputting means 7 which is set in advance. With the system, thus set, the manner in which the priority order in the image inputting means 7 may be adapted to be selectable by the user under control by the human interfacing unit 28 which will be explained subsequently.

In the printer device of the present invention, the image display outputting unit 2 includes the display device 15 and an output port 16 which is an analog image signal output port and/or a digital image signal output port. The output port 16 is connected to an external monitor operating as an external connection.

The display device 15 is mainly comprised of a full-color display unit for displaying image data and for making display concerning the human interfacing unit 28 as later explained, and a driving unit therefor. As this display device, a flat panel display represented by a liquid crystal panel is desirable. There may also be provided at least one status display unit comprised of an LED representing the operating state.

The command device 8, as inputting means for inputting commands from outside may be exemplified by a mouse, a trackball, a keyboard, a touch panel provided on the display device 15 and a pen touch input panel for making inputs with a pen point. With the touch panel or the pen touch input panel, provided on the display device 15, the display position of the actuating key image on the display device and an inputting actuating range for the key image displayed on the touch panel or the pen touch input panel are the same or related with each other.

If chattering, such as that ascribable to the key, is likely to be produced, processing for prohibiting malfunction due to chattering is performed by an electric circuit or a control software. As a method of employing the command device 8, it is also possible to display the command accepting range on an external monitor, under control by the human interfacing unit 28, to move the pointer by the command device 8 intothe range and to select the pointer to input the user command, as a pointer indicating the display position of the command device 8 is displayed on the display screen of the external monitor displaying the image signal output of the output port 16.

The human interfacing unit 28 has the functions of selecting desired image data from plural image data to convert the selected image data into first digital image data, sequentially performing a sequence of operations of inputting the first digital image data to the data working unit 5, correcting the inputted image data if necessary, printing the data on the print output processing unit 24 and printing the image in the image printing unit 3, by way of executing the automatic printing system, making a display output on the display device 15 or on the output port 16 as processing is executed on the respective image data, starting the automatic printing system by inputting command through the command device 8 from the user, selecting the image or reading out the image data by an input command through the command device 8 from the user, setting various parameters at the time of editing, working, synthesizing or correcting image data in the data working unit 5 in the image processing unit 6 as later explained, and controlling the printer device under the user command in addition to the print outputting command.

The human interfacing unit 28 causes image data for the display device 15 and the output port 16 of the image display outputting unit 2 processed by the image processing unit 6 to be converted into data that can be outputted to the image display outputting unit 2. The human interfacing unit 28 also synthesizes the key display, slide volume display or menu screen display required for actuation to output the synthesized display to the display device 15 or to the external monitor via output port 16.

In the above arrangement, the contents displayed on the display device 15 may be different from those displayed on the external monitor. For example, image data and the image synthesized by the human interfacing unit 28 may be displayed on the display device 15, while only image signals may be outputted to the output port 16 to display only image data on the external monitor. Specifically, the printing range in its entirety may be displayed on the display device 15, while only selected image data may be displayed on the external monitor. Alternatively, the data display on the display device 15 and the external monitor may also be reversed.

In the above-described printer device of the present invention, it is possible to set the number of prints of the image data before executing automatic printing processing of sequentially performing a series of operations of selecting desired image data from plural image data, converting the selected image data into first digital image data, inputting the first digital image data to the data working unit 5, correcting the data if need be, printing the corrected data in the print output processing unit 24 and printing the image by the image printing unit 3.

That is, it suffices if the entirety of the first digital image data are designed to be set on the image data frame basis on power up (default state) to print the first digital image data on the image data frame basis, or to pre-set the number of the image data frames to print the entirety of the first digital image data in terms of a pre-set number of image data frames as a unit. It is also possible to pre-set the number of prints for each of the first digital image data to perform printing accordingly. The number of prints of the respective image data frames may be set at the time of determining the inputting sequence of the first digital image data to facilitate the processing. It is also possible to insert the information on the number of prints intothe information ancillary to the first digital image data to execute the printing accordingly.

That is, in the printer device of the present invention, the number of prints of the respective first digital image data may be set separately or collectively to print the number required depending on the objective of printing. Since the required number of prints of the same first digital image data are printed in succession, the image quality difference from one printed image to another becomes smaller if the image quality is governed by environmental changes at the time of printing.

Also, in the printer device of the present invention, an optimum method is preferably selected from the above-described different systems in agreement with the characteristics of the image inputting means 7. It is preferred that the method can be altered subsequently.

The setting of the printing number can be controlled and held not only in the human interfacing unit 28 but in the image inputting means 7 or the data working unit The image processing unit 6 is mainly comprised of the data working unit 5 and the characteristics correction unit 4, as mentioned previously.

In the image processing unit 6, the image data inputted from the respective image inputting means 7 via the image data input/output unit 27 are edited, worked, synthesized or corrected, based on the pre-set contents or based on the user command from the human interfacing unit 28. If the input image data from the image data inputting unit 1 are not of ideal image quality characteristics, the input image data is corrected in the data working unit 5 to improve the image quality of the image displayed on the display device 15 or on the external monitor or that of the image printed by the image printing unit 3.

The data working unit 5 receives the user command from the command device 8 via the human interfacing unit 28. Based on the received user command, the first digital image data from the image data inputting unit 1 are edited, worked, synthesized, corrected or converted in a pre-set fashion to formulate edited image data.

The data working unit 5 is adapted to perform access control to an image memory 20, for which image data is written and read, if need be, under control by the data working unit 5. The saved image data has been edited, worked, synthesized or corrected in the data working unit 5 in the image processing unit 6. If there is any information pertinent to the image data, such pertinent information is also saved.

The data held in the image memory 20 may be in the compressed form, reversibly compressed form or irreversibly compressed form. Which of these forms is to be adopted is decided depending on whether or not the data is easy to handle in the image processing unit 6, whether or not image quality deterioration is tolerated on repeated compression and restoration, the maximum number or capacity of image data frames held in the image memory 20, or on the read/write speed of the image memory 20. If the processing speed, image quality deterioration or data tractability are taken into account, it is preferred that the data be held in the image memory 20 in the noncompressed form. Preferably, the image memory 20 is of such capacity as to hold plural non-compressed image data frames. It is also possible to use a portion of the image memory 20 as a working memory for image data in the processing process in the image processing unit 6.

If, for accessing to the image data in the image memory 20, the image data is to be held in the compressed form in the image memory 20, image data is compressed by the data working unit 5 when writing image data in the image memory 20 before writing the data in the image memory 20. Of course, the data is expanded during readout in the data working unit 5.

Since access control to the image memory 20 is also performed in the data working unit 5,time divisional access is had in the event of impending collision between the image data write timing in the image memory 20 and the readout timing from the image memory 20. Alternatively, access control may be made to delay the write timing or readout timing. By using a structure which permits the capacity of the image memory 20 to be increased or decreased, address control to the image memory 20 can be performed normally on detecting the effective capacity.

If, in the image data interfacing unit 9 and the film read-out unit 11, correction processing characteristic of the respective inputs is not performed at the time of imaging or readout of respective image data, it is possible for the data working unit 5 to perform digital working.

In the data working unit 5, the image data is handled as digitized data. If respective processing operations are performed on the digitized image data read out from the image data inputting unit 1, with the number of bits for data computation remaining the same as that of the input image data, the computation accuracy is gradually deteriorated. It is therefore crucial for assuring the image qualiuty of the printed image to increase the number of bits of respective data by 2 to 4 bits during the computation to prevent deterioration of the computation accuracy to the maximum extent possible.

If the first digital image data inputted from the image data inputting unit 1 is to be edited, worked, synthesized or corrected in a manner desired by the user, output display is made on the image display outputting unit 2 under control by the human interfacing unit 28, based on the commands from the command device 8, to permit the coinformation of the processing desired by the user.

If the first digital image data is processed in a manner desired by the user, and a command for printing is issued, the edited image data is routed to the image printing unit 3 via the print output processing unit 24 which will be explained subsequently.

Meanwhile, the processing executed by the data working unit 5 in the image processing unit 6, such as editing, working, synthesis or correction, may be designed to permit late addition or updating of new parameters used for each processing or of the software for each processing from the removable medium driving unit 10 or the computer interfacing unit 12, such that the new function can be added to the printer device.

The image data, edited, worked, synthesized or converted in the image processing unit 6, can be writen and saved in the removable medium 17 via the removable medium driving unit 10. By sending image data to the host computer 19, connected to outside via the computer interfacing unit 12, the image data can be used in many ways by the image processing software in the host computer 19 of the image handling software.

In the printer device of the present invention, in particular, the following processing is performed in the data working unit 5. That is, it is checked whether or not pre-set characteristics of the information ancillary to the input first digital image data or of the first digital image data are within a pre-set range. If these pre-set characteristics are within the pre-set range, but image quality characteristics are not ideal, correction processing is executed to improve the image quality of the image displayed on the display device 15 or on the external monitor or the image quality of the image printed by the image printing unit 3.

If the correction processing for improving the image quality of the displayed image and the printed image of the first digital image data is executed in this manner, it may be an occurrence that the image quality is not improved or even worsened due to such factors as data distribution of the first digital image data, distribution of the spatial frequency, color balance, or pattern or size of the image. Therefore, depending on the processing contents of the executed correction processing, it may be an occurrence that, if image data factors affecting the correction are limited and are outside the range, the correction processing is not to be executed appropriately.

Since the correction processing is not effective for the totality of input data depending on the processing contents, it is effective before proceeding to the execution of the processing to verify the contents of the input first digital image data to confirm that the results of check are within the range suited to the correction processing. The range based on which to decide whether or not the results of check is suited to the correction processing is previously set since it differs with the contents of the correction processing.

It is desirable that the pre-set range suited to the correction can be changed depending on which image inputting means 7 produced the first digital image data, that is depending on characteristics of the image inputting means 7. It is more preferred if this setting can be updated later on by the user via the human interfacing unit 28.

If the information for deciding whether or not the range is the optimum range is stated in the information ancillary to the first digital image data, for example, the header information of the image data, it is also possible to discriminate the information ancillary to the first digital image data to check whether or not the first digital image data is in the optimum range to decide whether or not the correction processing is to be executed, without checking the contents of the first digital image data.

The range is decided to be outside above-mentioned pre-set range, that is the optimum range, in the following cases:

The first of these cases in such a case wherein pre-set characteristics of the first digital image data are within the pre-set range, however, these characteristics are substantially uniform over the entire first digital image data and moreover are concentrated in a particular range of the pre-set range, such that no significant image is recognized.

More specifically, the first case is such a case wherein the luminance histogram, as pre-set characteristics of the pre-set first digital image data in their entirety, is within the pre-set range, however, it is concentrated in a particular range of the pre-set range and moreover is concentrated in the vicinity of a particular value in the pre-set range.

That is, if, in the printer device of the present invention, the pre-set characteristics of the pre-set first digital image data are within the pre-set range, however, the characteristics are drastically offset, such that, for example, the luminance is drastically offset towards the high luminance (high level) side, the range can be decided to be outside the pre-set range to suppress printing of an image having insufficient quality to minimize the unneeded printing.

The second of the above cases is such a case in which the pre-set characteristics of the pre-set first digital image data are within the pre-set range, however, the proportion of the size of the pre-set first digital image data in the possible display range of the image display output unit is smaller than a pre-set proportion, or the proportion of the size of the pre-set first digital image data in the possible printing area of the image printing unit is smaller than a pre-set value.

The third of the above cases is such a case in which the pre-set characteristics of the pre-set first digital image data are within the pre-set range, however, the size of the pre-set first digital image data is larger than the possible display area of the image display output unit, the size of the pre-set first digital image data is larger than the possible printing area of the image printing unit, or the size of the pre-set first digital image data is larger than the possible correction area of the image correction unit.

That is, if, in the printer device of the present invention, the pre-set characteristics of the pre-set first digital image data are within the pre-set range, however, the size of the first digital image data is drastically small, the range in question can be decided not to be within the pre-set range, thus suppressing printing of an image not having sufficient quality and unneeded printing to the maximum extent possible.

The fourth of the above cases is such a case wherein the contents of the correction processing affect the image quality of particular spatial frequency portion, and the major portion of the pre-set first digital image data is taken up by this particular spatial frequency portion, or the proportion of this spatial frequency portion in the entire first digital image data is higher than a pre-set magnitude.

Meanwhile, if, in the present printer device, new correction processing is added subsequently, it is necessary to set the pre-set range, that is the optimum range, for this correction processing.

The display device processing unit 22 is a such unit adapted for performing the correction processing matched to characteristics of the display device 15 in order to display the first digital image data, second digital image data or edited image data, corrected if need be, via the human interfacing unit 28 on the display device 15.

An image signal processing unit 23 is a such unit adapted for performing correction processing matched to characteristics of an external connection display equipment, such as an external monitor, or to characteristics of standard image signals outputted to the display equipment, in order to display the first digital image data, second digital image data or edited image data, corrected if need be, via the human interfacing unit 28 on the external connection display equipment.

Meanwhile, there are occasions wherein image data outputted from the display device processing unit 22 or the image signal processing unit 23 to the human interfacing unit 28 are synthesized with other data in the human interfacing unit 28 and the resulting synthesized data be displayed on the display device 15 or on the external monitor. In this case, the output image data is frequently synthesized with the indication or letters prompting the user command or with a pattern generated by the data working unit 5.

The print output processing unit 24 is a portion responsible for conversion and correction for effectuating the printing in the image printing unit 3 and for sending the resulting data to the image printing unit 3. In the printer device of the present invention, the user selects an image to be printed and outputted, on startup of the actual printing operation in the automatic printing system of the plural image data as later explained, or under control by the human interfacing unit 28, and the user then issues a command for executing the printing, whereby the first digital image data sent from the data working unit 5 or the occasionally processed second digital image data or edited image data are converted or corrected for printing on the image printing unit 3 and subsequently sent to the image printing unit 3.

Usually, the first digital image data or the occasionally processed second digital image data or edited image data are RGB signals with not less than eight bits per color. However, since the ink used in the print head 25 of the image printing unit 3 is of three colors (CMY) or four colors (CMYK), the print output processing unit 24 converts the RGB signals into these four colors, while executing conversion correction processing such as color correction processing of correcting the color offset of a printing output attributable to non-optimum spectral sensitivity characteristics of the recording ink or toner of each color, or conversion correction processing for the print head 25, ink, toner or coloring characteristics of a recording medium ascribable to recording environmental conditions.

The print output processing unit 24 re-arrays the image data transferred to the print head 25 to a printing order actually followed in the print head 25. Thus, the print output processing unit 24 may be provided with a transient buffering RAM for printing data. Alternatively, should the data working unit 5 be read out image data from the image memory 20, the readout addresses may be controlled to suit to the printing sequence in the print head 25.

In the present print head, the display image on the image display outputting unit 2 is expressed as being of a visually equivalent image quality as the printed image by the image printing unit 3.

Thus, the present printer device is configured to correct the display output characteristics setting prescribing the display image quality in the image display outputting unit 2 by the display device processing unit 22 and/or the image signal processing unit 23 in meeting with the printing output characteristics setting prescribing the printing image quality in the image printing unit 3. Conversely, the printer device may be configured to correct the printing characteristics setting prescribing the printing image quality in the image printing unit 3 by the print output processing unit 24 in meeting with the display output characteristics setting prescribing the display image quality in the image display outputting unit 2.

The image printing unit 3 is mainly comprised of a print head driving unit 26 and a print head 25. On starting the printing operation, printing data, processed with conversion and correction as required for printing in the print output processing unit 24 in the image processing unit 6, is routed to the print head driving unit 26, where the printing data is matched to the driving timing of the print head 25 or converted to the driving voltage, driving current or to the driving waveform sufficient to drive the print head 25 before being outputted to the print head 25.

That is, the operation of the print head driving unit 26 takes place in synchronism with the operation of the printing mechanism accompanying the printing by the print head 25, movement of the print head 25, movement of the recording medium, maintenance of the print head 25 and ink furnishment. For effecting optimum printing in meeting with the environmental state at the time of printing, suited correction may occasionally be performed by an analog circuit configuration based on the input from a detection element, such as a temperature sensor. If this correction processing can be carried out by digital processing, it can be executed in the print output processing unit 24 in the image processing unit 6. The print head driving unit 26 is constructed and operated in meeting with the sort and the number of the print head 25 used or with the structure of the print mechanism.

The print head 25 is a portion of the printer device actually emitting the recording ink on a recording medium for printing an image or depositing a recording toner on the recording medium for printing. Such printing head may be enumerated by an ink jet print head as shown in Japanese Laying-Open Patent H-7-164656 or in Japanese Laying-Open Patent H-8-336990, in particular a recording material flying type print head or a two liquid mixing type print head. The print head may also be a dye diffusion type thermal head, an image forming portion of a laser beam printer, or recording heads of other systems.

Of these, the recording material flying type print head or a two liquid mixing type print head, capable of full-color half-tone recording, are preferentially used because it can realize full-color printing with high image quality. It is also possible to construct a line print head or a serial print head depending on the print head width. With the line print head, the recording time can be shortened since it suffices if the recording medium is moved in one direction along the line print head. With the serial print head, the recording medium and the serial print head need to be moved in two directions relative to each other.

In the preferred embodiment, the image data inputting unit 1, image processing unit 6, image memory 20, command device 8, image display outputting unit 2 and the image printing unit 3 are constructed as one to constitute a main body unit 21. However, the image inputting means 7 of the image data inputting unit 1 may be separated from the main body unit 21. In the film read-out unit 11, for example, it suffices if it is connected to the main body unit 21 by a bidirectional interface. By bi-directionally transmitting/receiving signals from the photo-electric transducing element or bi-directionally transmitting/receiving control signals from the read-out mechanism, it is possible to realize the function achieved when building the film read-out unit 11 into the main body unit 21. In this case, a general-purpose interface, such as IEEE-1394, may be used as an interface. If, with the use of the general-purpose interface, image inputting means 7 other than the film read-out unit 11 is used, and a software configuration is used in which communication is controlled between the film read-out unit 11 and,the image inputting means 7, transmission/reception becomes possible with other image inputting means 7 over the interface.

If the image inputting means 7 is adapted to be separable from the main body unit 21, it becomes possible to connect only the type of the image inputting means 7 that is actually required, thus desirably reducing the device size for reducing the floor space.

The display device 15, built into the main body unit 21, is desirably movable within the main body unit 21. For example, the display device 15 is desirably held via a support on the casing-like main body unit 21 so as to be rotated within a pre-set range to permit facilitated recognition by the user. The display device 15 may be arranged in isolation from the main body unit 21. The display device 15 preferably has a physical or electrical connection mechanism with the main body unit 21 to permit the user to view the display from a place remote from the main body unit 21. Specifically, the image characteristics of the color tone of the display image by the display device 15 are highly susceptible to ambient environments. However, if the display device 15 is adapted to be movable on the main body unit 15 or separated from the display device 15, it can be viewed easily under a condition susceptible to ambient environments to a lesser extent.

The command device 8 may also be arranged in separation from the main body unit 21. By so doing, the user can remote-control the printer device.

By constructing the main body unit 21 as described above, it is possible to realize a using or correcting method dedicated to the present printer device. Thus, the processing speed can be enhanced by an algorithm which enables the using method to be simplified and which optimizes the correction processing.

For actual printing by such print head, the following processing, for example, is performed. First, in order to prompt the user to select and input an image accessible to the user, the human interfacing unit 28 causes the display device 15 and/or the external monitor to intake a display to permit selection as to from which image inputting means 7 an image is to be inputted. Accordingly, the user selects one of the image inputting means 7 to be accessed, using the command device 8, in order to capture an image desired to be printed. If the computer interfacing unit 12 has been selected, it is possible to make selection using the host computer 19 in place of the command device 8.

The selected image inputting means 7 converts the externally inputted accessible plural digital image data and/or the analog image data in the as-inputted state or in the contracted state by analog/digital conversion to first digital image data which then is routed via image data input/output unit 27 to the image processing unit 6.

The first digital image data is inputted to the data working unit 5 in the image processing unit 6 and occasionally stored in the image memory 20, at the same time as it is subjected to correction processing for correcting characteristic display properties for display on the display device 15 or on the external monitor.

The image corrected as described above is outputted to the display device 15 or to the external monitor for image display. If there are plural accessible image data in the image data inputting unit 1, these image data are occasionally reduced in size to permit plural image data to be displayed on the same screen.

The user then specifies, by the command device, the image to be printed after executing various processing operations on the plural accessible image data displayed on the display device 15 or on the external monitor. If the processing is to be performed on the entire accessible image data, it is unnecessary for the user to select the image data.

The image data to be processed is decided in this manner, and the processing sequence thereof is decided in accordance with the pre-set system.

The number of prints of each of the first digital image data then is decided. In the present printer device, the image data is adapted to be printed on the image data frame basis on power up (in the default state). If the number of prints different from above is selected, the user inputs the desired number of prints from the command device 8.

If the number of prints differs from one first digital image data to another, the user sets the number each time he or she selects the displayed first digital image data.

The user then checks, in the data working unit 5 operating as the image correction unit, whether or not pre-set characteristics of the pre-set first digital image data are within a pre-set range. If the pre-set characteristics are verified to be within the pre-set range, the data working unit 5 effects correction for improving the image quality of the pre-set first digital image data, if need be, to generate second digital image data.

The data working unit 5 then routes the first digital image data or the second digital image data to the print output processing unit 24 to convert the data into printing data. The image printing unit 3 prints and outputs the imaging data to complete the printed image.

In effecting a series of operations of inputting the selected first digital image data to the data working unit 5, correcting the data if need be, processing the data for printing in the print output processing unit 24 and printing the image in the image printing unit 3, in the present printer device, it is possible to make selection between an automatic printing system of effecting the above sequence of operations automatically and a system of the user varying the processing parameters by the inputting of the command device to perform the above sequence of operations manually (manual printing system).

In the automatic system, it suffices if the user makes commands to that effect from the command device 8. This executes the above-described processing.

In the manual printing system, the desired processing is sequentially performed on each of the first digital image data.

If, when image data desired to be printed is selected in the pre-set order using the automatic printing system, or image data desired to be printed is selected using the manual printing system, the first digital image data is not held in the complete state in the image memory 20, it is necessary to read-in the specified first digital image data again via the image data inputting unit 1 and to hold the read-in digital image data in the image memory 20 via the image processing unit 6.

If, in the automatic printing system, the selected first digital image data is inputted to the data working unit 5, the information as well as the contents of the pre-set first digital image data are checked, that is, it is checked whether or not the pre-set information ancillary to the first digital image data or the pre-set characteristics of the first digital image data are within a pre-set range. If the pre-set information or the pre-set characteristics are verified to be within the pre-set range, and the image quality is verified to be improved by correcting the pre-set first digital image data, the variable parameters of each correction processing are set to optimum values to execute the correction processing to generate second digital image data.

On the other hand, if it is verified that the pre-set information ancillary to the pre-set first digital image data, the pre-set information of the first digital image data and the pre-set characteristics are verified not to be within the pre-set range, the human interfacing unit 28, operating as the controller, causes the image display outputting unit 2 to display that the pre-set characteristics of the pre-set first digital image data are not within the pre-set range.

After the human interfacing unit 28 causes the image display outputting unit 2 to display that the pre-set information of the pre-set first digital image data and the pre-set characteristics are not within the pre-set range, the human interfacing unit 28 causes the data working unit 5 to discontinue the correction of the first digital image data and performs decision as to whether or not the pre-set information and the pre-set characteristics are within the pre-set range, occasional corrections, conversion to printing data and printing, by way of executing the automatic printing system.

After the human interfacing unit 28 causes the image display outputting unit 2 to display that the pre-set characteristics of the pre-set first digital image data are not within the pre-set range, the human interfacing unit 28 may cause the display for prompting commands from outside to the image display outputting unit 2.

By so doing, even if the pre-set characteristics of the pre-set first digital image data are not within the pre-set range, it is possible for the user to recognize it to issue commands for correction within the possible range or commands for proceeding to processing of the next first digital image data.

Thus, in the present case, it is possible to make display prompting a command for discontinuing the processing of correcting the pre-set first digital image data, conversion to printing data and printing, by way of making a display prompting the command from outside to the image display outputting unit 2. If the processing of discontinuing the processing of correcting the pre-set first digital image data, conversion to printing data and printing is discontinued, decision as to whether or not pre-set characteristics are within a pre-set range, correction if need be, conversion to printing data and printing, are executed in accordance with the automatic printing system.

If, as the display prompting the command from outside to the image display outputting unit 2, it is possible to make a display prompting a command for correcting only the portion of the pre-set first digital image data, pre-set characteristics of which are within the pre-set range, to improve the image quality to the maximum extent possible.

As the display for prompting a command from outside to the image display outputting unit 2, it is possible to make a display prompting a command for correcting the first digital image data by input from outside and to make corrections in accordance with the command.

As the display for prompting a command from outside to the image display outputting unit 2, it is also possible to make a display prompting a command for correcting the pre-set first digital image data by an input from outside for a pre-set time interval. Failing an input from outside, it is possible to make a display, as a display prompting a command from outside to the image display outputting unit 2, for indicating a command of discontinuing the processing of correcting the pre-set first digital image data, converting the data into printing data and printing, or to make a display for prompting a command of correcting only the portion of the pre-set first digital image data the pre-set characteristics of which are within the pre-set range.

If, in the printer device of the present invention, a command for discontinuing the processing of correcting the pre-set first digital image data, conversion to printing data and outputting the printing data is inputted from outside within pre-set time as from display on the image display outputting unit 2 of the pre-set first digital image data inputted to the data working unit 5, or if a command for discontinuing the processing of converting second digital image data, corresponding to corrected version of the pre-set first digital image data, into printing data and printing the printing data is inputted from outside within pre-set time as from display of the second digital image data on the image display outputting unit 2, the processing of discontinuing the above processing, displaying the next first digital image data on the image display outputting unit 2 if there is such next first digital image data, checking in the data working unit 5 whether or not pre-set characteristics of the pre-set first digital image data are within the pre-set range, correction if need be, conversion to printing data and printing may be executed in accordance with the automatic printing system.

In this case, the user is able to discontinue each processing for printing even if pre-set characteristics of the pre-set first digital image data are verified to be within a pre-set range and each processing for printing is going on, thus suppressing unneeded printing to the maximum extent possible.

Also, if, in the above printer device of the present invention, a command for changing the contents of the processing, such as correction of the pre-set first digital image data, conversion to printing data and outputting the printing data is inputted from outside within a pre-set time interval as from the display of the pre-set first digital image data in the image display outputting unit 2, or if a command for changing the contents of processing for conversion into printing data of second digital image data corresponding to the corrected version of the pre-set first digital image data and for printing the printing data is inputted from outside within a pre-set time interval as from the display of the second digital image data, the above processing is preferably executed in the manual printing system based on the command from outside.

The correction processing for improving the image quality of the pre-set first digital image data automatically or manually is carried out in the data working unit 5 as described above to generate second digital image data, and the processing necessary for printing the second digital image data in the image printing unit 3, is carried out automatically in the print output processing unit 24 for converting the data into printing data, which then is sent to the image printing unit 3.

In the image printing unit 3, the print head 25 is driven by the print head driving unit 26 to execute actual printing automatically. When the printing of the pre-set first digital image data comes to a close, the printing of the next first digital image data is started in accordance with the manual printing system or the automatic printing system.

If the correction for improving the image quality of the first digital image data is unnecessary, it suffices to send the first digital image data directly to the print output processing unit 24 to execute similar processing.

If inputting is made from outside manually and correction processing for improving the image quality is executed, the viewer issues a command by the command device 8, as the or she views the image displayed on the image display outputting unit 2, to execute the desired processing to generate second digital image data. The user then issues a printing command. This converts the second digital image data into printing data and outputs the printing data for printing an image.

In the printing operation, the recording operation by the print head 25 and the operation of the recording medium occur in synchronism with each other.

In the above embodiment, the operation of processing the first digital image data desired by the user, such as editing, to generate e.g., edited image data, is not carried out. Such operation can, of course, be carried out, in which case it is preferred that the data working unit first verifies, in the data working unit, whether or not pre-set characteristics of the first digital image data are within a pre-set range, the data is corrected, if necessary, and edited to edited image data, which then is again verified as to whether or not the pre-set characteristics are within the pre-set range, with the resulting data then being corrected if necessary, processed for printing and printed.

Figure 6:
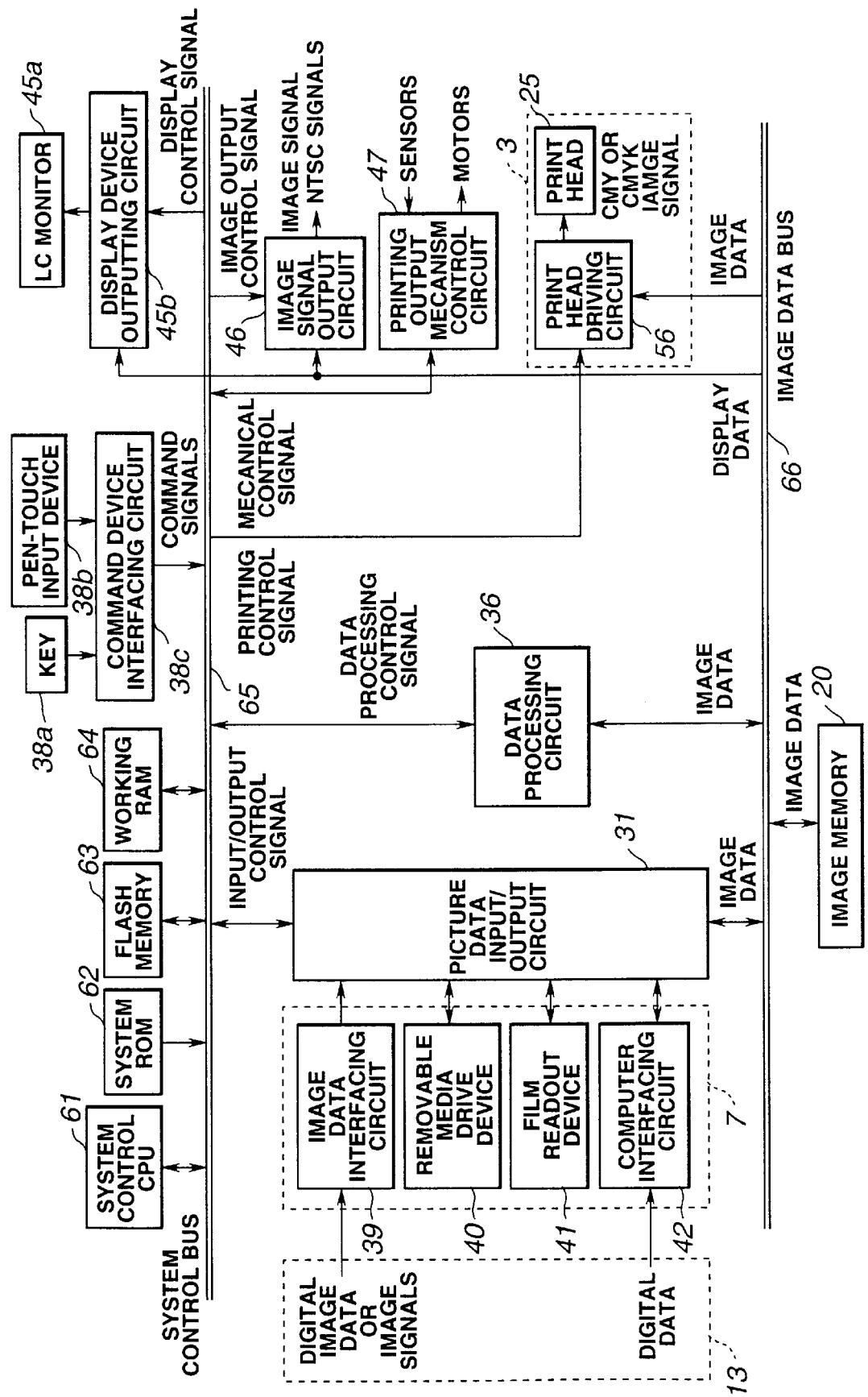
FIG. 6 is a circuit diagram showing the structure of a printer device according to the present invention.

The circuit structure of the present printer device is shown in FIG. 6. The circuit structure is similar to that shown in FIG. 5 and includes circuits corresponding to the external connection equipment 13, image inputting means 7, image data input/output unit 27, image processing unit 6, image display outputting unit 2, command device 8 and the image printing unit 3. That is, an image data interfacing circuit 39, a removable medium driving unit 40, a film read-out unit 41 and a computer interfacing unit 42, are provided in association with the image inputting means 7, while an image data input/output unit 31 is provided in association with the image data input/output unit 27.

A data processing circuit 36 is provided as a circuit corresponding to the image processing unit 6. There are also provided in the inside a data working unit, a display device processing unit, an image signal processing unit and a printing output processing unit.

As the command device 8, there are provided plural keys 38a, arranged on the present printer device to enable the inputting processing by the user, a pen-touch inputting device 38b, arranged on the present printer device to enable the inputting by the user, by a pen-shaped tapering inputting device, and a command device interfacing circuit 38c for inputting to a circuit having the human interfacing unit 28 as later explained. This command device interfacing circuit 38c prohibits a mistaken input ascribable to chattering and, if the same portion of the key 38a or the pen-touch inputting device 38b is thrust for a pre-set time duration, the command device interfacing circuit 38c deems that the operation has been made a plural number of times to transmit a corresponding input to the human interfacing unit 28 a number of times corresponding to the number of times of thrusting of the key 38a or the pen-touch inputting device 38b.

As a device corresponding to the display device 15 of the image display outputting unit 2, there are provided here a liquid crystal monitor 45a and a display device outputting circuit 45b, to which image data in the image memory 20 are transferred. The display device outputting circuit 45b synthesizes a menu picture or a display picture for the pen-touch inputting device, displayed on the liquid crystal monitor 45a, based on the transferred image data and on a display control signal from a circuit corresponding to the human interfacing circuit 28 as later explained, to convert the synthesized picture into driving signals that can be displayed on the liquid crystal monitor 45a.

There is also provided an image signal outputting circuit 46 for synthesizing a menu picture or a display picture for the pen-touch inputting device, displayed on the liquid crystal monitor, based on the transferred image data and on a display control signal from a circuit corresponding to the human interfacing circuit 28 as later explained, to convert the synthesized picture into, for example, NTSC signals as standard image signals that to can be displayed on the external monitor. In this case, the image displayed on the liquid crystal monitor 45a may be the same as or differ from that displayed on the external monitor.

There are also provided a print head driving circuit 56 and a print head 25 in association with the image printing unit 3. There is also provided a print output mechanism control circuit 47 for driving a variety of motors, clutches and a head maintenance mechanism, based on mechanical control signal from the software by a system control CPU 61, as later explained, performing comprehensive control of the mechanism necessary for forming a printed image on a recording medium such as a recording paper sheet using the print head 25 when controlling such mechanism, for accepting an input from various sensors detecting the movement of the recording medium or the print head, and for issuing a corresponding advice to the system control CPU 61 as later explained, by way of driving the mechanism required for printing and status detection.

In the present printer device, the system control CPU 61 employs a working RAM 64 by a system ROM 62 and a control software in a flash memory 63 to control the entire printer device. The system control CPU 61 operates as a circuit corresponding to the human interfacing unit 28 explained previously.

Thus, these components are interconnected over a system control bus 65 to which there are connected the aforementioned various circuits, namely the image data input/output unit 31, data processing circuit 36, command device interfacing circuit 38c, display device outputting circuit 45b, image signal outputting circuit 46, print output mechanism control circuit 47 and the image printing unit 3. Of these, the image data input/output unit 31, data processing circuit 36, display device outputting circuit 45b, image signal outputting circuit 46 and the image printing unit 3 are also connected to an image data bus 66 of the image memory 20.

The control software may be configured to be exchanged via the image data input/output unit 31 from the removable medium driving unit 40 or the computer interfacing unit 42. If an independent control software is required for the operation of the data processing circuit 36 and there is no ROM nor volatile RAM in the data processing circuit 36, the software needed in the data processing circuit 36 may be configured to be transferred to the data processing circuit 36 from the system ROM 62 or the flash memory 63. In this case, the software required in the data processing circuit 36 may be inputted from the removable medium driving unit 40 and the computer interfacing unit 42 and transiently stored in the flash memory 63 or in the working RAM 64 for transfer subsequently to the data processing circuit 36.

The following is the control performed by the system control CPU 6 via the control software in the system ROM 62 or in the flash memory 63. The first is the control of the entire printer device. There are also the driving control of the image data interfacing circuit 39, removable medium driving unit 40, film readout circuit 41 or the computer interfacing unit 42 via the image data input/output unit 31, correction control for improving the handling of image data inputted by respective controls or the image quality of the image data in the data processing circuit 36, image display control for the liquid crystal monitor 45a and the external monitor, human interface control for controlling the inputting of the operational command from the key 38a or the pen-touch inputting device 38b and for controlling the outputting to the liquid crystal monitor 45a and to the external monitor, and the controlling of the print head driving circuit 56, print head 25 and the print output mechanism control circuit 47 by way of controlling the image printing unit 3 in its entirety.

Thus, the mechanism controlling software by the system control CPU 61 and the print output mechanism control circuit 47 are changed in the software contents and the circuit contents if the configuration as well as the operating method of the print head 25, such as the line head or the serial head, or the operating method of the recording medium, are changed. Stated differently, the control software as well as the control circuit are determined by the mechanical structure of the print head 25.

For actual printing, the following processing is executed. That is, plural digital image data, image signals or digital data, inputted in a pre-set sequence from the external connection equipment 13, shown in FIG. 6, are converted by the image data interfacing circuit 39, corresponding to the image inputting means 7, removable medium driving unit 40, film read-out unit 41 and the computer interfacing unit 42 into first digital image data, which is inputted in a pre-set sequence to the image data input/output unit 31 associated with the image data input/output unit 27.

The first digital image data then is routed via the image data bus 66 to the data processing circuit 36 under control by an input/output control signal from the system control bus 65. Of course, the system control CPU 61 is controlling the timing etc.

The data processing circuit 36 then checks, automatically or manually, whether or not the pre-set characteristics of the pre-set first digital image data are within a pre-set range. If the pre-set characteristics are verified to be within the pre-set range, correction for improving the image quality is performed automatically or manually to provide second digital image data which is occasionally stored in the image memory 20. The correction processing may be performed automatically, as mentioned previously, or manually by inputting commands to be executed by the data processing circuit 36 from the key 38a or the pen-touch inputting device 38b. Of course, the system control CPU 61 is again controlling the timing etc.

If the pre-set characteristics of the first digital image data are verified to be outside the pre-set range, the above-described respective processing operations may be performed selectively.

The second digital image data, processed in a pre-set fashion by the data processing circuit 36, is sent to the display device outputting circuit 45b, image signal outputting circuit 46 and to the print head driving circuit 56 for image display and printing. Of course, the system control CPU 61 is again controlling the timing etc, while the respective components are performing their functions.

Figure 2:
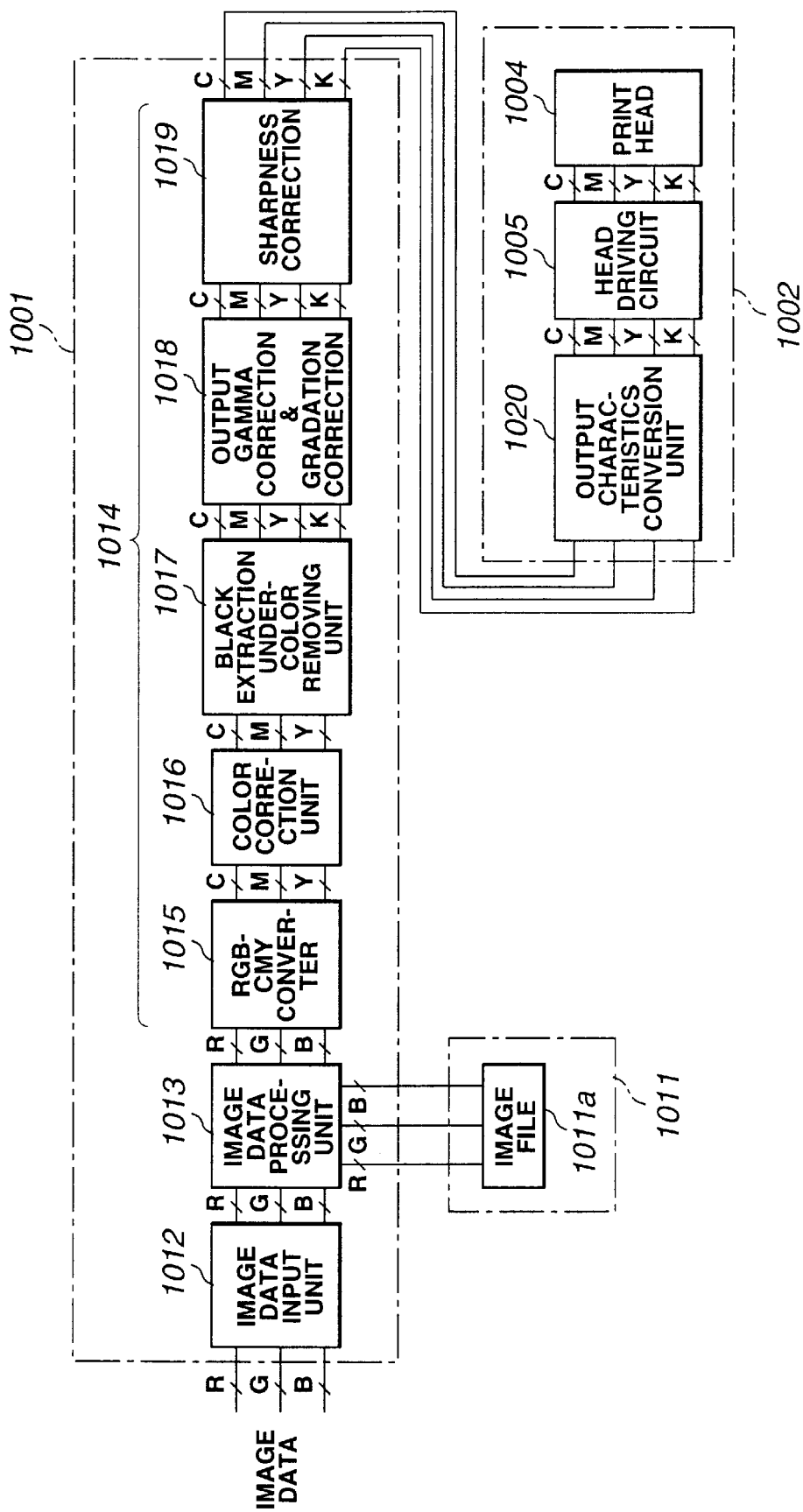
FIG. 2 is a circuit diagram showing flow of data in a conventional image data printing method.
Figure 3:
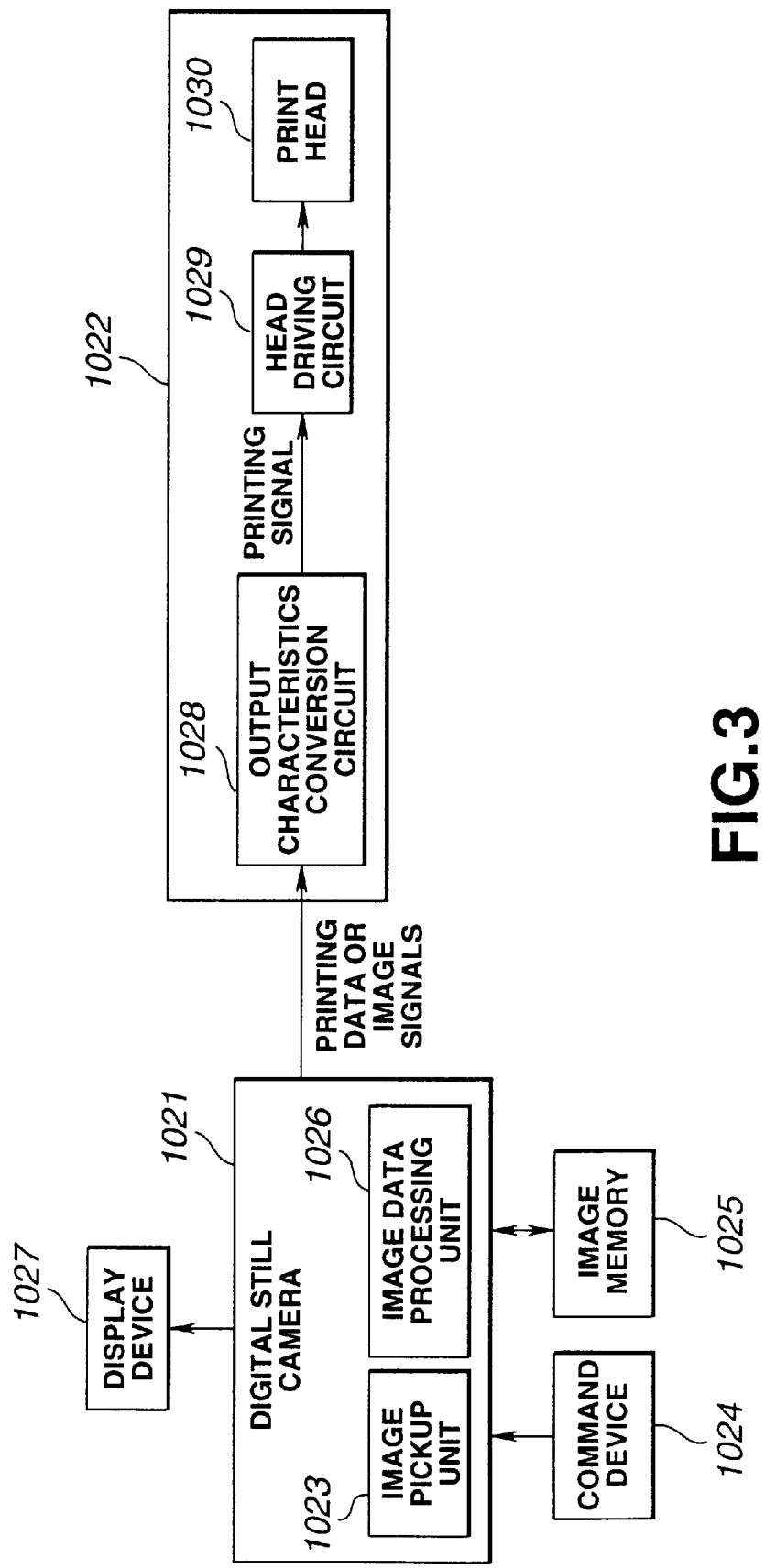
FIG. 3 schematically shows another conventional image data printing method.
Figure 4:
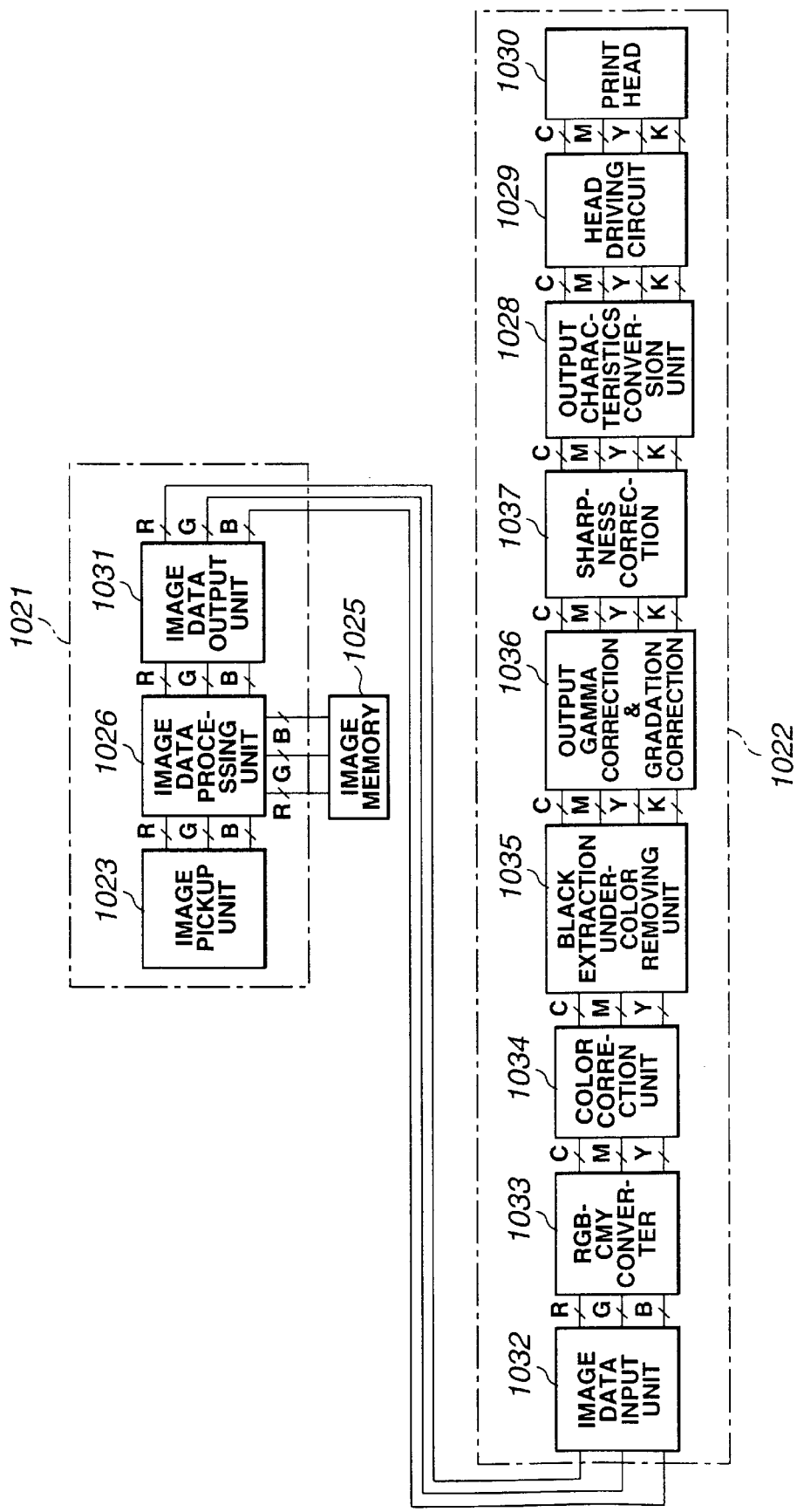
FIG. 4 is a circuit diagram showing flow of data in another conventional image data printing method.
Figure 7:
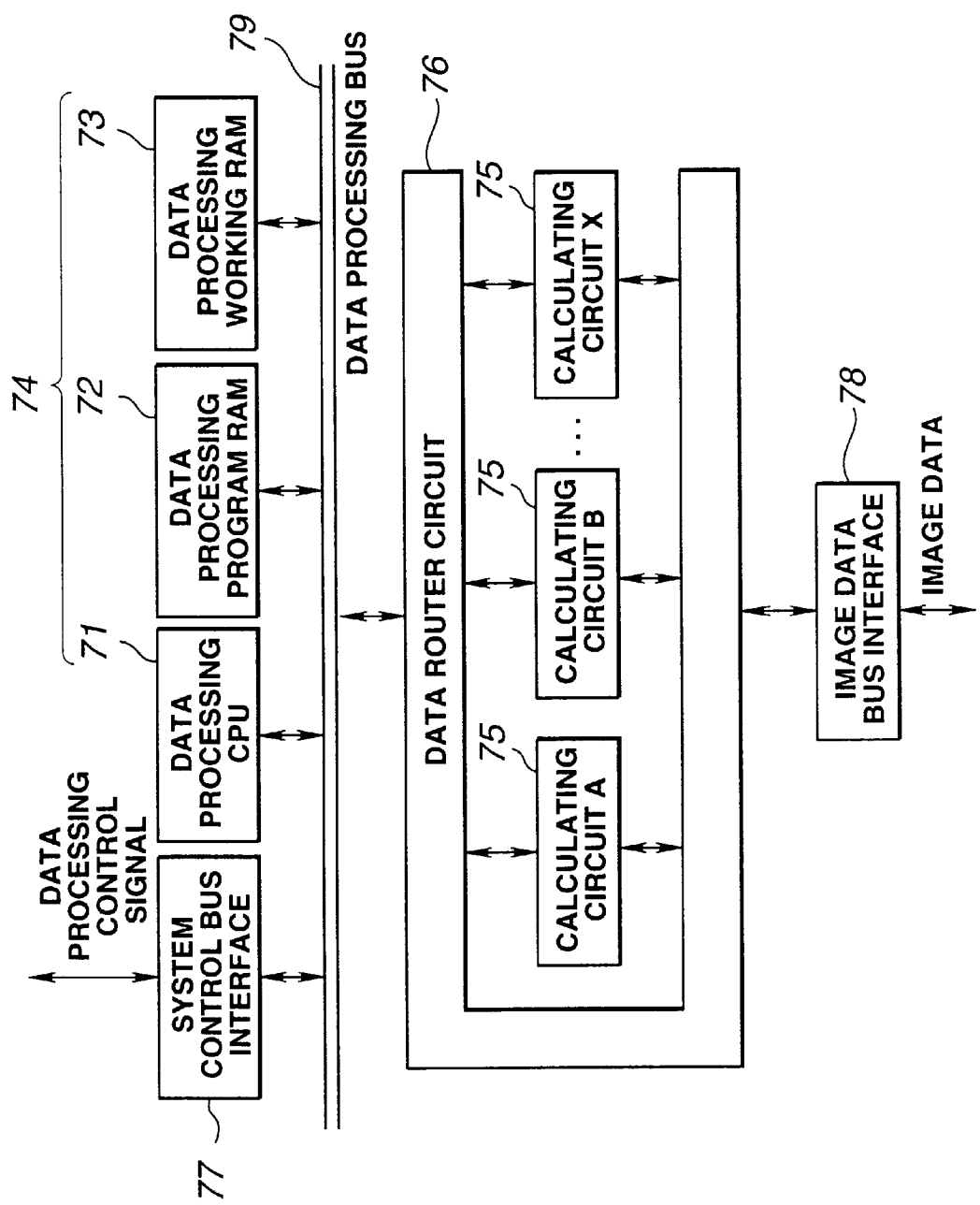
FIG. 7 is a circuit diagram of a data processing circuit of the printer device according to the present invention.

An illustrative structure of the data processing circuit 36 is explained. A first example is shown in FIG. 7. That is, this data processing circuit uniquely includes a data processing working RAM 74, made up of data processing CPU 71, a data processing program RAM 72 and a data processing working RAM 73. The data processing circuit also includes plural computing circuits 75, having the same function, and a data routing circuit 76 for sending data to the computing circuits 75 for controlling the destination of data outputted by the computing circuits 75. This data routing circuit 76 is controlled by a data processing controlling system 74. The control from the system control CPU 61 shown in FIG. 2 is accepted by a system control bus interface 77. The data processing controlling system 74 is connected to the data routing circuit 76 and the system control bus interface 77 over a data processing bus 79. There is also provided an image data bus interface 78 for performing control to input/output image data for the computing circuits 75.

That is, the control from the system control CPU 61 is accepted by the system control bus interface 77 and transmitted to the data processing CPU 71, while the information on the operating states etc is sent from the data processing CPU 71 to the system control CPU 61.

The above-described data processing circuit executes the data processing in the following sequence. Meanwhile, it is assumed that data processing is executed on the image data held in the image memory 20 and the image data is again saved in the image memory 20.

The data processing software to be executed is transferred to the data processing program RAM 72 via the flash memory 63 or the system ROM 62 of the system control CPU 61. The system control CPU 61 then instructs the data processing CPU 71 to start the execution of the data processing via the system control bus interface 77. The data processing CPU 71 reads out the image data for processing in the image memory 20 via the image data bus interface 78, based on the transferred data processing software, and inputs the image data to a particular one of the plural computing circuits 75 to be processed by the data routing circuit 76. The computing circuits 75 executes data processing on the input image data, based on the data processing software, and writes the processed image data in the image memory 20 as image data via the data routing circuit 76 and the image data bus interface 78.

If the next computations are to be performed in succession, the data is inputted via the data routing circuit 76 to the next particular computing circuit 75. By sequentially reading out the image data in the image memory 20, executing the computation processing and again writing the data as image data in the image memory 20, data processing is executed in accordance with the data processing software.

During image data processing or after the end of the processing of the totality of the image data, the data processing CPU 71 advises the system control CPU 61 of the processing state or the results of the processing, via the system control bus interface 77, to permit the system control CPU 61 to be apprised of the process and the results of the data processing being executed. The data processing working RAM 73 is used for holding the data processing parameters sent from the system control CPU 61 or the operating state of the data processing CPU 71.

The plural computing circuits 75 are set to execute the same processing and are selectively used depending on data positions in the image. For example, the data of the first column in an image may be processed by a computing circuit A of the computing circuits 75, while the data of the second column in the image may be processed by a computing circuit B of the computing circuits 75. The processing may be on the row basis instead of the column basis.

The plural computing circuits 75 may be set to execute the different processing operations and data processed by the particular computing circuits 75 may be inputted by the data routing circuit 76 to a different computing circuit 75 performing different processing. In this case, if there are plural stages of the processing being executed, it becomes possible to process the image data read from the image memory 20 sequentially to write the processed data to enable the number of times of access to the image memory 20 to be reduced desirably.

The method of using the plural computing circuits 75 may be pre-fixed or varied by setting by a data processing program. The number of the computing circuits 75 connected in parallel may be selected and decided depending on the required processing speed and the circuit scale of the respective computing circuits.

Figure 8:
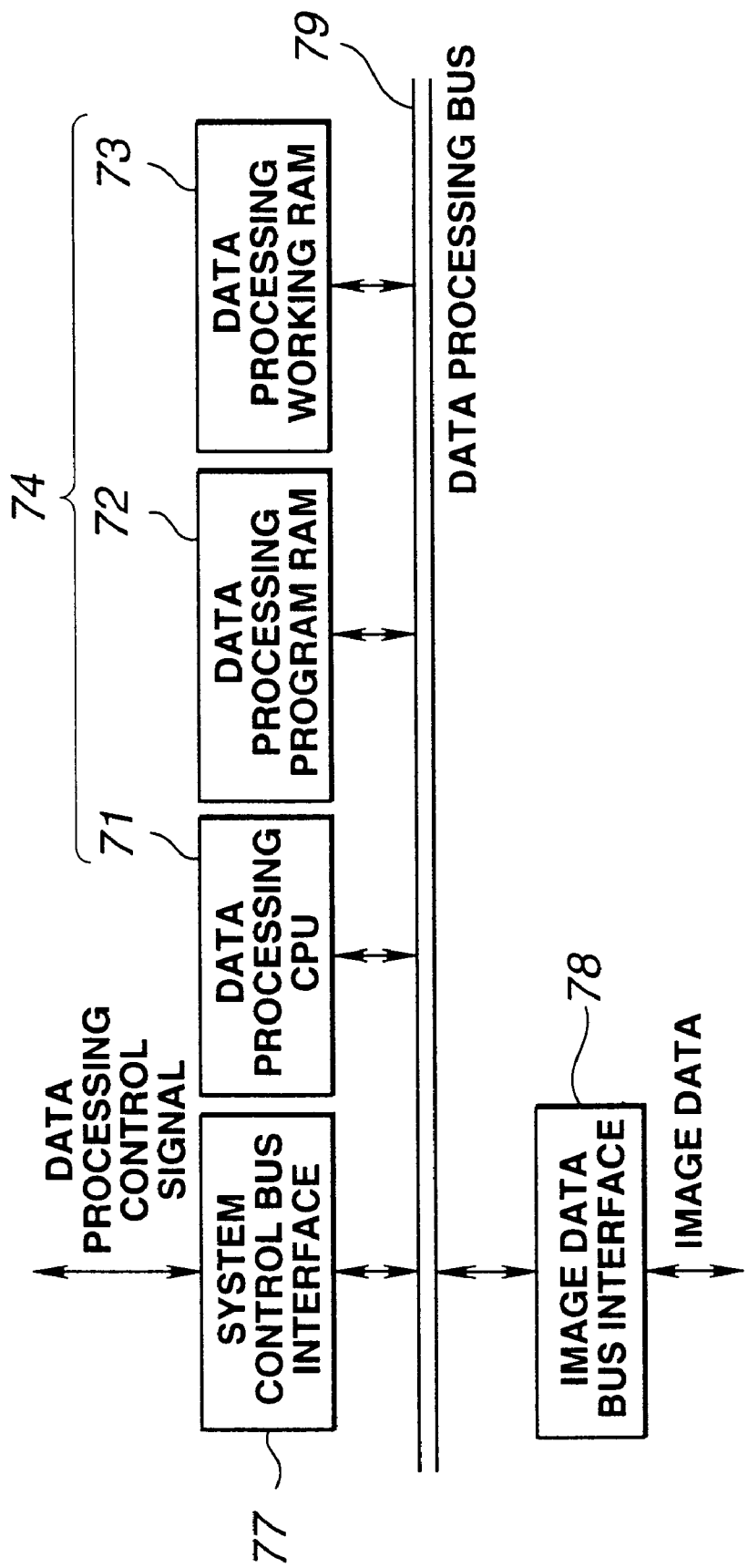
FIG. 8 is a circuit diagram of another data processing circuit of the printer device according to the present invention.

The data processing may be configured as shown in FIG. 8. The data processing circuit shown in FIG. 8 corresponds to that shown in FIG. 7 except that the computing circuits 75 and the data routing circuit 76 are not provided in the circuit of FIG. 8. Therefore, the same reference numerals are used to depict the same parts and the detailed description is omitted for simplicity. However, the data processing CPU 71 used is such a one as enables high-speed processing, that is, DSP, RISC CPU or dedicated processing CPU.

Figure 9:
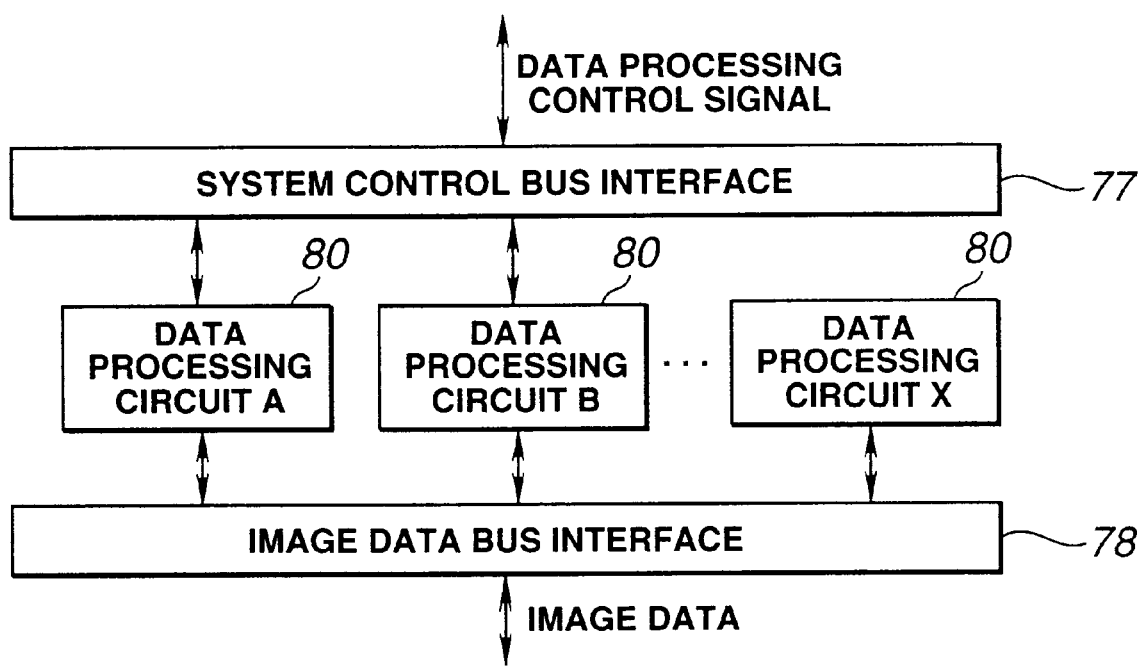
FIG. 9 is a circuit diagram of still another data processing circuit of the printer device according to the present invention.

The data processing circuit may also be configured as shown in FIG. 9. That is, plural data processing circuits 80 are arranged in parallel, with each data processing circuit 80 being connected to a control system of the entire device by the system control CPU 61 via the system control bus interface 77, while being connected via the image data bus interface 78 via system control bus interface 77. Each data processing circuit 80 may be constituted by a dedicated computing circuit, by both a general-purpose computing circuit and a universal computing control circuit, or by solely a computing control circuit. The control software by the system control CPU 61 performs control to cause each data processing circuit 80 to execute data processing on the image data in the image memory 20. Each data processing circuit 80 may be configured to perform the same or different processing operations, depending on the data array, as the computing circuits 75 shown in FIG. 7.

Figure 10:
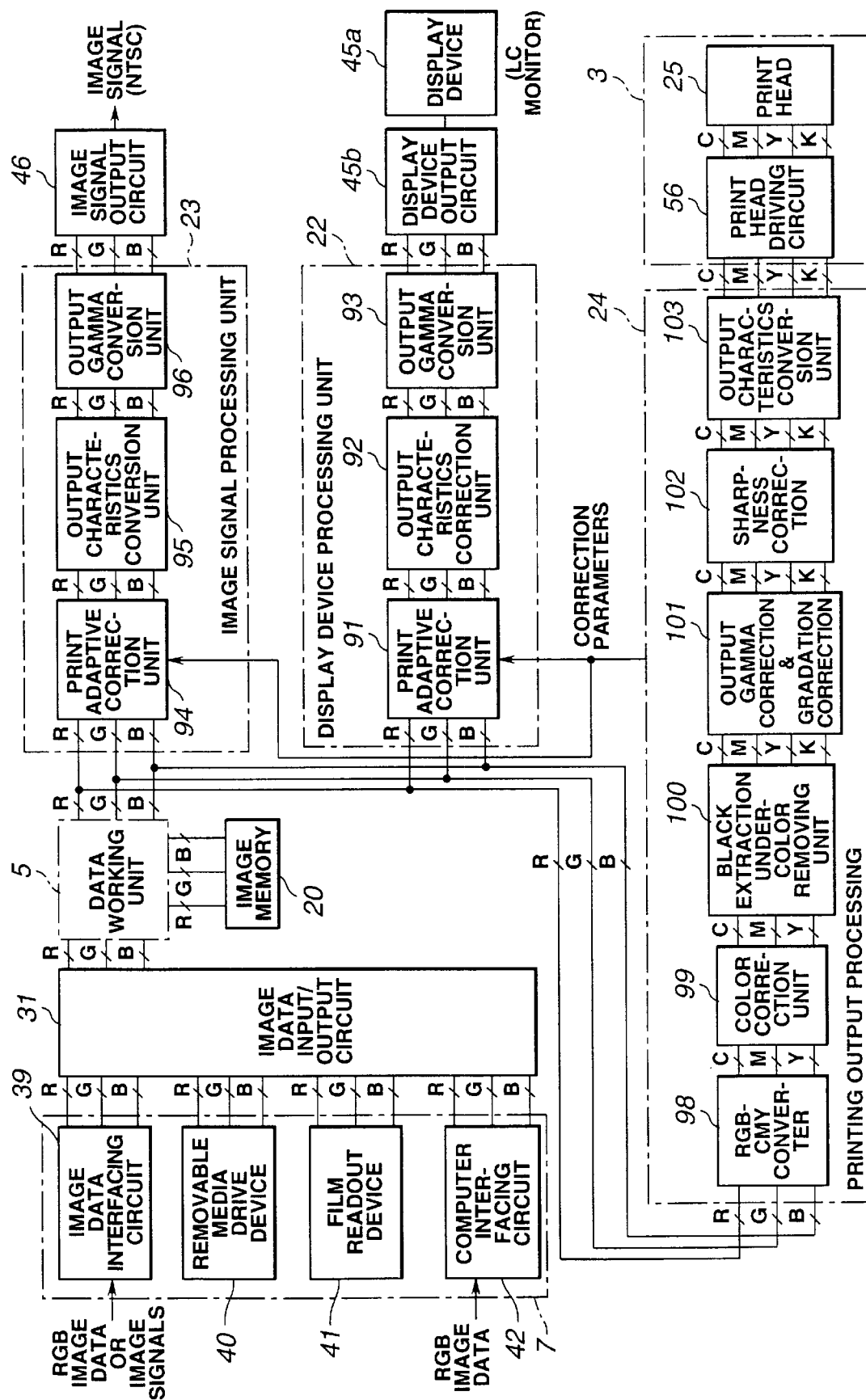
FIG. 10 is a circuit diagram showing an example of data processing flow in the printer device according to the present invention.
Figure 11:
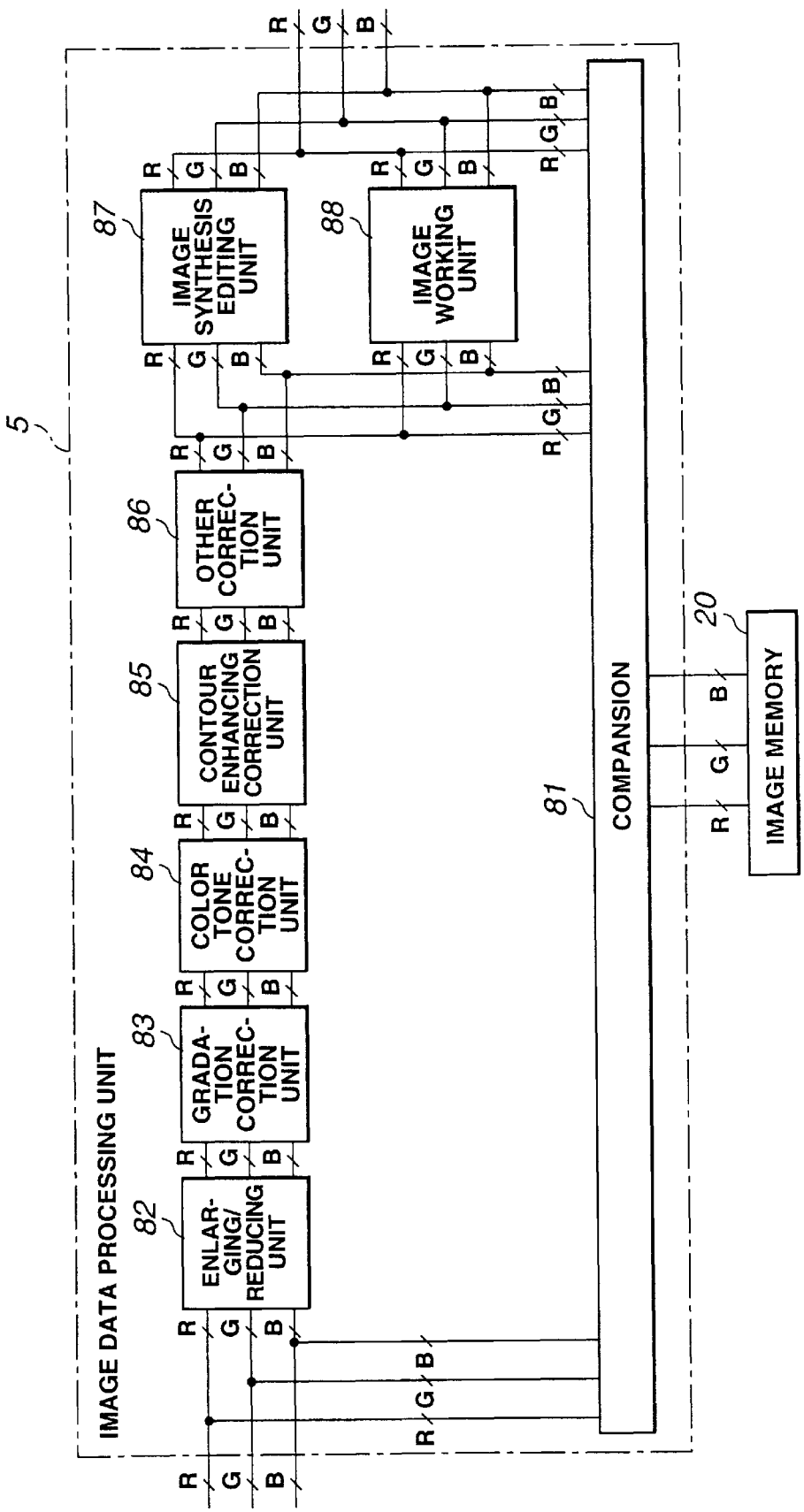
FIG. 11 is a circuit diagram showing data processing flow in a data working unit in the printer device according to the present invention.

Referring to FIGS. 10 and 11, data processing flow in the present printer device is now explained. In these figures, short slanted lines annexed to data flow indicating lines denote that signals being sent are 8 bit/color data. As explained previously with reference to FIGS. 5 and 6, the RGB image data, inputted from outside, are outputted as RGB image data to the image data input/output unit 31 in the computer interfacing unit 42 of the image inputting means 7 shown in FIG. 10, while image data or image signals as read out are outputted as RGB image data to the image data input/output unit 31 in the image data interfacing circuit 39, removable medium driving unit 40 and in the film read-out unit 41 of the image inputting means 7.

In the image data input/output unit 31, the image data inputted from the image inputting means 7 are processed so as to be handled in parallel, and are outputted to the data working unit 5.

Referring to FIG. 11, the data working unit 5 is made up of a companding unit 81, an enlarging/contracting unit 82, a gradation correction unit 83, a color tone correction unit 84, a contour enhancing correction unit 85, a main correction unit 86, an image synthesis editing unit 87 and an image working unit 88. The data working unit 5 checks whether or not the pre-set information and pre-set characteristics of image data inputted from the image data input/output unit 31 are within the pre-set range and corrects the image data if necessary to improve the display image on the display device 45*a* or on the external monitor. The data working unit 5 also performs processing for correction and improvement of the image quality should the image data have peculiar characteristics.

The companding unit 81 is required when image data is to be held in the reversible or irreversibly compressed form in the image memory 20. The companding unit 81 compresses the RGB image data inputted to the data working unit 5, RGB data processed in various ways and, if need be, RGB image data between respective processing operations, to hold the resulting data as compressed data in the image memory 20. The data working unit 5 also has the function of reading out and expanding image data held in the compressed form in the image memory 20 to perform various processing operations as non-compressed RGB data to output the resulting data to various portions in the data working unit 5.

When inputted to the data working unit 5, the RGB image data is inputted to the enlarging/contracting unit 82. The enlarging/contracting unit 82 is a portion which effects decision as to whether or not image size characteristics as pre-set characteristics are within a pre-set range and executes required corrections to operate substantially as an image correction unit. That is, if the input image data is outside the size range which can be handled by the data working unit 5 of the present printer device, the data working unit 5 enlarges or contracts the image data.

The RGB data, inputted to the enlarging/contracting unit 82, is inputted to the gradation correction unit 83. The gradation correction unit 83 checks whether or not a gradation characteristics histogram, as the pre-set characteristics, is within a pre-set range, and performs necessary corrections to operate substantially as an image correcting portion. That is, if the input gradation characteristics histogram is within a pre-set range, however, the gradation characteristics histogram of image data is markedly offset, gradation characteristics of input image data are corrected to improve the image quality of the printed image. In particular, the gradation correction unit 83 corrects the light exposure volume during imaging the object to prevent the image in its entirety from becoming too dark or too bright to improve gradation characteristics of the entire image. The gradation correction unit 83 also executes correction of the gamma characteristics if gamma characteristics of the input image data are to be improved in similar manner.

If the gradation correction unit 83 decides that the gradation characteristics histogram is not within a pre-set range, however, if there is issued a command from the user, it is also possible to correct only the range of possible correction or correction subject to inputting from outside.

The RGB data, thus inputted to the gradation correction unit 83, is then inputted to the color tone correction unit 84. Similarly to the gradation correction unit 83, the color tone correction unit 84 checks whether or not the color tone characteristics as the pre-set characteristics are within a pre-set range, and performs corrections if necessary to operate substantially as an image correcting unit. That is, if color tone characteristics of the input image data are within a pre-set range, but if color tone characteristics of input image data are markedly offset, the color tone characteristics of input image data are corrected so that the printed image will be improved in image quality. If the particular color tone, especially if the color tone of the skin color or the gray color, is offset from the optimum range, it is possible to correct the offset portion to be in an optimum range, is addition to correcting the overall color tone.

If the color tone characteristics are decided not to be in the pre-set range, but there is issued the user command, as mentioned previously, it is also possible for the color tone correction unit 84 to make corrections only in the possible correction range or the corrections responsive to inputting from outside.

The RGB data, inputted to the color tone correction unit 84, is then inputted to the contour enhancing correction unit 85, which is responsible for verifying whether or not image contour characteristics as pre-set characteristics of image data are within a pre-set range and for making any necessary corrections to operate substantially as an image correction unit. That is, if contour characteristics of input image data are within pre-set range, however, the contour of the input image data is not clear or excessively emphasized, the contour enhancing correction unit 85 corrects contour enhancement to correct the image contour to an optimum contour.

It is also possible fort the contour enhancing correction unit 85 to make corrections only of the possible correction range or corrections subject to external input, provided that there is the user command, as mentioned previously.

The RGB image data, inputted to the contour enhancing correction unit 85, is then inputted to the main correction unit 86. The main correction unit 86 verifies whether or not the pre-set characteristics are within the pre-set range, however, are not within the pre-set range by the above-mentioned various reasons, and performs corrections if necessary.

That is, if the indication is made that the pre-set characteristics are not within the pre-set range, and a user command is given subsequently, as mentioned previously, the main correction unit 86 corrects only the possible range of correction or responsive to inputting from outside.

Although the input image data are sequentially corrected in the above-described embodiment in the respective processing units, it is of course possible to omit unneeded processing or to change the processing sequence.

The RGB data, corrected as described above, are then inputted to the image synthesis editing unit 87 and to the image working unit 88. These units are configured for performing various working operations on an input image and for editing and synthesizing plural input images to produce an image to be printed ultimately.

It is also possible for these units to synthesize an image pattern previously prepared for the input image data. It is similarly possible for the user to input an image pattern the or she desires by a command device, such as a pen-touch input device, to synthesize this image pattern and an input image pattern together.

The control software for executing the synthesis, editing and working of the image data and the previously prepared image pattern may be inputted newly from the removable medium driving unit or the computer interfacing unit.

The RGB signals, outputted by the data working unit 5, are inputted to the display device processing unit 22, image signal processing unit 23 and to the printing output processing unit 24.

The display device processing unit 22 executes display output characteristics peculiar to the display device 45a if the display device 45a has peculiar display output characteristics such that, if image data outputted by the data working unit 5 are directly displayed on the display device 45a, the image data cannot be displayed to a high image quality or to the image quality equivalent to that obtained on printing because of the above-mentioned display output characteristics of the display device 45a. The display device processing unit 22 is made up of a printing adaptive correction unit 91, an output characteristics correction unit 92 and an output gamma conversion unit 93, arrayed in this order.

The image signal processing unit 23 is responsible for converting image data outputted by the data working unit 5 into standard image signals represented by the NTSC signals to output the resulting image signals. This image signal processing unit 23 is made up of a printing adaptive correction unit 94, an output characteristics correction unit 95 and an output gamma conversion unit 96, arrayed in this order. If the range of the possible characteristics range of image data differs from the display range prescribed with the standard image signals, the image signal processing unit 23 also performs the processing of converting the range of representation of the image data into that of the standard image signals. It is likewise possible for the image signal processing unit 23 to convert the output image signals into the image signals pursuant to the standard image signals. In particular, the signals are enhanced in saturation (brightness) as compared to the standard image signals in order to present a more attractive image.

The print output processing unit 24 is responsible for converting image data outputted from the data working unit 5 into signals that can be inputted to the print head driving circuit 56 (printing data) in order to record the output image signals from the print head 25 on the recording medium. The processing by the print output processing unit 24 is realized by a conversion processing by a LUT (look-up table), computational processing exploiting a computing circuit capable of executing product sum processing at an elevated speed, computing processing by a software having high-speed computational processing or processing by a dedicated conversion circuit. If, when executing the computing processing is sequentially, the same number of bits as that of the respective data in the input image data is used, the data is occasionally worsened in effective precision. It is possible in such case to increase the number of bits of the respective data in the course of computation as compared to the number of bits of the initial image data and to decrease the increased number of bits at the last processing.

The print output processing unit 24 is made up of an RGB-CMY conversion unit 98, a color correction unit 99, a black color under-color removing unit 100, an output gamma correction and gradation correction unit 101, a sharpness correction unit 102 and an output characteristics conversion unit 103, arrayed in this order.

The RGB-CMY conversion unit 98 is responsible for converting the RGB image data into data of respective colors of the respective inks or the toner of C (cyan), M (magenta) or Y (yellow) used in the print head 25. This conversion is by gray level log conversion, complementary color conversion or linear masking conversion.

The image data, converted into CMY image data as described above, is inputted to the color correction unit 99, which is responsible for correcting the offset of the color tone of the printed image by the image printing unit 3 (especially color hue or saturation) brought about by the difference of the spectral absorption characteristics of respective inks or toners of CMY from the ideal characteristics by the subtractive color mixing.

The color correction unit 99 executes the conversion by the LUT (look-up table) and computations, by the linear masking computations or by the non-linear masking computations. Since the possible display characteristics range of the image data frequently differ from the possible display maximum range of the printed image on the recording medium by the print head 25, if the maximum range by the image data is broader than the maximum range by the printing, the portion of the display range of the image data exceeding the range of the printing range cannot be directly regenerated. Thus, for representing the exceeding portion on the printed image, it becomes necessary to convert the entire image data by compression or clipping. Such a conversion method is sometimes adopted to prevent occurrence of the color tone deviation as a result of the clipping conversion.

The CMY image data then is inputted to the black color under-color removing unit 100 which is responsible for substituting the BK ink or the BK toner for the black (BK) ink or toner in the print head 25, if any, in each data of CMY. The BK component in the CMY image data replaced by BK is removed from the data values of the CMY data values.

There are many techniques for substituting the BK ink or toner for the BK component in the CMY, such as a method of total substitution, substitution only of a pre-set portion, substitution only of a pre-set portion or substitution with a region in excess of a pre-set gray level. By representing the BK component of the CMY data by the BK ink or toner, the black representation in an image that cannot be sufficiently regenerated with the respective inks or toners of CMY. Meanwhile, the BK component data is represented as K in FIG. 10.

The CMYK image data then is inputted to the output gamma correction and gradation correction unit 101, which is responsible for correcting the output gamma or gradation suited to printing outputting characteristics peculiar to the recording ink or toner or half tone representing method if there are such printing outputting characteristics in the image regenerating characteristics on the recording medium by the print head 25. In the output gamma correction and gradation correction unit 101, such conversion as will optimize the gradation representation on printing is executed on the original image data.

The CMYK image data is inputted to the sharpness correction unit 102 which is responsible for contour enhancement and smoothing to improve the image quality of the printed image.

The CMYK image data is inputted to the output characteristics conversion unit 103 which is responsible for executing characteristic corrections depending on the type of the print head 25, driving method for the print head 25, type of the recording medium or the type of the ink or the toner. Specifically, the output characteristics conversion unit 103 corrects for ambient temperatures at the time of printing, thermal hysteresis and fluctuations of the respective elements of the print head 25. Of these correction perations, those that should appropriately be corrected by the print head driving circuit 56 can be corrected by the print head driving circuit 56.

In the present printer device, display output characteristics prescribing the display image quality in the image display outputting unit 2 are corrected, in agreement with the setting of the printing characteristics prescribing the printing image quality in the image printing unit 3 in order to visually equate the image quality of the display image on the display device 45a and on the external monitor to that of the printed image by the image printing unit 3.

Specifically, the correction parameters, indicating the contents of the correction to be executed by the display device processing unit 22 and the image signal processing unit 23 for visual image quality equation are inputted to the printing adaptive correction unit 91 of the display device processing unit 22 and to the printing adaptive correction unit 94 of the image signal processing unit 23, in meeting with changes in the printing characteristics, specifically the processing contents, of the print output processing unit 24.

That is, in the display device processing unit 22, the RGB image data has the correction parameters in the printing adaptive correction unit 91 to which the data is inputted first. The processing is executed in this state for display on the display device 45a.

Likewise, in the image signal processing unit 23, the RGB image data has the correction parameters in the printing adaptive correction unit 94 to which the data is inputted first. The processing is executed in this state for display on the display device 45a.

The result is that the display image on the display device 45a and on the external monitor may be equated in image quality to the printed image on the image printing unit 3.

In the above-described embodiment, the display outputting characteristics of the display device processing unit 22 and the image signal processing unit 23 are corrected in meeting with the printing characteristics of the image printing unit 3, specifically with the processing contents by the print output processing unit 24, to realize visual equation of the display image by the image display outputting unit to that of the printed image on the image printing unit. It is however possible to match the printing characteristics of the image printing unit 3, specifically the processing by the print output processing unit 24, with the display outputting characteristics of the image signal processing unit 23.

Figure 12:
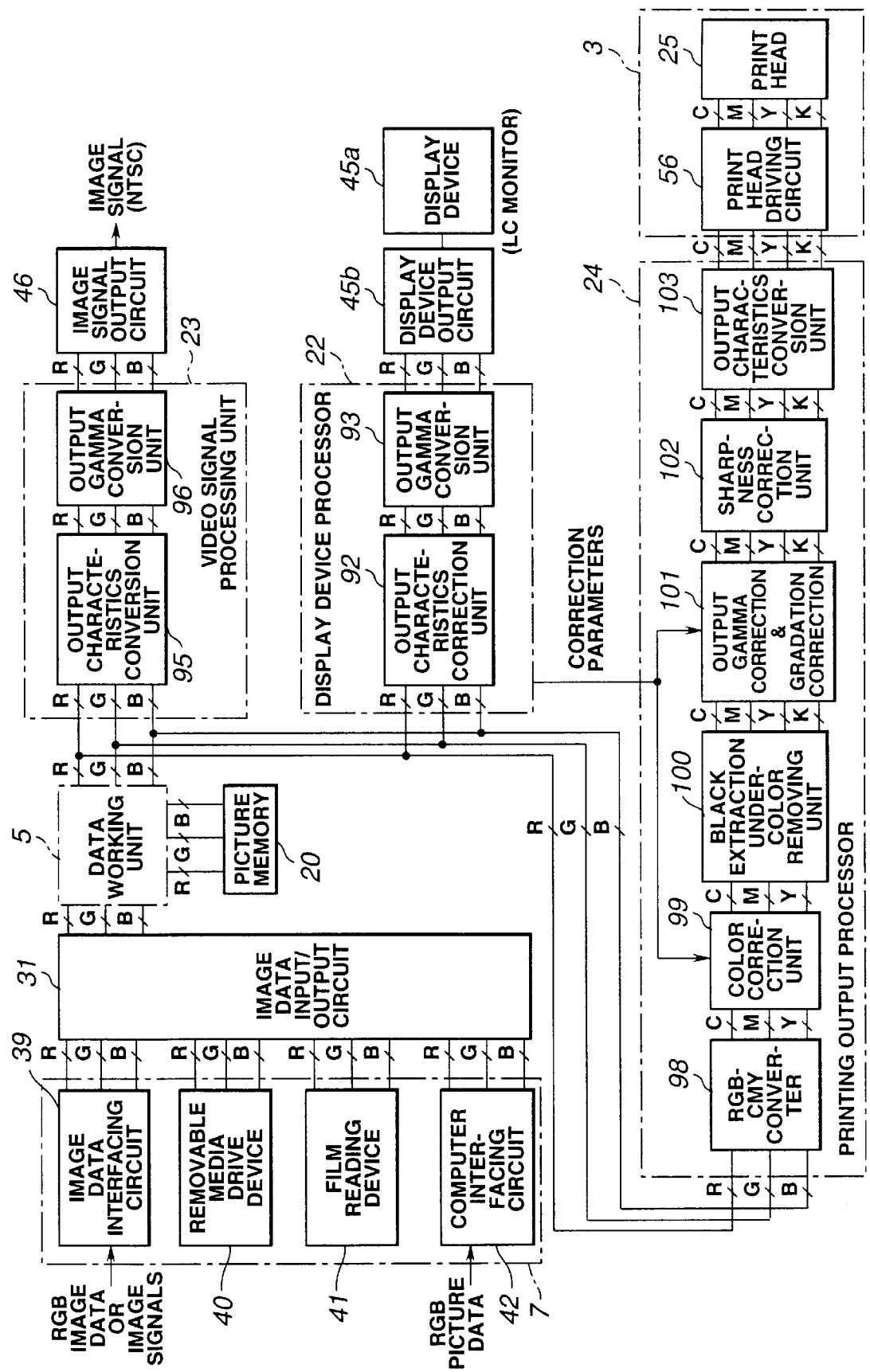
FIG. 12 is a circuit diagram showing another example of data processing flow in a data working unit in the printer device according to the present invention.

That is, the data processing flow may be as shown in FIG. 12. Since FIG. 12 differs from FIG. 10 only as to the absence of the printing adaptive correction unit 91 of the display device processing unit 22 and the printing adaptive correction unit 94 of the image signal processing unit 23 and the consequent absence of a line indicating the correction parameter from the print output processing unit 24, the same portions are depicted by corresponding reference numerals and are not explained specifically.

If the data processing is as shown in FIG. 12, correction parameters indicating the contents of the correction to be performed by the print output processing unit 24 for visually equating the image quality are inputted to the color correction unit 99 of the print output processing unit 24 and to the output gamma correction and gradation correction unit 101.

That is, in the print output processing unit 24, the RGB image data includes the color correction unit 99 and the output gamma correction and gradation correction unit 101 adapted for substantially deciding image characteristics. The processing proceeds in this state to print an image by the image printing unit 3.

The result is that the display image on the display device 45a and on the external monitor may be equated in image quality to the printed image on the image printing unit 3.

If the display device processing unit 22, image signal processing unit 23 and the print output processing unit 24 are provided with non-volatile memories to hold the correction parameters in the re-writable state, it becomes desirably possible to perform the processing using optimum correction parameters at all times.

Figure 13:
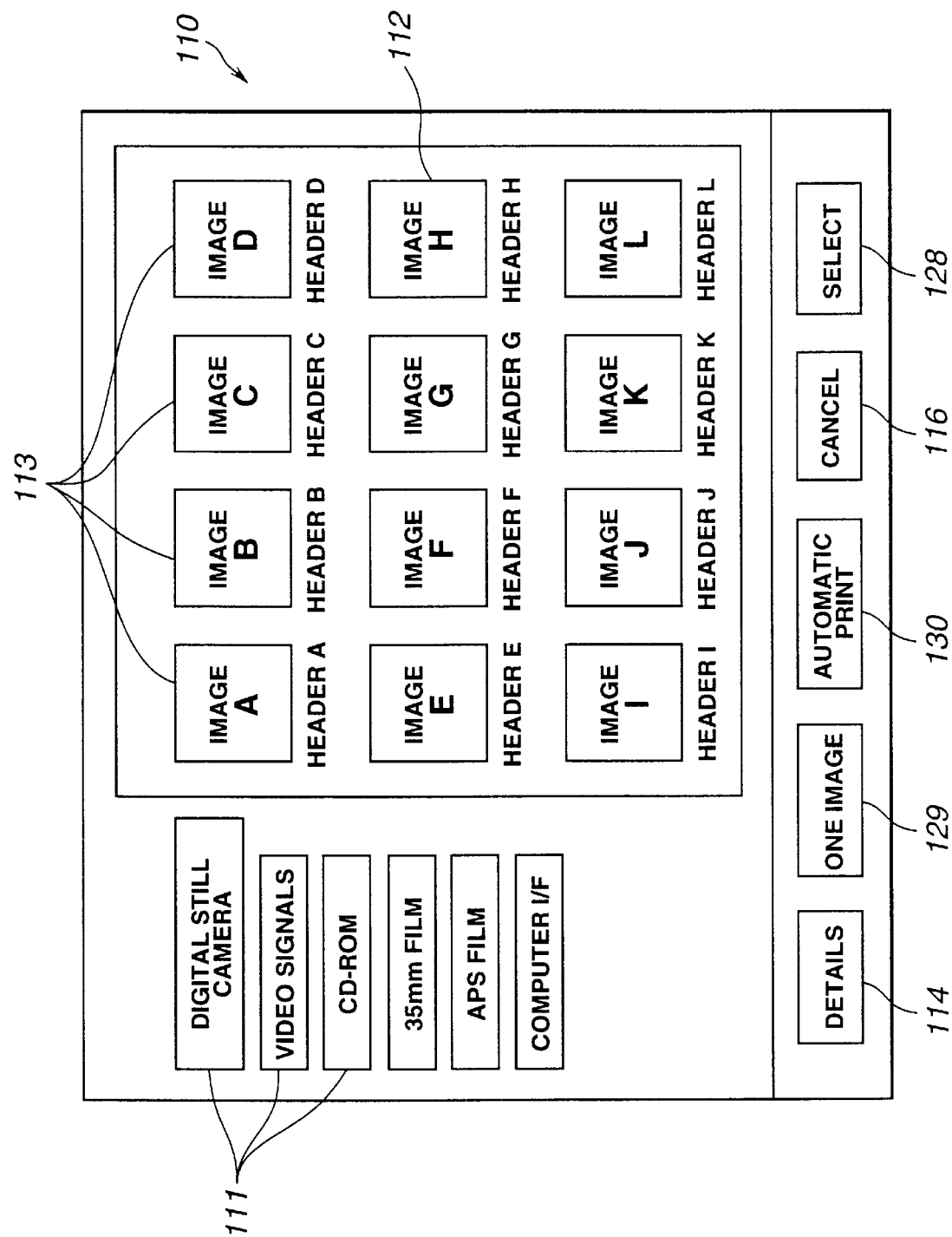
FIG. 13 is a schematic view showing an example of an image shown on a display device of the printer device according to the present invention or on an external monitor.

In the foregoing, description has been made of displaying a menu screen etc on the display device 15 or on the external monitor. Of these, the first screen is the screen 11 indicating the menu, as shown for example in FIG. 13. The screen is presupposed to be such a one in which input processing is achieved by directly touching a pre-set portion on the screen. On this screen 110, there are displayed plural input unit selection keys 111, carrying the indication of the appellations with which to select the connection devices and image inputting means, and an image display area 112, as shown in FIG. 13. It is noted that, when an external connection device and image inputting means are selected by the input unit selection keys 111, an image 113 accessible by the selected means is displayed as a contracted image in the image display area 112.

On the screen 110, there are also displayed a details setting key 114, used in selecting the image 113 under specified conditions, a selection key 128 for selecting the image 113 displayed as a contracted image, a print number inputting key 129 for inputting the number of prints, an automatic print key 130 for automatically correcting the decision to perform the printing by way of initiating the automatic printing system, and a cancellation key 116 for aborting the processing.

First, if the user selects and specifies one of the external connection devices and the image inputting means by the input unit selection keys 111, plural images 113 that can now be read by such selection are displayed on the image display area 112. If there is the information ancillary to the information on the image 112, such as the header information, such information is displayed in association with the respective images 113.

If the user then selects a desired image 113 by the selection key 128, there is made a display indicating that the image 113 has been selected.

If the same number of prints are to be prepared from the selected image 113, the print number is set by a print number inputting key 129.

If there is no image to be printed in the plural displayed images 113, no selection needs to be made.

It is desirable that condition inputting be enabled on selection of the details setting key 114, so that the user can select the images 113 under specified conditions of the shooting date, time or sequence.

If the image data to be printed is selected as described above, particular conditions are set, and these are automatically decided and corrected to effect the printing, an automatic selection key 130 for initiating the automatic printing system is selected.

Then, a series of processing operations, namely decision, correction and printing, is sequentially performed on the pre-selected plural image data to produce a pre-set number of prints.

If plural images are displayed as described above, those image data displayed as contracted images and which are printed previously are desirably indicated differently to demonstrate that these images are already printed.

The image data being corrected is desirably indicated as being in the course of correction processing. The as-corrected image data is preferably demonstrates to an enlarged scale.

If the automatic printing key 130 is selected, a sole image 117, as one of the plural selected image data, plural processing display keys 118 indicating respective processing operations to be sequentially executed to improve the image quality, that is processing A, processing Bitstream, processing X, . . . , processing X, a print key 119 indicating the initiation of printing and a cancellation key 120 for discontinuing the processing, are displayed.

That is, on the present screen, the status of the progress of each correction processing is displayed. During or after the processing for correction, an image representing the results of the processing is displayed.

If the correction processing can be started from a particular portion of the image 117, it is desirable that the display for the range of termination of the processing be gradually changed o the post-processing display to enable recognition to which range of the image 117 the processing has been executed.

As, the processing for correction, there are presupposed the processing having variable parameters and the processing not having these variable parameters.

It is now presumed that the processing A is the processing having variable parameters. If such correction processing is executed, it suffices if the image 117, a processing display unit 121 indicating the processing currently going on, a selection key 122, carrying the indication for reverting to the previous screen, for selecting the previous screen (screen shown in FIG. 14A), a cancellation key 123 for discontinuing the processing and a variable parameter selecting portion 126 and a decision key 127 for definitively setting the processing, are displayed. If, in this image, the pre-set information ancillary to the image or pre-set image characteristics are verified to be outside a pre-set range, it suffices if an "outside automatic correction range" display 131 indicating impossibility of automatic correction is indicated.

Figure 14A:
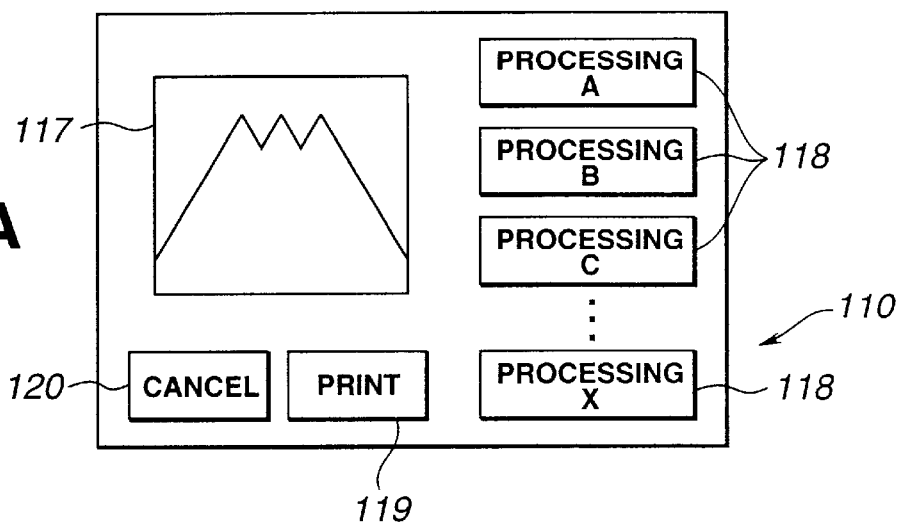
FIGS. 14A, 14B and 14C are schematic views showing other examples of an image shown on a display device of the printer device according to the present invention or on an external monitor.
Figure 14B:
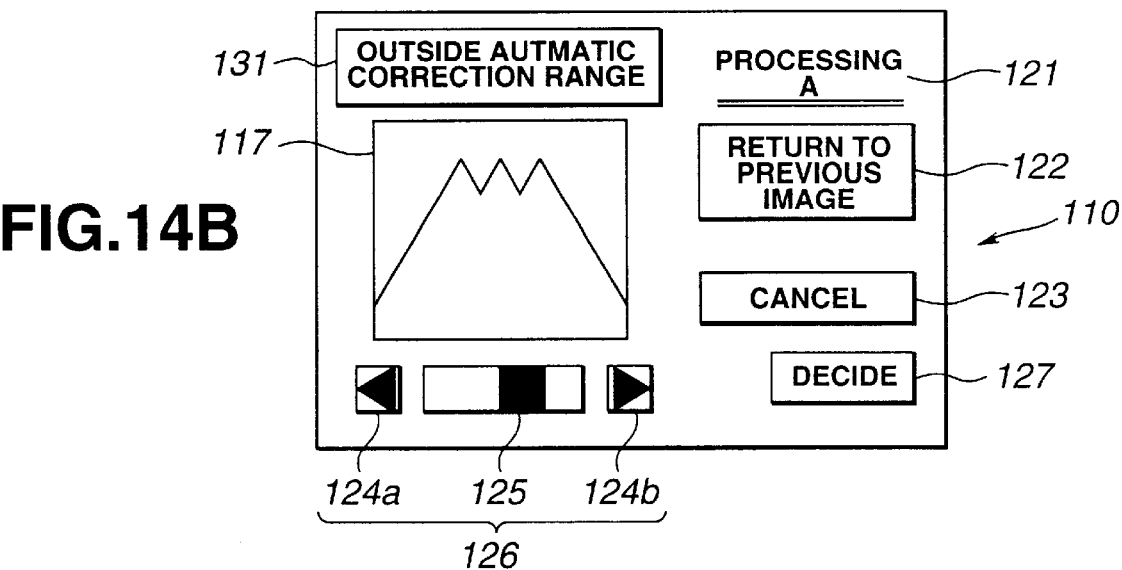

The variable parameter selecting portion 126 has a slide volume display portion 125 for displaying the level of the variable parameter and adjustment keys 124a, 124b for increasing or decreasing the variable parameters, as shown in FIG. 14B. If the left side adjustment key 124a in FIG. 14B is thrust, the variable parameter level is moved towards left, whereas, if the right side adjustment key 124b in FIG. 14B is thrust, the variable parameter level is moved towards right. For example, if the variable parameter is the image luminance, the left side adjustment key 124a in FIG. 14A is the luminance lowering key and the right side adjustment key 124b in FIG. 14A is the luminance increasing key, the image is displayed with varying luminance by adjusting these adjustment keys 124a, 124b for varying the level of the slide volume display portion 125.

Therefore, if the "outside automatic correction range" display 131 is displayed, it suffices if the processing is discontinued, correction processing is carried out within the possible correction range, and the variable parameters are changed manually by the above-described technique to decide the correction parameters.

Figure 14C:
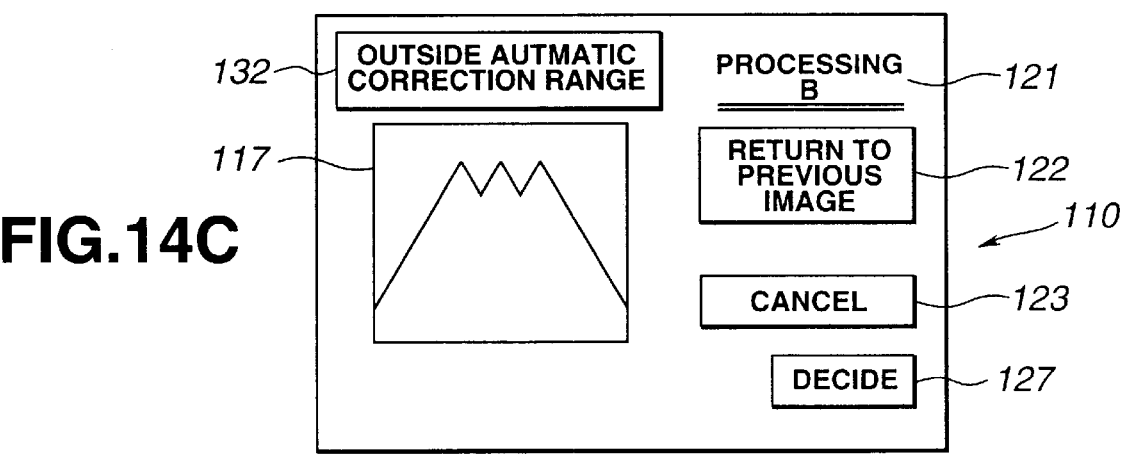

On the other hand, it is assumed that the processing B is the processing not having the variable parameter. If such correction processing is being executed, it suffices to display a screen 110 having an image 117, a processing display unit 121 indicating the processing then going on, a "return to previous screen" selection key 122 carrying the legend "return to previous screen", for selecting this legend indication, and a cancellation key 123 for discontinuing the processing, and a decision key 126 for definitively setting the processing, as shown in FIG. 14C. If it has been decided that the pre-set in ancillary to the image or the pre-set characteristics of the image are not within the pre-set range, it suffices to display the "outside automatic correction range" display 132 indicating impossibility of automatic correction.

Therefore, if the "outside automatic correction range" display 132, indicating possibility of automatic correction, is displayed, as mentioned previously, it suffices if the processing is discontinued, or if correction processing is carried out within the possible automatic correction range.

If the correction processing is executed on the screen shown in FIGS. 14B or 14C, and the user deems that this processing can be terminated, the decision key 127 is selected. This restores the screen shown in FIG. 14A to start the printing.

Figure 15:
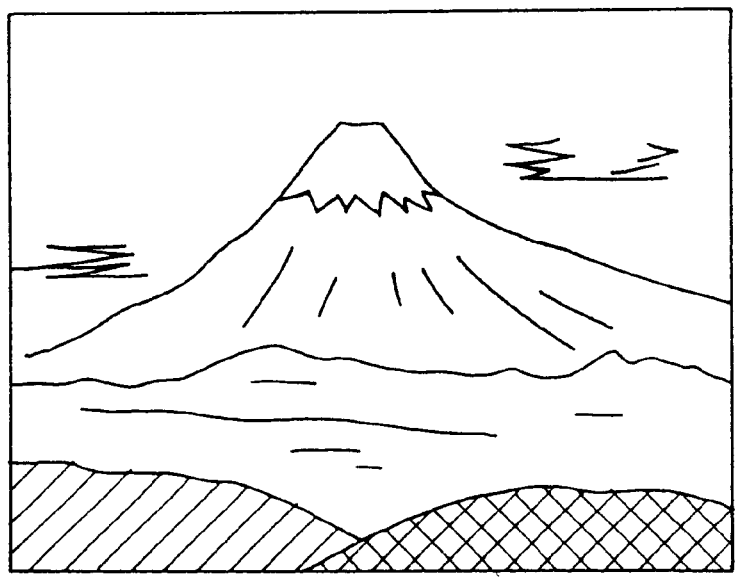
FIG. 15 is a schematic view still other examples of an image shown on a display device of the printer device according to the present invention or on an external monitor.
Figure 16:
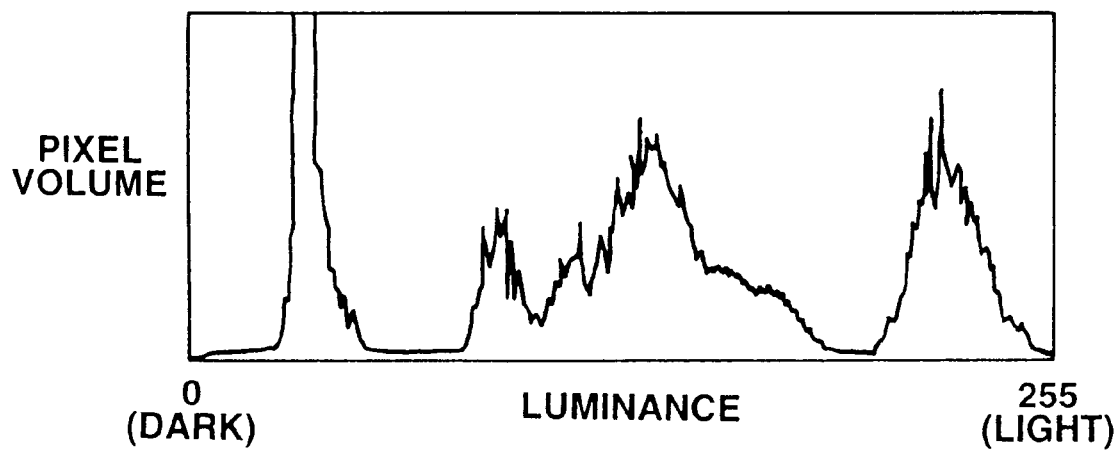
FIG. 16 is a schematic view showing an example of an image luminance histogram.

If the above-described correction processing is to be performed, it is preferred to correct luminance. For printing an image shown for example in FIG. 15, and the luminance histogram thereof shows average distribution as shown in FIG. 16, it is possible to form a printed image of sufficient image quality. Meanwhile, in FIG. 16, pixel luminance level and the pixel value are plotted on the abscissa and the ordinate, respectively.

Figure 17:
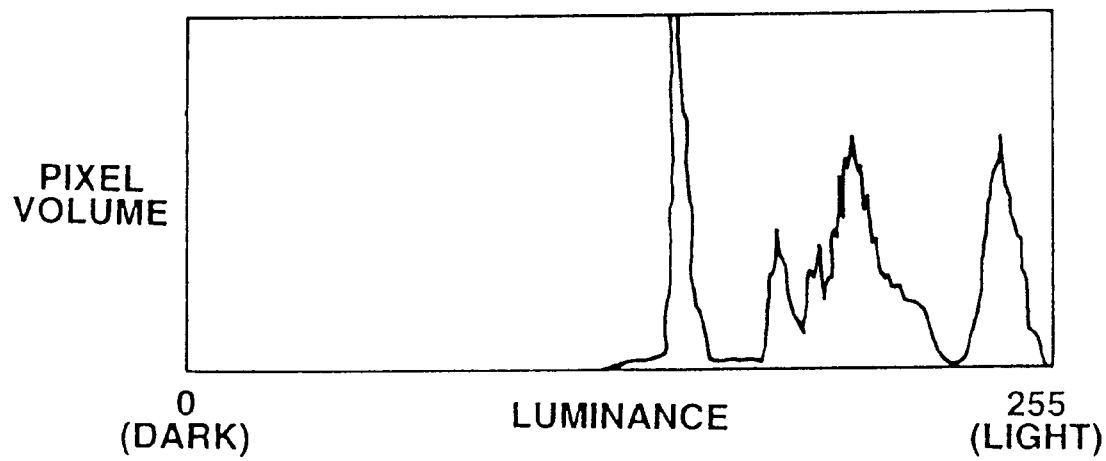
FIG. 17 is a schematic view showing another example of an image luminance histogram.
Figure 18:
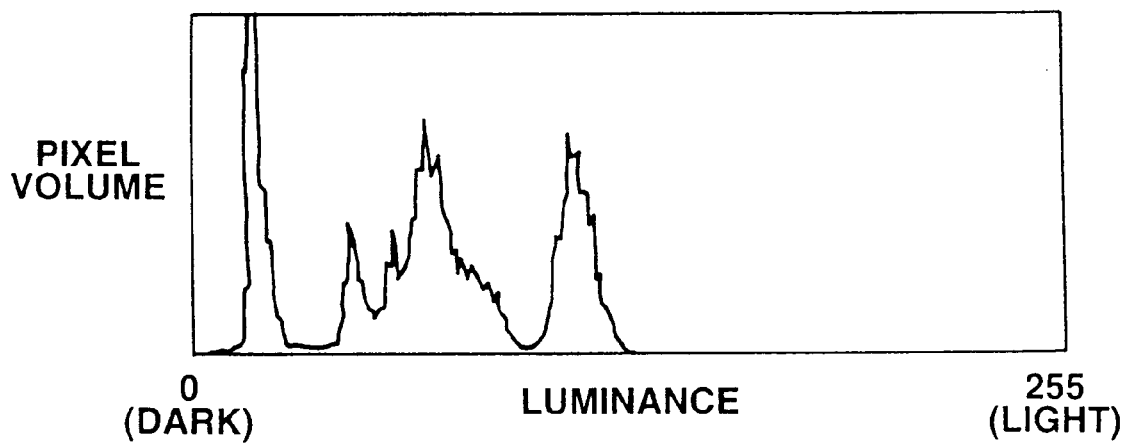
FIG. 18 is a schematic view showing still another example of an image luminance histogram.

However, if the luminance is distributed towards the high luminance side, as shown in FIG. 17, or if the luminance is distributed towards the low luminance side (shadow side), as shown in FIG. 18, no sufficient image quality is acquired if the image is printed in this state. In FIGS. 17 and 18, pixel luminance and pixel value are plotted on the abscissa and on the ordinate, respectively.

Therefore, if luminance distribution is as shown for example in FIG. 17, image data is preferably corrected into an image having averaged luminance distribution, as shown in FIG. 16, by enlarging a certain portion of image data of FIG. 17. However, if the luminance is offset more significantly towards the bright side than in FIG. 16, no sufficient image quality is obtained on correction. In such case, preferably the automatic correction processing is discontinued to make a display prompting the user to take suitable measures. Preferably, it is determined previously whether or not correction processing is to be discontinued automatically. Also, in such case, since the type of the setting and the range are different depending on the sort of image data and the contents of the correction processing, it is necessary to pre-set an optimum range.

The same holds for a case in which the luminance is distributed on the while towards the low luminance side (shadow side), as shown in FIG. 18. That is, the image data is preferably corrected to an image in which the luminance is distributed on the whole as shown in FIG. 16. However, if the luminance is offset more significantly towards the dark side than in FIG. 16, no sufficient image quality is obtained on correction. In such case, preferably the automatic correction processing is discontinued to make a display prompting the user to take suitable measures. Preferably, it is determined previously whether or not correction processing is to be discontinued automatically. In such case, since the type of the setting and the range are different depending on the sort of image data and the contents of the correction processing, it is necessary to pre-set an optimum range.

The schematic operation in the present printer device is explained with reference to a flowchart shown in FIGS. 19 to 25.

Figure 19:
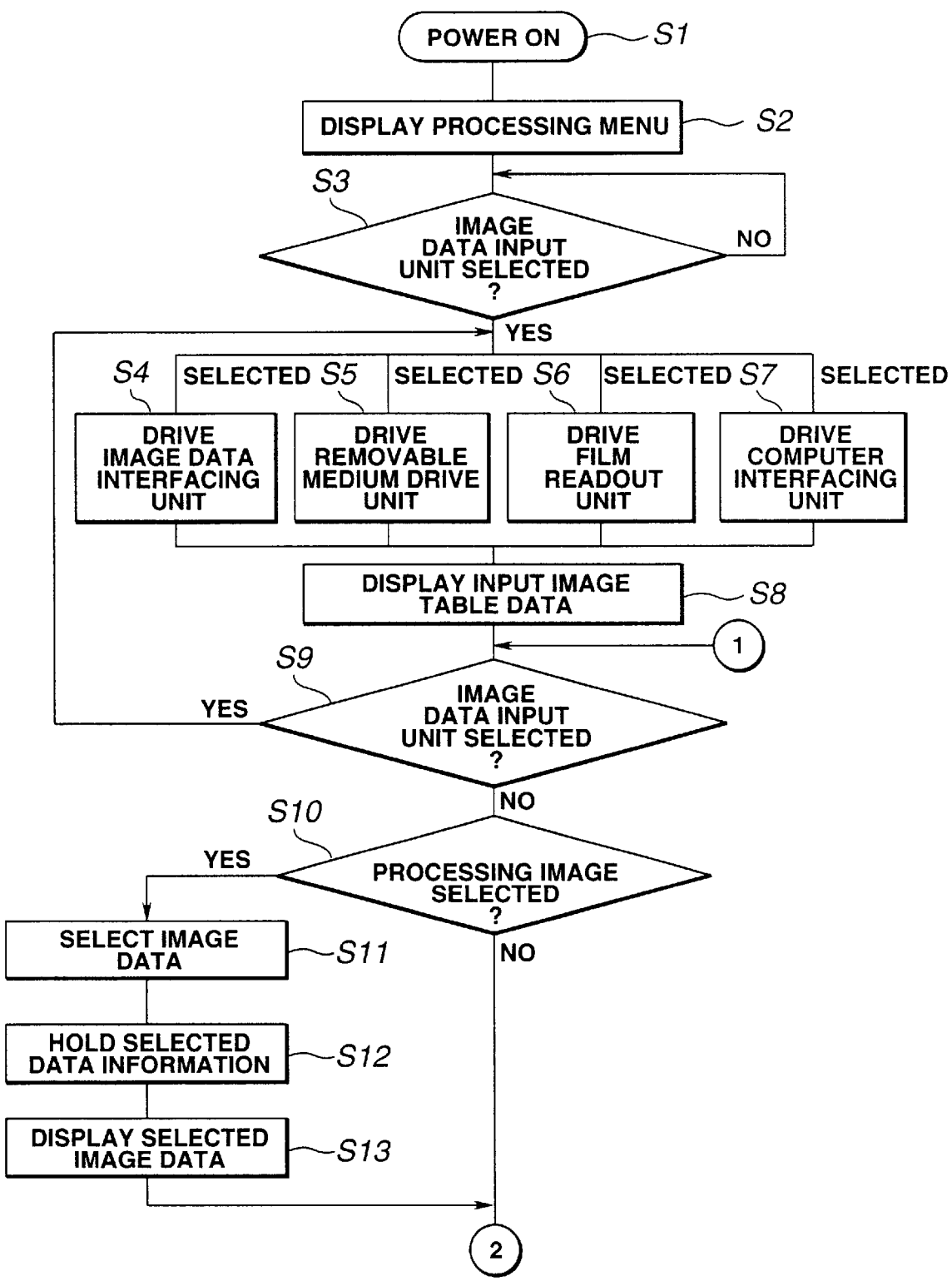
FIG. 19 is a flowchart showing a portion of the schematic operation in the printer device according to the present invention.

Referring first to FIG. 19, if the power is turned on at step S1, the processing menu shown in FIG. 13 is displayed as an initial picture at step S2 on the display device and/or the external monitor. Then, at step S3, it is checked whether or not selection of image inputting means or the external connection equipment to which image data is inputted is instructed. If such instructions are issued, a desired specified one is selected, such that an image data interfacing unit is driven at step S4. Since there are plural sorts of the image inputting means or the external connection equipments, as mentioned previously, the removable medium driving unit is accordingly driven at step S5. The film read-out unit is driven at step S6. The computer interfacing unit is driven at step S7. That is, the program moves to one of steps S4 to S7 responsive to selection at step S3.

If, at step S3, selection of image inputting means or the external connection equipment to which image data is inputted is not instructed, it is again checked at step S3 whether or not selection of image inputting means or the external connection equipment to which image data is inputted is to be instructed. That is, it is again checked at step S3 whether or not selection of image inputting means or the external connection equipment to which image data is inputted is to be instructed to await issuance of the instructions for selection.

The image data inputted from the image inputting means or the external connection equipment, selected at steps S4 to S7, is displayed at step S8 as an image on the display device or on the external monitor. If plural image data is outputted from the selected image inputting means or the external connection equipment, the plural output image data are displayed as plural contracted images on the display device or on the external monitor.

Then, at step S9, it is checked whether or not a command for changing the selection of the image inputting means or the external connection equipment, to which image data is to be inputted, has been issued. If the command for changing the selection of the image inputting means or the external connection equipment, to which image data is to be inputted, has not been made, it is checked at step S11 whether or not a command for selecting an image for processing from the plural contracted images displayed at step S10 has been issued. The processing here means the processing, such as editing, working or correction by the image processing unit, printing by the image printing unit and respective processing operations to be executed for printing.

If an image to be processed is not selected from the plural displayed images, but a command for changing the image inputting means or the external connection equipments, to which image data is to be inputted, has again been made, the image inputting means or the external connection equipments, to which image data is to be inputted, is again selected at step S9, and the program then moves to one of the steps S4 to S7, responsive to the selection command.

To the image selected at step S10 as described above, the ID information indicating the image is appended, each time the image is selected, to a selected image list, at step S11, by way of an image selection processing demonstrating the selection of the image data. At step S12, the information of the selected image data is held at step S12 in the above-mentioned working RAM or in each image inputting means.

Then, at step S13, the display state of the selected display image on the display device and/or the external monitor is changed to indicate that the image has been selected.

Figure 20:
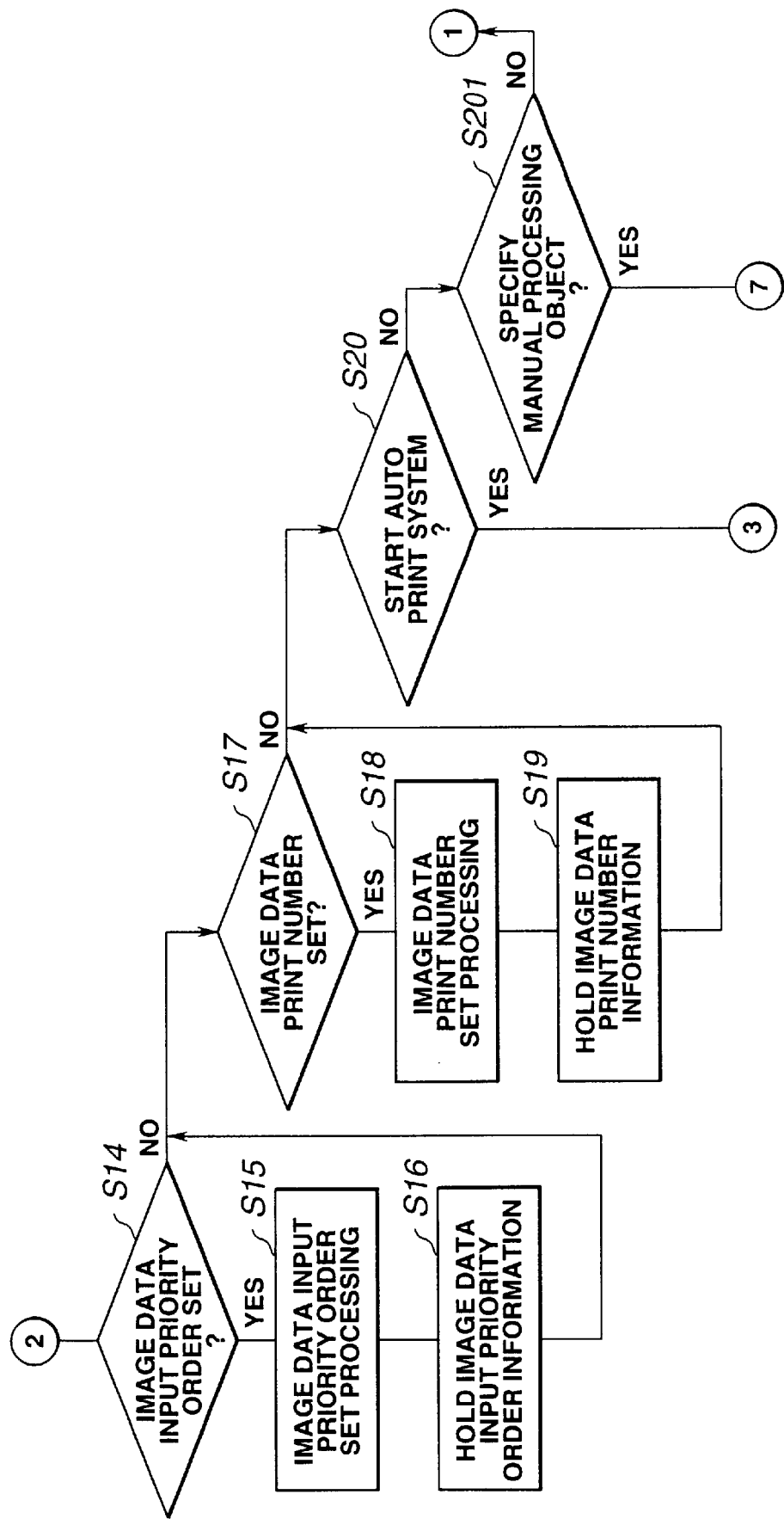
FIGS. 20 to 25 are flowcharts showing respective different portions of the schematic operation in the printer device according to the present invention.

Then, at step S14 in FIG. 20, it is checked whether or not a command for setting the image data inputting priority sequence of determining the inputting order of the plural selected image data to the data working unit is to be made. If the command for setting the image data inputting priority sequence is to be made, the processing for setting the image data inputting priority sequence, such as the processing of selecting the inputting priority method and the preparation of the processing sequence image list, is performed at step S15. At the next step S16, the information on the image data inputting priority sequence is held in the working RAM or in each image inputting means.

It is then checked at step S17 whether or not the command for setting the number of prints of the image data is to be issued. If the command for setting the number of prints of the image data is to be issued, the processing of setting the number of prints of the plural image data, that is the processing of setting the number of prints of the totality of the plural image data, or the processing of setting the number of prints common to the respective image data, is executed. At step S19, the information on the number of prints of the image data is held in the working RAM or in the image inputting means.

If it is decided at step S14 that a command for setting the plural image data inputting priority sequence is not made, the program directly moves to step S17.

The program then moves to step S20 to decide whether or not a command for starting the automatic printing system is to be issued.

If it is found that the command for the setting of the number of prints has not been issued, the program directly moves to step S20.

If a command for startup of the automatic printing system has been issued at step S20, the information on the image data and the information on the input priority sequence, selected at step S21, are inputted from the above-mentioned working RAM or the respective image inputting means to the data working unit.

At step S22, the image data to be processed initially is decided from the above image data based on the information inputted at step S22. Then, at step S23, the information on the number of prints of the image data is inputted from the working RAM or the image inputting means to the data processing unit.

At step S24, the image data is inputted in the impeccable state to the data working unit so as to be displayed at step S25 on the display device and/or the external monitor. If the image data handled in the image memory is in the impeccable state, the image data is inputted to the data working unit. If there is no image data in the impeccable state in the image memory, the image data is again inputted from the image inputting means or the external connection equipment.

At step S26, the processing A, which is a sort of the correction processing, is automatically carried out on the image data and, at step S27, it is checked whether or not the processing A has come to a close as normally. Specifically, it is verified that the pre-set information or pre-set characteristics pertinent to the processing A of the image data are within the pre-set range, while it is checked whether or not the processing has been carried out as normally as required. If the processing A has been terminated as normally, the processing B, which is a sort of the correction processing, is carried out automatically. At step S29, it is checked whether or not the processing B has come to a close as normally. That is, it is checked whether or not the pre-set information or pre-set characteristics pertinent to the processing B of the image data are within the pre-set range and whether or not the processing B has been carried out as normally in the required manner. If the processing B has been terminated normally, it is first checked whether or not the pre-set information or pre-set characteristics are within the pre-set range and then the correction processing is executed sequentially.

Figure 22:
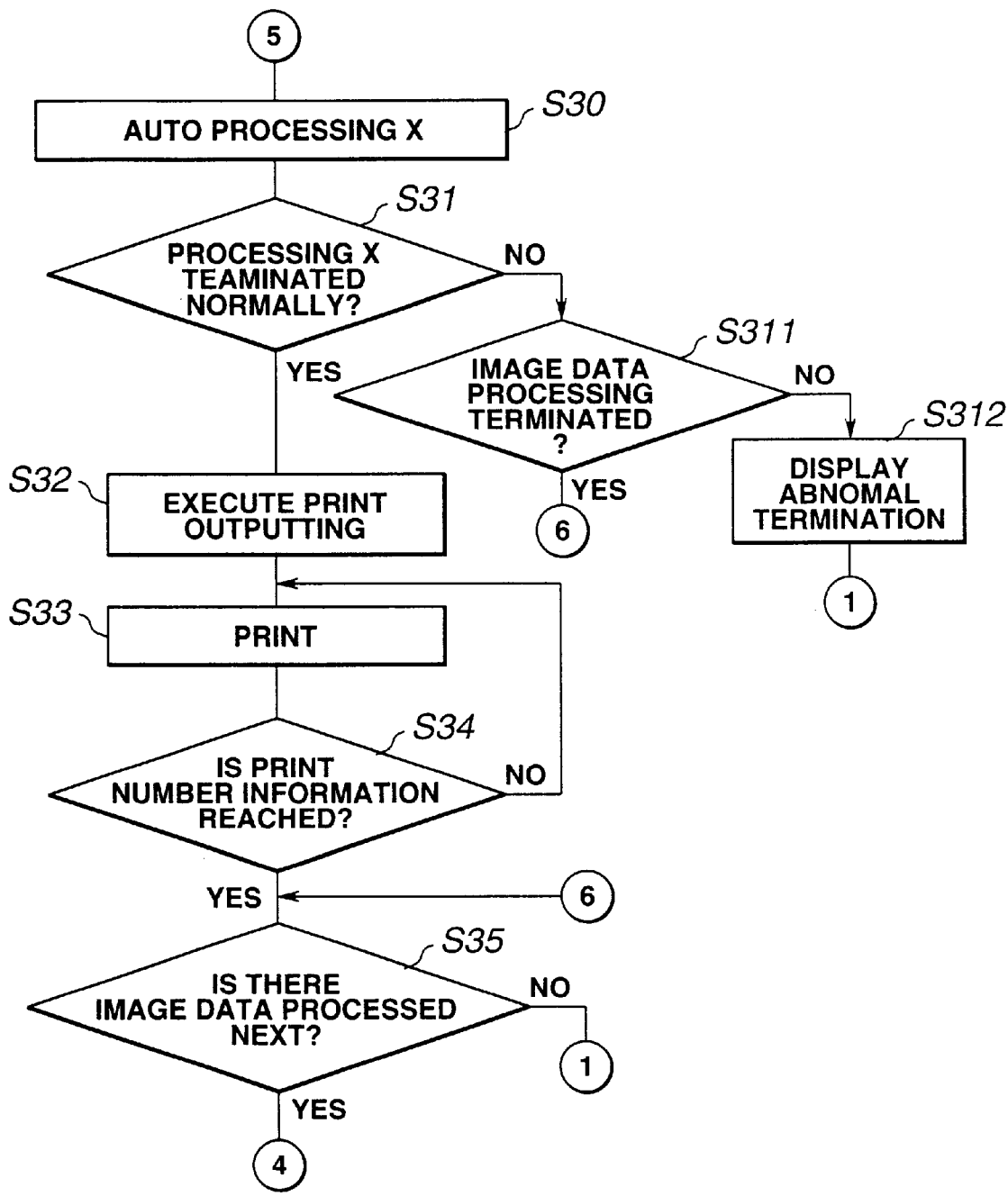
Figure 23:
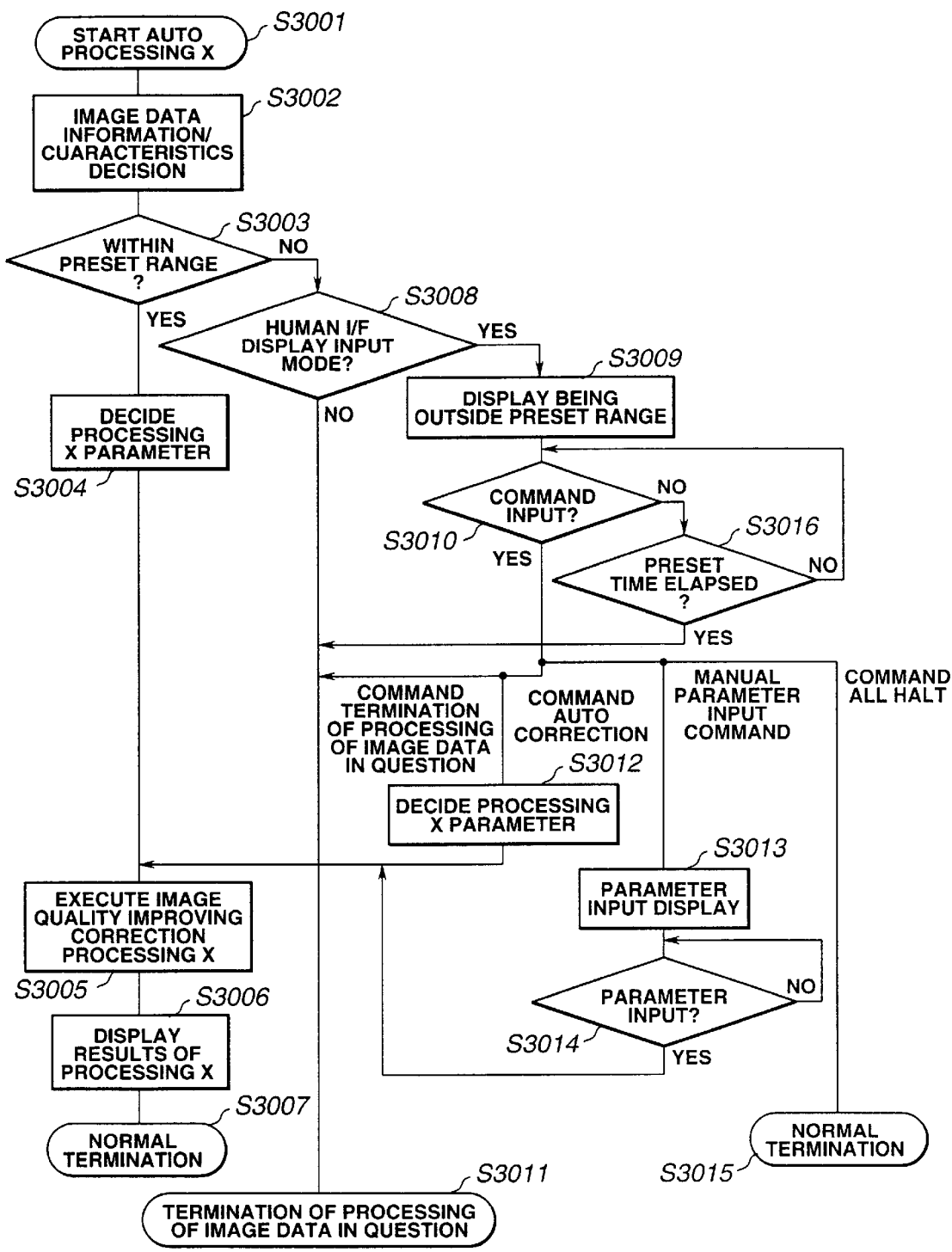
Figure 24:
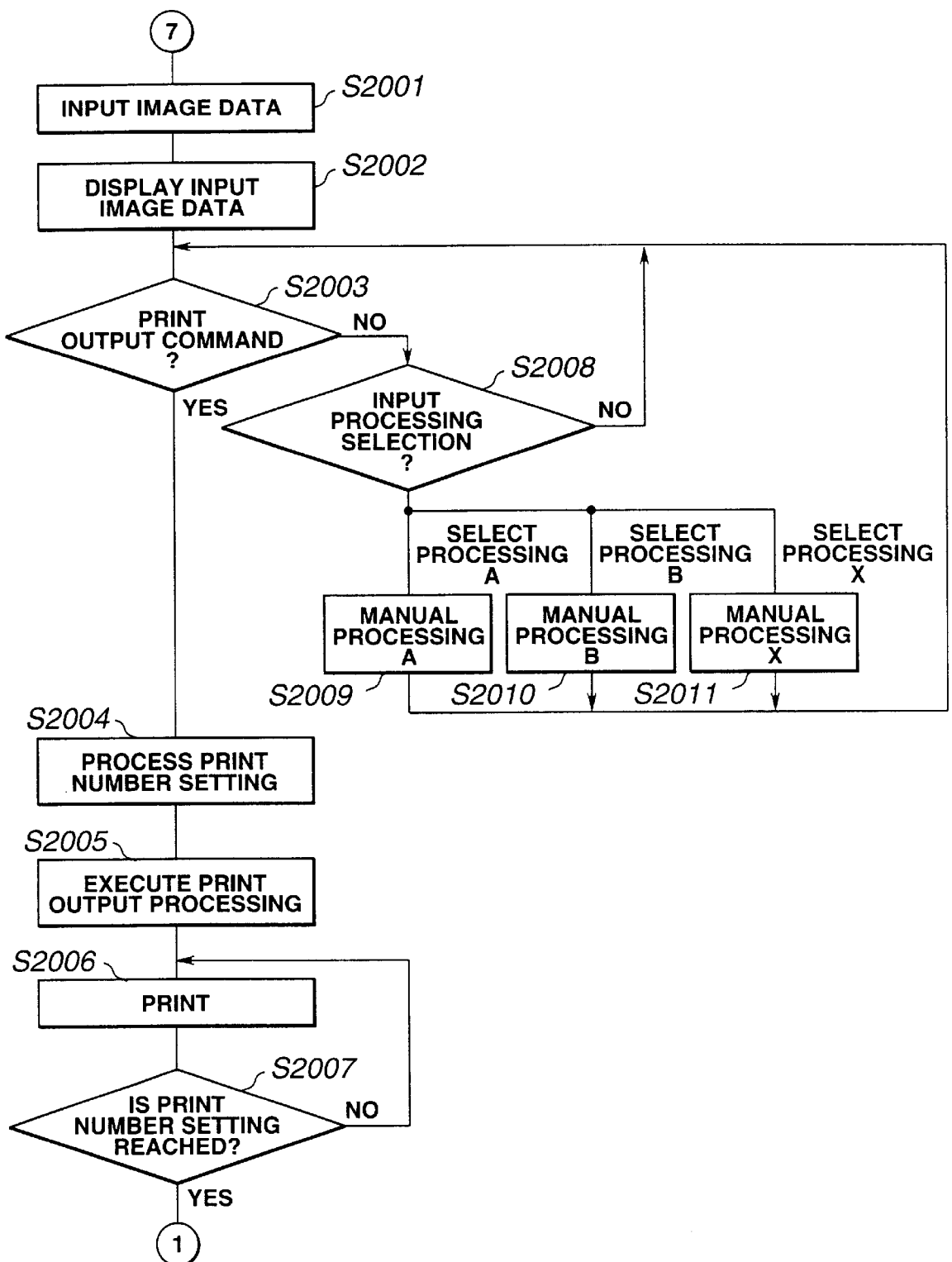

The correction processing is repeated and, as shown in FIG. 22, the processing X as the last correction processing on the image data is executed automatically. At step S31, it is checked whether or not the processing X has come to a close as normally. That is, it is checked whether or not the pre-set information or pre-set characteristics pertinent to the processing X of the image data are within the pre-set range and whether or not the processing X has been carried out as normally. If the processing X has been terminated normally, the image data becomes the second digital image data. At step S32, the second digital image data is processed for printing by the printing output processing unit and thereby converted into printing data.

The above-described sequence in which the processing A, Bitstream, . . . , X are executed and the results of the execution are checked is merely illustrative and the type or the sequence of the processing operations may be suitably varied depending on the types or characteristics of the selected image data, the characteristics of the image inputting means or the external connection equipments, setting on shipment, using states or the operational environments.

Figure 21:
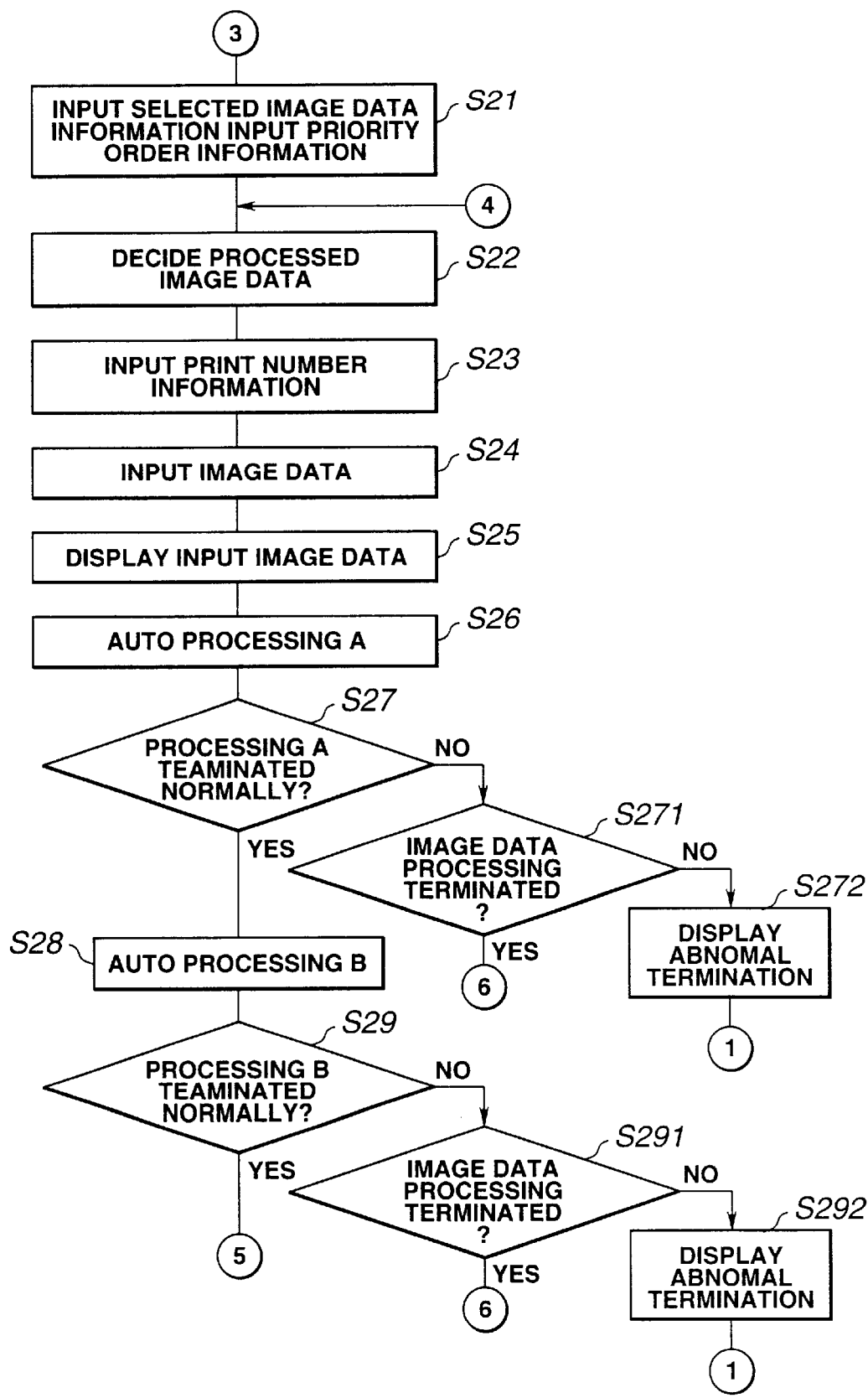

At step S33, printing is made based on the printing data. At step S34, it is verified whether or not the number of prints has come to the pre-set number of prints of the information on the number of prints. If the number of prints has not reached the pre-set value, printing is carried out again at step S33. If the number of prints has reached the pre-set value, it is checked whether or not there is any selected image data to be processed as described above. If there is such next image data, the program reverts to step S22, as shown in FIG. 21, to repeat the subsequent processing. If there is no next selected image data, the program reverts to step S9 to repeat the subsequent processing.

If it is verified at step S27 in FIG. 21 that the processing A has not been terminated as normally, it is checked at step S27 1 whether or not the processing for the first digital image data is to be deemed to have been terminated as normally so that processing can move to the next step. That is, it is verified that, while the correction processing, print outputting processing and the printing processing for the image data is to be discontinued, however, the next selected image data, if any, should be executed. This may be commanded by the user or pre-set as the operating mode. If the processing for the image data is to be terminated as the processing is deemed to be normal, the program reverts to step S35 of FIG. 22 to check whether or not there is any image data to be processed next.

If the processing for the image data is not deemed to be normal at step S271, indication for abnormal termination, meaning that the processing has not been terminated as normally, is made at step S272 in the display monitor and/or the external monitor. The program then moves to step S9 in FIG. 19 to repeat the processing as from step S9.

The same holds for the case in which it has been decided that the processing Bitstream at step S271 has not been terminated as normally. Thus, at step S291, it is checked whether or not the processing for the first digital image data is to be terminated and is to be deemed to have been terminated as normally to proceed to the next processing. If the processing for the present image data is to be terminated and is to be deemed to have been terminated as normally, the program moves to step S35 in FIG. 22 to check whether or not there is any next processed data.

On the other hand, if the processing for this image data is not deemed at step S291 to have been terminated as normally, indication for abnormal termination, meaning that the termination at step S29 1 is not normal, is made on the display device and/or on the external monitor, to repeat the subsequent processing.

The same holds for the case in which it has been decided that the processing X at step S31 has not been terminated as normally. Thus, at step S311, it is checked whether or not the processing for the first digital image data is to be terminated and is to be deemed to have been terminated as normally to proceed to the next processing. If the processing for the present image data is to be terminated and is to be deemed to have been terminated as normally, the program moves to step S35 in FIG. 22 to check whether or not there is any next processed data.

On the other hand, if the processing for this image data is not deemed at step S311 to have been terminated as normally, indication for abnormal termination, meaning that the termination at step S312 is not normal, is made on the display device and/or on the external monitor, to repeat the subsequent processing.

The sequence for correction processing in the automatic printing system is hereinafter explained with the processing X taken as an example. That is, the processing X is started by the automatic printing system at step S3001 in FIG. 32. At the next step S3002, it is checked whether or not the pre-set information or the pre-set characteristics of the first digital image data inputted at step S3002 is within the pre-set range. At step S3003, it is checked whether or not the pre-set information or the pre-set characteristics are within the pre-set range.

If the pre-set information or the pre-set characteristics are verified to be within the pre-set range, the value of the variable parameter of the processing X is determined automatically at step S3004. The processing X, which is the correction processing for improving the image quality is executed automatically at step S3005. At step S3006, an image representing the results of execution of the processing X is displayed. It is then verified at step S3007 that the processing X has been terminated as normally. The program moves to step S31 shown in FIG. 22 to give a decision that the processing X has been terminated as normally.

If it is verified at step S3003 that the pre-set information or the pre-set characteristics are verified not to be within the pre-set range, it is verified at step S3008 whether or not the human interface (I/F) command input mode, that is a mode in which the user inputs the image data manually, is set for the subsequent accommodating method. If the human interface (I/F) command input mode has been set, it is displayed at step S3009 on the display device and/or the external monitor that the pre-set information or the pre-set characteristics of the first digital image data are not in the pre-set range, after which it is checked at step S3010 whether or not a command input is to be made from outside as to the subsequent accommodating method.

That is, it is verified which of the methods of discontinuing the correction and printing processing for the first digital image data, freely setting the value of the variable parameters of the processing X in the possible range to execute automatically the processing X which is the correction processing for improving the image quality based on the value, getting the value of the variable parameter inputted manually by the user, or discontinuing the totality of the automatic processing, is to be used. It is possible to pre-set which of these methods is to be used.

If a command is inputted as to the subsequent accommodating method, it is possible to terminate the correction processing as to the first digital image data, as described above, to make automatic correction within the possible range, to enter manually the values of the variable parameters or to discontinue the entire processing.

If a command for automatic correction within the possible range is entered, or the entry is pre-set, the processing of the first digital image data is terminated at step S3011 and the processing of the first digital image data is verified to have come to a close at step S311 in FIG. 22.

If a command for automatic correction is entered within the possible range, or such entry is pre-set, the value of the variable parameter of the processing X is automatically determined within the possible range at step S3012. The program then moves to step S3005 to execute the subsequent processing.

If the value of the variable parameter is entered manually, or such entry is pre-set, indication prompting the entry of the parameter value is made at step S3013, and check is made at step S3014 whether or not the parameter value is to be entered. If the parameter value is entered, the program moves to step S3005 to execute the subsequent processing. If the parameter value is not inputted, it is again checked at step S3014 whether or not the parameter value is to be entered.

If a command for terminating the processing in its entirety is entered, or such entry is pre-set, abnormal termination is presumed to have occurred, indicating that the normal termination shown at step S3015 has not occurred. The program then moves to step S312 shown in FIG. 22 to prosecute the subsequent processing.

If it is checked at step S3010 whether or not a command as to the subsequent accommodating method has been entered from outside and if it is found that no command for entry has been made for outside, with there being no pre-setting as to selection of the accommodating method, it is checked at step S3016 whether or not a pre-set time duration has elapsed. If the pre-set time duration has elapsed, that is if no command for entry has been issued for pre-set time, the program moves to step S3011 to terminate the processing of the first digital image data. If the pre-set time has not elapsed, it is again checked at step S3010 whether or not the command for entry has been issued from outside.

If it is verified at step S20 in FIG. 20 that no command has been issued for startup of the automatic printing system, it is then checked at step S201 whether or not selective designation has been made of images for manual processing for executing each processing. If no selective designation has been made, the program reverts to step S9 shown in FIG. 19 to execute the subsequent processing. That is, the decisions of steps S9, S10, S14, S17, S20 and S201 are repeated to await relevant inputting commands.

If selective designation has been made of images for manual processing at step S201, the image data is inputted in the impeccable state to the data working unit at step S2001. The inputted image data is displayed at step S2002 on the display device and/or the external monitor. If the image data in question is stored in the impeccable state in the image memory, the image data is inputted to the data working unit. If the image data has not been stored in the impeccable state in the image memory, the image data in question is inputted from the image inputting means or the external connection equipment to the data working unit. Meanwhile, the image data is the first digital image data.

It is then checked at step S2003 whether or not the print output start command is to be made. If the print output start command is to be made, the number of prints of the inputted first digital image data is set at step S2004. The printing output processing is executed at step S2006. It is then checked at step S2007 whether or not the number of prints has reached the pre-set number of prints. If the pre-set number of prints has not been reached, printing is again performed at step S2006. If the number of prints reaches the pre-set number, the program reverts to step S9 in FIG. 19 to repeat the subsequent processing.

If it is verified at step S2003 that a print output start command of the print output has not been issued, it is checked at step S2008 whether or not one of the correction processing is to be selected and executed. If the command for processing selection is issued, one of the processing A, processing Bitstream, . . . , processing X, as mentioned previously in connection with the automatic printing system, is selected and executed.

If, for example, the processing A is selected, the processing A is executed manually at step S2009. It is again checked at step S2003 whether or not the printing outputting start command is to be issued. If the printing outputting start command is made, the processing as from step S2004 is carried out to execute the printing, as mentioned previously.

On the other hand, if other processing also is to be performed, and if other correction processing, such as processing Bitstream, is selected at step S2008, without the printing outputting start command being issued at step S2003, processing Bitstream is executed manually at step S2010. The decision as to whether or not the printing outputting start command is again made at step S2003. If the printing outputting start command is issued, the processing as from step S2004 is executed to perform the printing.

On the other hand, if other processing also is to be performed, the above-described processing is repeatedly performed at step S2008, if need be, without the printing outputting start command being issued at step S2003. The last processing X is selected, and is executed manually at step S2011. The decision as to whether or not the printing outputting start command is again made at step S2003. If the printing outputting start command is issued, the processing as from step S2004 is executed to perform the printing.

The processing desired by the user is executed sequentially or in a desired sequence on the image data in question. The printing processing is then carried out subject to a user command.

Figure 25:
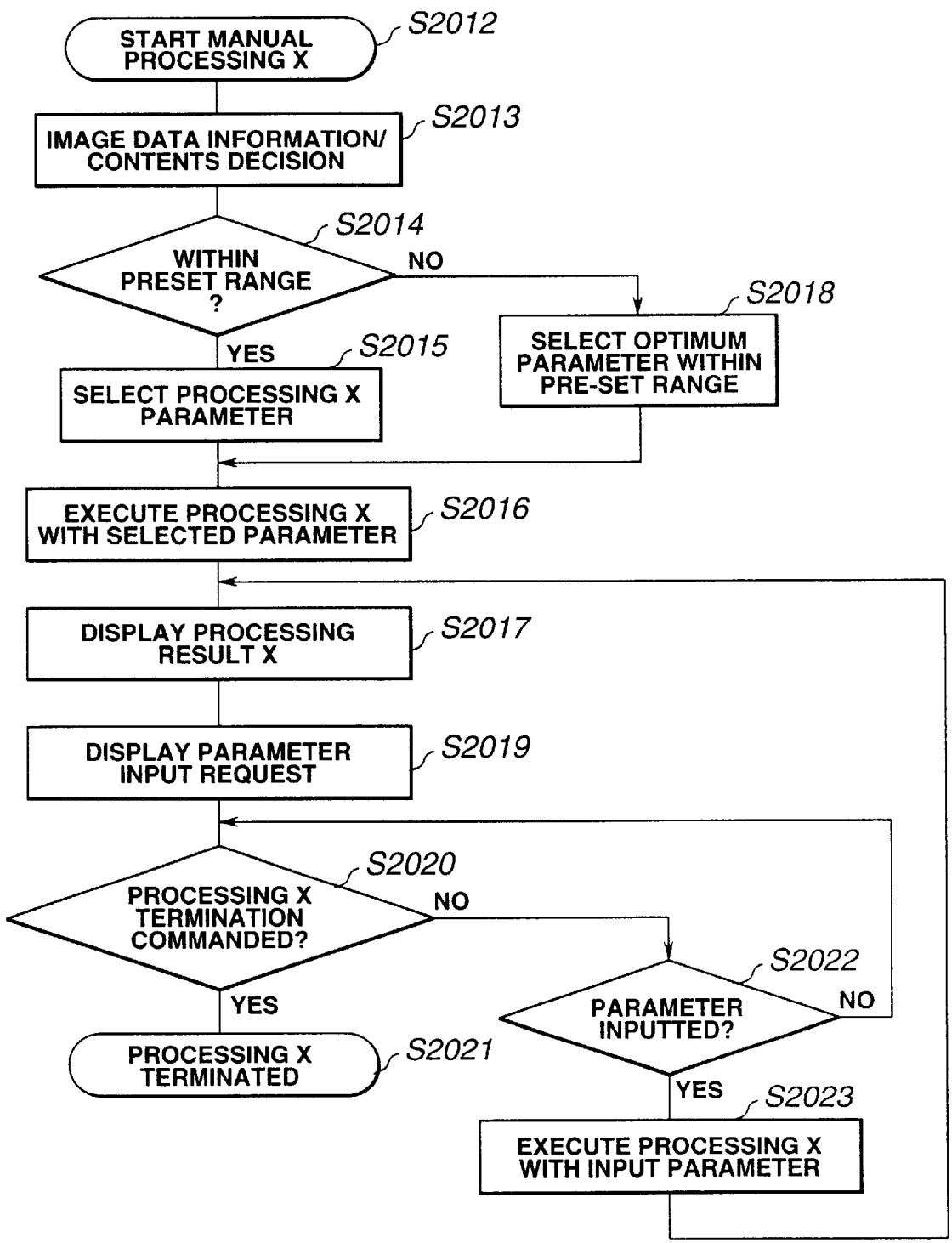

Taking the processing X as an example, the sequence of operations for manual correction processing is explained. It is assumed that the processing X is the processing of inputting the variable parameter. That is, the processing X is started at step S2012, in accordance with the manual system, as shown in FIG. 25. At step S2013, decision processing is made as to whether or not the pre-set information or pre-set characteristics of the inputted first digital image data are within a pre-set range. At step S2014, it is decided whether or not the pre-set information or pre-set characteristics are within a pre-set range.

If the pre-set information or pre-set characteristics are decided to be within the pre-set range, the value of the variable parameter for the processing X is selected at step S2015. At step S2016, the processing X, which is the processing for improving the image quality using the value of the selected variable parameter, is executed. At step S2017, the results of execution of the processing X is displayed at step S2017.

If the pre-set information or pre-set characteristics are decided at step S2014 not to be within the pre-set range, the value of the variable parameter is selected at step S2018 within a pre-set correctable range. At step S2016, the value of the selected variable parameter is used to execute the processing X as the correction processing for improving the image quality. At step S2017, an image resulting from the execution of the processing is displayed.

Then, at step S2019, a parameter inputting request inquiring the user as to whether or not the variable parameter value of the processing X is to be varied is displayed.

If the image displayed at step S2017 is satisfactory, termination of the processing X is selected in the decision at step S2020 as to whether or not the processing X is to be terminated. At step S2021, the processing X is decided to have been terminated. The program then moves to step S2003 shown in FIG. 24 to execute the subsequent processing.

On the other hand, if the processing X is not terminated at step S2020, but the value of the variable parameter is to be changed, the parameter value is inputted at step S2022 and the processing X is executed with the inputted parameter value at step S2030. The result is again displayed at step S2017.

Thus, with the present printer device, various operations are carried out and handled easily. Since the operations are carried out by the same procedure without relevance tot the type of the image inputting means, the user is not perplexed with the operational sequence.

What is claimed is:
1. A printer apparatus comprising:
an image data inputting unit for converting digital image data and/or analog image data inputted from outside by analog/digital conversion into first digital image data;
an image correcting unit for correcting the first digital image data, if need be, to generate second digital image data;
a printing outputting processing unit for performing printing/outputting processing for converting the first digital image data and/or the second digital image data into printing data for printing in an image printing unit; and
the image printing unit for performing printing/outputting on a recording medium based on the printing data;
at least one type of the first digital image data being inputted from said image data inputting unit to said image correcting unit;
wherein
it is verified in said image correcting unit whether or not pre-set characteristics of inputted pre-set first digital image data are within a pre-set range; said pre-set first digital image data is corrected, if need be, if said pre-set characteristics are within the pre-set range, to generate the second digital image data; said first digital image data and/or the second digital image data are converted in said printing outputting processing unit into printing data; and wherein printing/outputting is performed in said image printing unit based on said printing data.

2. The printer apparatus according to claim 1 wherein
a plurality of types of said first digital image data are inputted from said image data inputting unit in a pre-set order to the image correcting unit; and wherein
the processing of verifying whether or not pre-set characteristics of the first digital image data are within a pre-set range and performing required correction in said image correcting unit, converting the data into printing data in said printing outputting processing unit and performing printing/outputting in said image printing unit is sequentially performed on the plural types of the first digital image data in the inputting sequence.

3. The printer apparatus according to claim 1 wherein
if pre-set characteristics of said pre-set first digital image data are substantially uniform over the entire first digital image data and are concentrated in a specified area in a pre-set range, said pre-set characteristics are verified not to be within the pre-set range.

4. The printer apparatus according to claim 1 wherein
if the luminance histograms, as pre-set characteristics of the pre-set first digital image data, are concentrated in a specified area in the pre-set range, said pre-set characteristics are concentrated within the pre-set range and moreover are concentrated in the vicinity of a specified value in the pre-set range, said pre-set characteristics are verified not to be within the pre-set range.

5. The printer apparatus according to claim 1 further comprising:
an image displaying outputting unit for displaying/outputting said first digital image data and/or the second digital image data;
wherein
if said pre-set characteristics of said pre-set first digital image data are within the pre-set range, however, the proportion of the size of the first digital image data in the possible display area of said image displaying outputting unit is smaller than a pre-set value, said pre-set characteristics are verified not to be within the pre-set range.

6. The printer apparatus according to claim 1, wherein
if said pre-set characteristics of said pre-set first digital image data are within the pre-set range, however, the proportion of the size of the first digital image data in the possible printing area of said image printing unit is smaller than a pre-set value, said pre-set characteristics are verified not to be within the pre-set range.

7. The printer apparatus according to claim 1 further comprising:
an image displaying outputting unit for displaying/outputting said first digital image data and/or the second digital image data;
wherein
if said pre-set characteristics of said pre-set first digital image data are within the pre-set range, however, the size of the first digital image data is larger than the possible display area of said image displaying outputting unit, said pre-set characteristics are verified not to be within the pre-set range.

8. The printer apparatus according to claim 1 wherein
if said pre-set characteristics of said pre-set first digital image data are within the pre-set range, however, the size of the first digital image data is larger than the possible printing area of said image printing unit, said pre-set characteristics are verified not to be within the pre-set range.

9. The printer apparatus according to claim 1 wherein
if said pre-set characteristics of said pre-set first digital image data are within the pre-set range, however, the size of the first digital image data is larger than the correctable area of said image correcting unit, said pre-set characteristics are verified not to be within the pre-set range.

10. The printer apparatus according to claim 1 wherein
if said pre-set characteristics of said pre-set first digital image data are within the pre-set range, however, pre-set characteristics of said pre-set first digital image data exceed the correction enabling range of pre-set characteristics of said image correcting unit, said pre-set characteristics are verified not to be within the pre-set range.

11. The printer apparatus according to claim 1 wherein
if said pre-set characteristics of said pre-set first digital image data are outside the pre-set range, processing of correction, conversion to printing data and printing/outputting is not performed.

12. The printer apparatus according to claim 1 further comprising:
inputting means for inputting a command from outside; and
a controller for controlling the image data inputting unit, image correcting unit, printing outputting processing unit, image printing unit and the image displaying outputting unit; wherein
if pre-set characteristics of said pre-set first digital image data are verified not to be within the pre-set range, said controller causes said image displaying outputting unit to indicate that the pre-set characteristics of the pre-set first digital image data are not within the pre-set range.

13. The printer apparatus according to claim 12 wherein
after said controller has caused said image displaying outputting unit to indicate that the pre-set characteristics of the pre-set first digital image data are not within the pre-set range, said controller causes the image correcting unit to discontinue the correction unit to discontinue the correction of said first digital image data; and wherein
if different types of the first digital image data are inputted to the image correcting unit, the processing of verifying whether or not the pre-set characteristics of the first digital image data are within a pre-set range, correcting the image data if necessary, conversion of the image data into printing data and printing/outputting is carried out in succession.

14. The printer apparatus according to claim 12 wherein
after said controller has caused said image displaying outputting unit to indicate that the pre-set characteristics of the pre-set first digital image data are not within the pre-set range, said controller causes said image displaying outputting unit to make a display prompting a command from outside.

15. The printer apparatus according to claim 14 wherein
as the display for causing the image displaying outputting unit to make a display prompting a command from outside, a display is made for prompting a command for discontinuing the processing of correcting the pre-set first digital image data, conversion to printing data and printing/outputting.

16. The printer apparatus according to claim 15 wherein if the processing of correcting said pre-set first digital image data, conversion to printing data and printing/outputting is discontinued, and if different types of the first digital image data are inputted to said image correcting unit, the processing of verifying whether or not pre-set characteristics of said first digital image data are within a pre-set range, correcting the image data if necessary, converting the image data to printing data and printing/outputting is executed in succession.

17. The printer apparatus according to claim 14 wherein as the display for causing the image displaying outputting unit to make a display prompting a command from outside, display is made for prompting correction only of the portion of said first digital image data whose pre-set characteristics are within a pre-set range.

18. The printer apparatus according to claim 14 wherein as the display for causing the image displaying outputting unit to make a display prompting a command from outside, display is made for prompting a command for correcting the pre-set first digital image data by an input from outside.

19. The printer apparatus according to claim 18 wherein if, as the display for causing the image displaying outputting unit to make a display prompting a command from outside for a pre-set time, display is made for prompting a command for correcting the pre-set first digital image data by an input from outside; and wherein, failing an input from outside, as the display for causing the image displaying outputting unit to make a display prompting a command from outside, display is made for prompting a command for discontinuing the correction of said pre-set first digital image data, conversion to printing data and printing/outputting and a display prompting a command for correcting only the portion of the pre-set first digital image data whose pre-set characteristics are within the pre-set range.

20. The printer apparatus according to claim 12 wherein if a command for discontinuing the processing of correcting the pre-set first digital image data, conversion of the image data to printing data and printing/outputting is entered from outside within a pre-set tine as from the time of display on the image displaying outputting unit of the pre-set first digital image data inputted to the image correcting unit, or if a command for discontinuing the processing of converting the pre-set second digital image data to printing data and printing/outputting is entered from outside within a pre-set time as from the time of display on the image displaying outputting unit of second digital image data corrected from the first digital image data, the processing is discontinued; and wherein if different types of the first digital image data are entered to said image correcting unit, processing of displaying the first digital image data in the image displaying outputting unit, checking whether or not pre-set characteristics of the pre-set first digital image data are within a pre-set range, performing required correction, performing conversion to printing data and printing/outputting is executed.

21. The printer apparatus according to claim 12 wherein if, within a pre-set time as from the time of display of the pre-set first digital image data on the image displaying outputting unit, correction of said first digital image data, conversion of the image data to printing data and printing/outputting is entered from outside within a pre-set time as from the time of display on the image displaying outputting unit of the pre-set first digital image data inputted to the image correcting unit, of if a command for discontinuing the processing of converting the pre-set second digital image data to printing data and printing/outputting is entered from outside within a pre-set time as from the time of display on the image displaying outputting unit of second digital image data corrected from the first digital image data, this processing is executed based on a command from outside.

22. The printer apparatus according to claim 1 wherein, of printed image data, among at least one type of the first digital image data and at least one type of the second digital image data corrected from said first digital image data, information contents of the image data are updated and a flag and/or the information are appended for indicating that the image data are already printed.

23. The printer apparatus according to claim 22 wherein, if said at least one first digital image data is again printed, the information contents of the first digital image data or the second digital image data corrected from the first digital image data and the flag and/or the information indicating that the image data are already printed are confirmed.

* * * * *